(12) United States Patent  
Dolgoff

(10) Patent No.: US 7,646,540 B2  
(45) Date of Patent: Jan. 12, 2010

(54) WIDE-ANGLE GLASSES-FREE 3-D IMAGE DISPLAY SYSTEM WITHOUT GHOSTING PROVIDING REAL DEPTH AND AGREEMENT BETWEEN ACCOMMODATION AND CONVERGENCE

(76) Inventor: Gene Dolgoff, 936 Roxbury Dr., Westbury, NY (US) 11590

( * ) Notice: Subject to any disclaimer, the term of this patent is extended or adjusted under 35 U.S.C. 154(b) by 0 days.

(21) Appl. No.: 12/371,145

(22) Filed: Feb. 13, 2009

(65) Prior Publication Data

US 2009/0153976 A1  Jun. 18, 2009

Related U.S. Application Data

(60) Continuation of application No. 11/384,215, filed on Mar. 17, 2006, now Pat. No. 7,492,523, which is a division of application No. 10/045,830, filed on Oct. 29, 2001, now Pat. No. 7,016,116, which is a continuation of application No. 08/774,569, filed on Dec. 31, 1996, now Pat. No. 6,310,733.

(60) Provisional application No. 60/023,677, filed on Aug. 16, 1996.

(51) Int. Cl.
G02B 27/14 (2006.01)
G02B 27/22 (2006.01)

(52) U.S. Cl. .................. 359/630; 359/471; 359/472

(58) Field of Classification Search .................. 359/462, 359/630, 471, 472, 476, 479, 742
See application file for complete search history.

(56) References Cited

U.S. PATENT DOCUMENTS 5,886,822 A * 3/1999 Spitzer ..................... 359/630

* cited by examiner

*Primary Examiner*—Scott J Sugarman
(74) *Attorney, Agent, or Firm*—Gerry J. Elman; Elman Technology Law, P.C.

(57) ABSTRACT

An image display system provides a viewer with an experience of three-dimensional imagery by presenting a composite image made up of at least two separate images. The system includes at least first and second image sources, a beam combiner, and a "background-image-occluding element" which prevents background imagery from being seen through foreground image elements. The system presents the image from one of the image sources, containing background image information, at a distance from the viewer which is greater than the distance from the viewer to the other image presented from the other image source, which contains foreground image elements. The "background-image-occluding element" is positioned at the same optical distance from the viewer as the image containing foreground image elements, eliminating any parallax error between them, enabling the foreground image elements to always occlude appropriate areas of the background image, regardless of the viewer's position or the background image brightness relative to the brightness of foreground image elements.

4 Claims, 51 Drawing Sheets

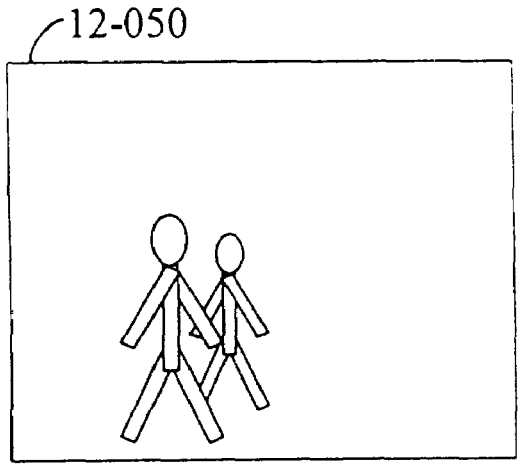
Fig. 16
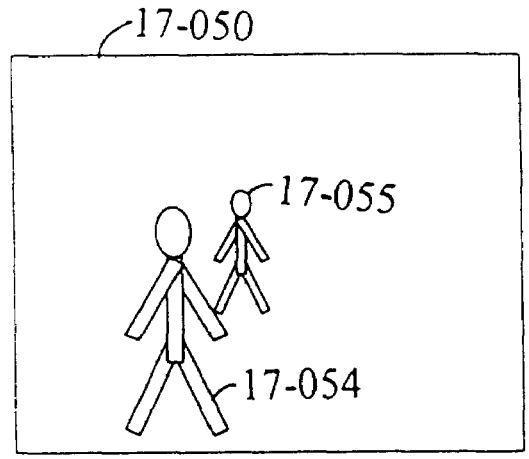
Fig. 17
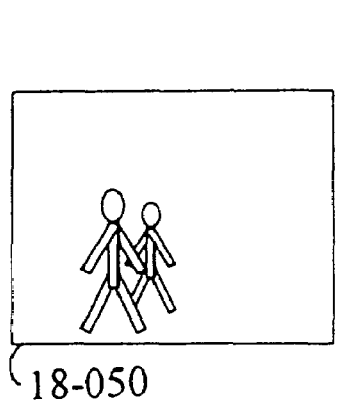
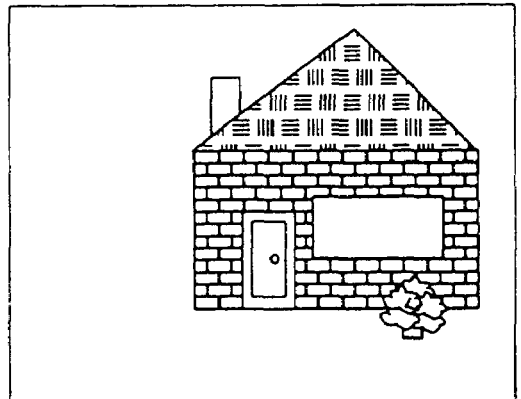
Fig. 18
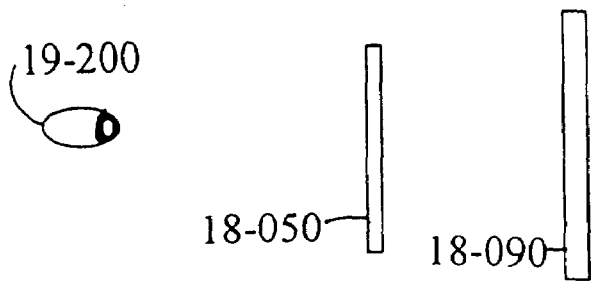
Fig. 19

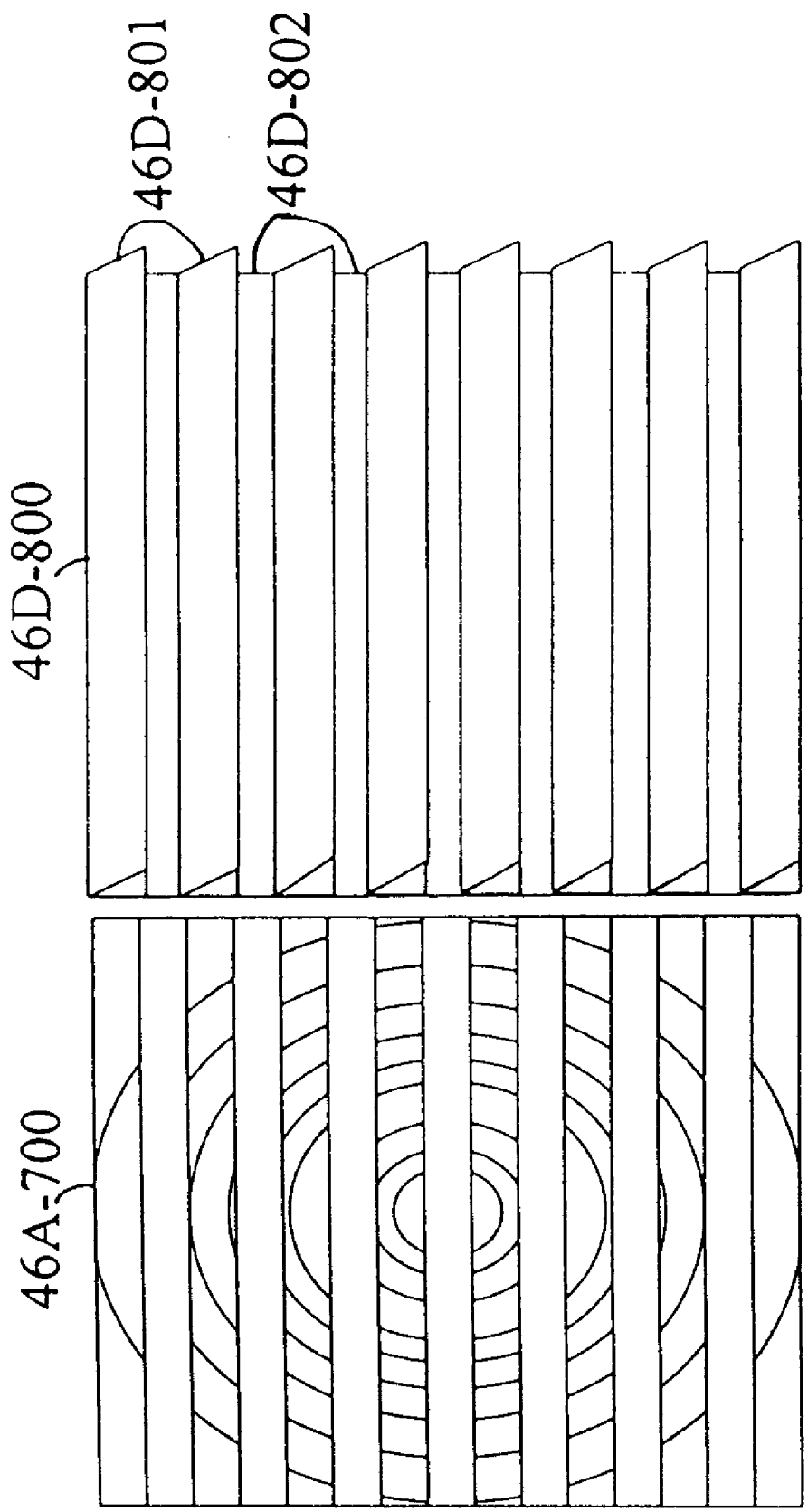

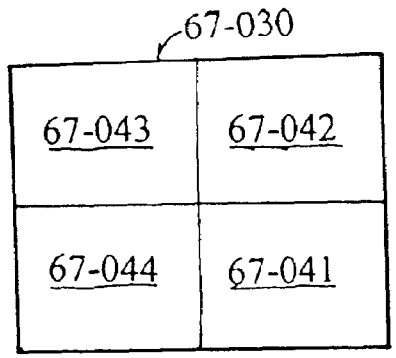
Fig. 67
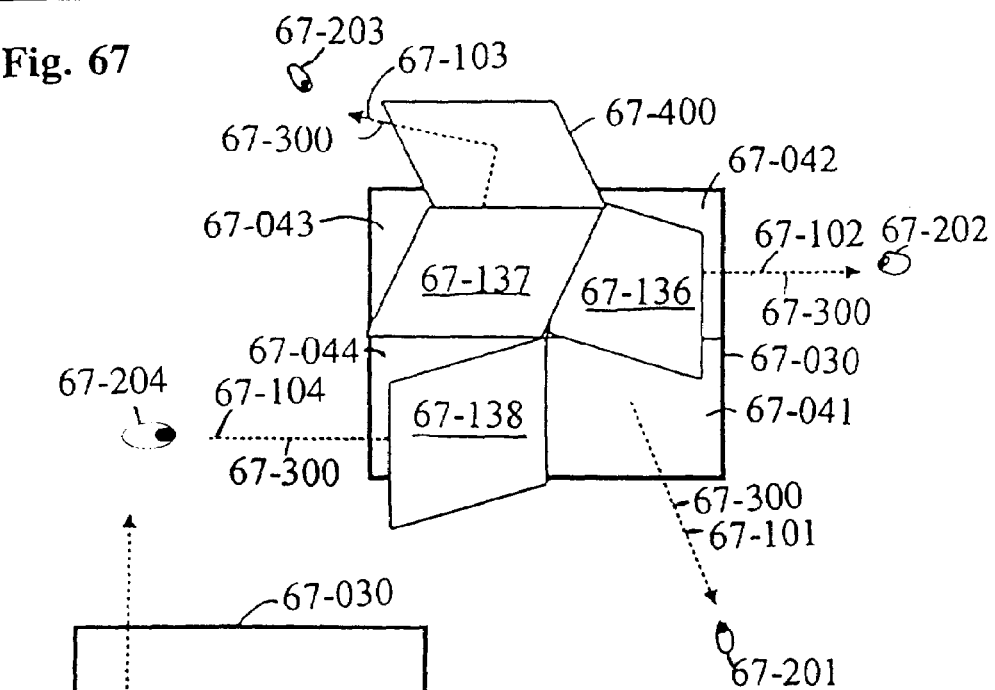
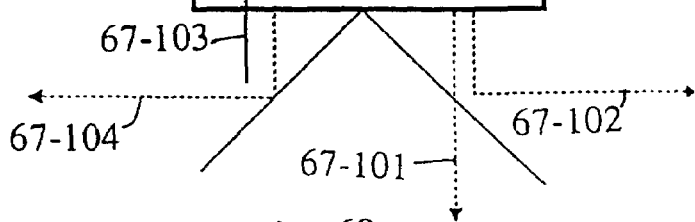
Fig. 68
Fig. 69

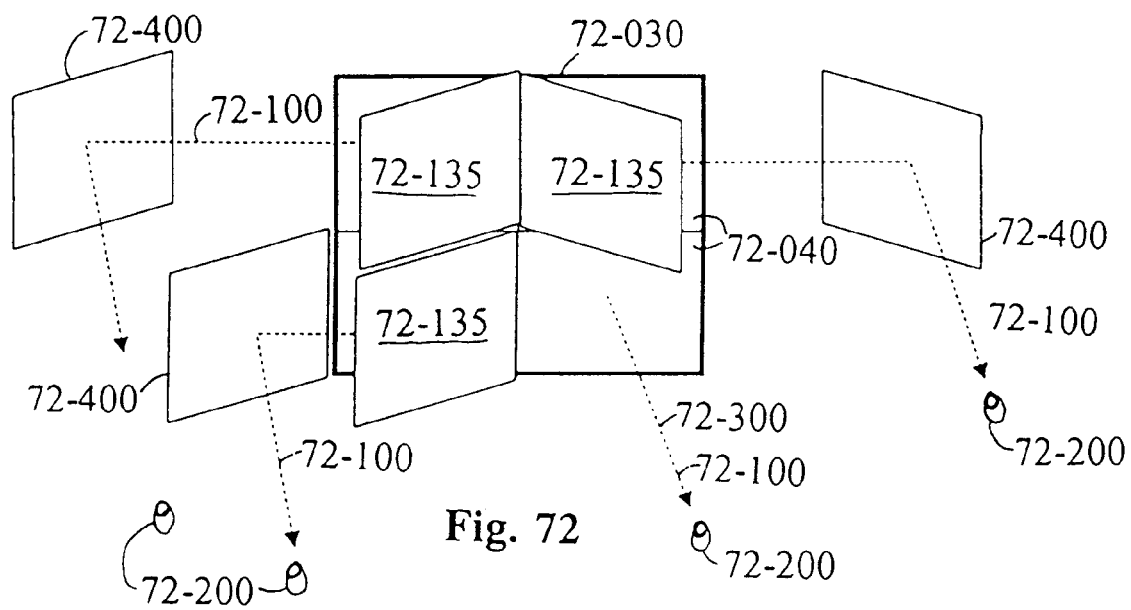
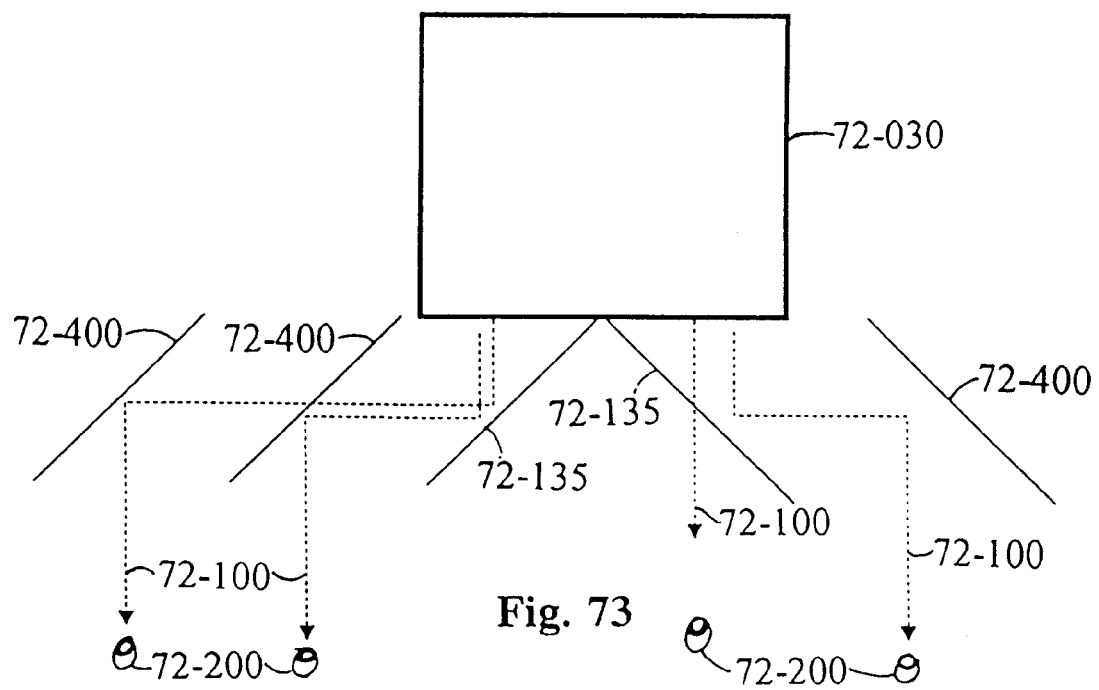

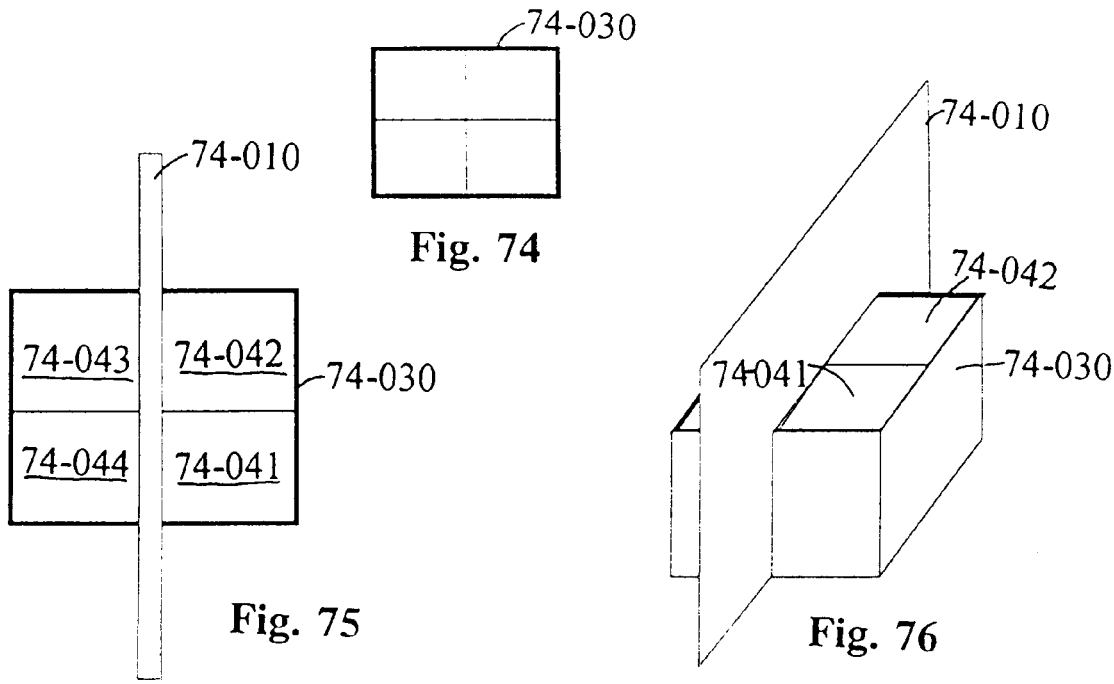
Fig. 74
Fig. 75
Fig. 76
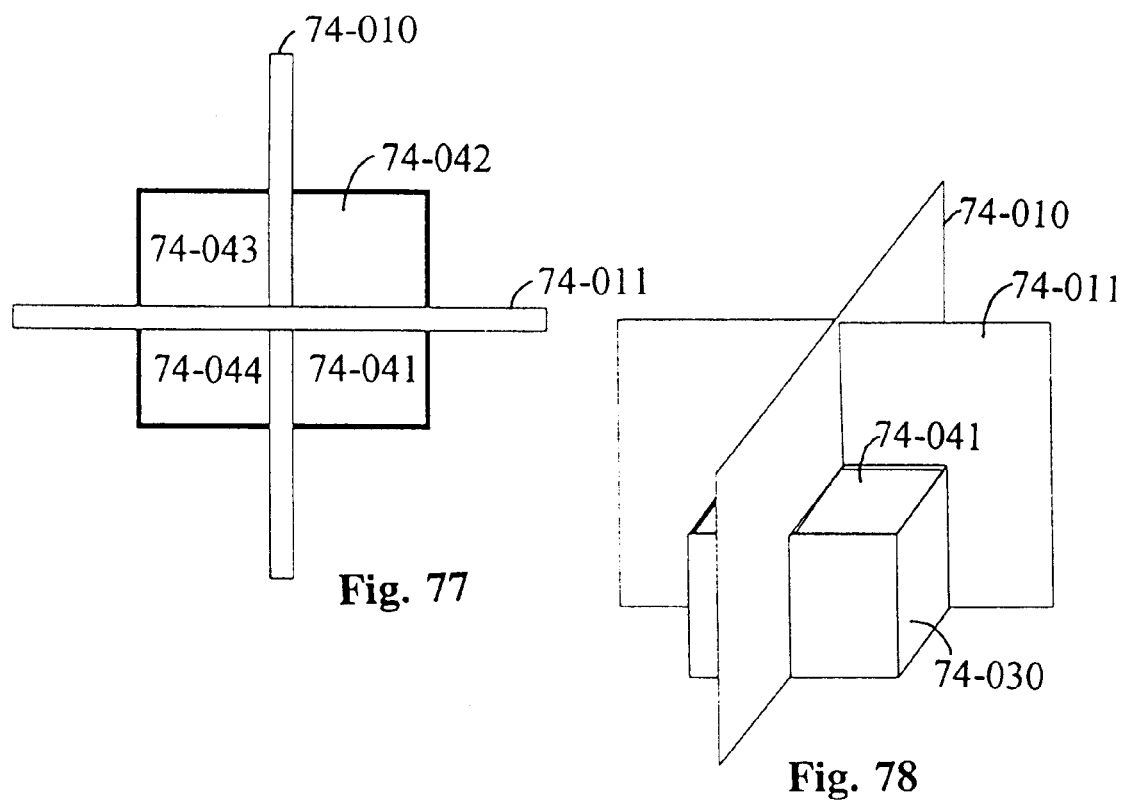
Fig. 77
Fig. 78

WIDE-ANGLE GLASSES-FREE 3-D IMAGE DISPLAY SYSTEM WITHOUT GHOSTING PROVIDING REAL DEPTH AND AGREEMENT BETWEEN ACCOMMODATION AND CONVERGENCE

CROSS-REFERENCE TO RELATED APPLICATION

This application is a continuation of U.S. patent application Ser. No. 11/384,215, issuing as U.S. Pat. No. 7,492,523, which is a divisional of U.S. patent application Ser. No. 10/045,830, filed Oct. 20, 2001, issued as U.S. Pat. No. 7,016,116, which is a continuation of U.S. patent application Ser. No. 08/774,569, filed Dec. 31, 1996, issued as U.S. Pat. No. 6,310,733; the aforementioned application claiming priority benefit under 35 U.S.C. § 119(e) from U.S. Provisional Patent Application 60/023,677, filed Aug. 16, 1996, the entire disclosures of each of the aforementioned documents being herein incorporated by reference.

BACKGROUND OF THE INVENTION

The present invention relates to image display systems, including technology for the creation of aerial real images and other three-dimensional (3-D) effects. More particularly, the present invention involves improved imaging systems, especially useful for computer displays and videoconferencing. More particularly, the present invention involves improved imaging systems, capable of providing multiplane images from video or other sources that simulate the perception of 3-D real depth. The present invention also has the capacity to provide, simultaneously or alternately, multiple images such as for multiple players of a video game.

Numerous attempts have been made over several decades to devise a practical system for 3-D video, as well as 3-D photography in general. The prior art discloses no satisfactory methodology that produces affordable 3-D imaging of an acceptable quality. Additionally no method has been devised for transmission of 3-D images over conventional bandwidths.

Three-Dimensional Imaging Techniques by Takanori Okoshi (1976) analyzes virtually every 3-D imaging method ever devised to that date. Since that time, most 3-D imaging technologies that have been developed use the technologies disclosed in Okoshi's book, and no radically new approaches have been proposed. When discussing the prospects for 3-D television, Okoshi calculated that the bandwidth required to transmit a Lenticular-Sheet 3-D Image, that is the lowest bandwidth required for an autostereoscopic 3-D picture, would be 750 MHz. This corresponds to about 125 of today's conventional TV channels.

Okoshi's analysis shows that neither he nor anyone else knew how the bandwidth requirement could be reduced enough to transmit 3-D video, nor that anyone could imagine what kind of display device could be devised to show it. Okoshi predicted that the next generation of television broadcasting would feature high-resolution, wide-screen display that gave only an "illusion" of depth sensation. To support his prediction, Okoshi cited the beginning of an "epoch" in movies when Cinerama was introduced. Cinerama was a two-dimensional (2-D), curved, wide-screen technique. According to Okoshi, the popularity of Cinerama resulted in a dramatic decrease in efforts to develop other forms of 3-D.

The experience of 3-D is created in the presence of four conditions. The first condition consists of what are collectively called 2-D cues. These cues mainly consist of objects getting smaller, higher, closer together, dimmer, less distinct, less contrasty and less colored as they get further away, as well of course as the fact that foreground objects block the view of background objects. These cues are recorded and reproduced in the course of standard 2-D image recording.

The second condition is parallax. Parallax occurs when a change of position of the viewer produces a different view in which background objects previously hidden by foreground objects become visible. Conventional 3-D stereo techniques lack an ability to convey parallax, but although parallax is not absolutely essential for a viewer to experience 3-D, its presence adds a great deal of realism to 3-D imaging.

The third condition is lateral binocular disparity. This means that the lateral (horizontal) relationship between at least two objects in the scene is different for each eye. This results in different amounts of convergence of the eyes to form a single perceived image of each different object in the scene. It can be reproduced by recording images of a scene from two (or more) different points of view.

The fourth condition is depth disparity, in which at least two objects in the scene are not in focus to the eye at the same time. Thus, accommodation or re-focusing of the eye is required when moved from one such object to the other. This phenomenon, present in real life, is not reproduced with conventional 3-D imaging techniques. It requires focusing of at least two different components of a scene into at least two different depth locations in space.

The inventor has found that this condition is very important because, as the brain acts to refocus the eyes from one depth to the other, it experiences the perception of true depth. Lack of the depth disparity phenomenon leads to eye strain and headaches after extended periods of viewing in current 3-D imaging systems, because of the conflict between accommodation and convergence. Preferably these four conditions correlate to one another when viewing a 3-D image so as to provide the same relationships found when viewing a real life scene.

The popularity of Cinerama, as mentioned above, is especially interesting because it was only a 2-D image projected on a very wide curved screen; yet it produced a realistic depth-containing experience. The effect indicates that something about the display was providing the brain with depth information.

The depth cues present in a Cinerama display were very important and compelling. First of all, a variety of 2-D depth cues were present. As an object gets farther away, it gets smaller, higher up in the frame, less distinct, less color saturated, less contrasty and less bright. Object points get closer together as they recede, such as train tracks appearing to get closer together as they get further away, and foreground objects obscure background objects. Second, the objects depicted on screen were often small compared to the huge screen size. Third, the extremely wide screen necessitated that the viewers focus their eyes differently, the process known as accommodation, when viewing objects at the center of the screen as compared to when they viewed objects on the sides of the screen. This effect was more pronounced the closer one sat to the screen and the smaller each on-screen object was. If an object was nearly as big as the screen, the brain would reduce the viewer's perception of apparent depth. This is because different parts of such an object appeared at different depths, depending on where each part was on the wide screen. However, the brain knew that the entire object should be at only one depth. This caused the brain to lose depth perception with regard to that object and just see it as a curved flat object.

In real life, accommodation is an extremely important, but almost completely ignored, part of what causes depth perception. The eyes constantly refocus on nearer and farther objects in a scene. When focusing on objects at one distance, objects at another distance are seen as being out of focus, and the brain adjusts lens and corneal muscles to bring into sharpest focus whatever one concentrates on. Due to our eyes' limited depth of field, we can never get all objects (or even all parts of any single three-dimensional object) into best focus at any one time. As we shift attention to blurrier objects in an attempt to sharpen their image for clearer recognition, we keep refocusing. Objects keep shifting from clear to blurry, creating a scene in constant flux made of a mix of sharper and blurrier images which keep changing their focus. This effect is even observable with one eye, creating the basis for limited "monocular depth perception."

While observing a scene, the brain also constantly shifts attention from nearer objects to farther objects in the attempt to merge all perceived double images. When viewing an object at a selected depth, the two eyes are aimed at that object so that the two views of that object overlap precisely, creating a single image in the brain. This is called convergence. At the same time, other objects at other depths do not line up and therefore appear to the brain as double images. As the brain constantly shifts attention among nearer and farther objects, it experiences a continuing flurry of single and doubled images. Through life experience, the brain forms a correlation between each degree of accommodation and each degree of convergence in response to viewing objects at different depths.

In stereoscopy and autostereoscopy, as the object gets farther from the plane of the image, in front or behind, the convergence of the eyes increases, but unlike reality, the accommodation stays the same (since all image information is in one plane). The farther away from the image plane an object is, the larger is the discrepancy between accommodation and convergence. The discrepancy causes the brain to change the convergence and accommodation of the eyes back and forth to create a match between them based on past experience.

In such an experience, fatigue, eyestrain, and headaches result since the objects are, at least in part, not really in focus in the same plane as convergence makes them appear. Also, the further out of the plane of best focus the image appears due to convergence, the harder it is for the viewer to see a 3-D image instead of a double image.

With Cinerama, although depth appeared limited, the appearance of depth was striking because accommodation and convergence seemed to match when looking at different parts of the big screen, because the eyes had to both converge differently and refocus.

This important component of three-dimensional perception (varying accommodation) is not reproduced in prior art 3-D imaging systems. This is because most 3-D imaging is done using stereoscopy or autostereoscopy. In stereoscopy, two images are recorded, one corresponding to the left-eye view of the scene and the other corresponding to the right-eye view. These two images are different, providing what is called "binocular disparity." This difference forces the viewer's eyes to aim at objects at each selected depth to see them properly. In stereoscopy, each eye is made to view only its corresponding image through the use of an optical device such as red and green glasses, polarized glasses, or lenses which focus one image into each eye, such as in a stereoscope.

Autostereoscopy directs the corresponding images to the eye without the use of any optical device near the person. Instead, optics are located near the images, restricting the angle of view of each image so that each eye still sees only one of the two images. This has been done with lenses, prisms, and light-blocking barriers, for instance. Since the angle of view for each image can be made very narrow, many images can be taken from many angles and viewed one at a time as one moves one's head. This provides an aspect of 3-D perception, called motion parallax, not available from stereoscopy. With motion parallax, one can look around foreground objects to see previously hidden background objects. The images displayed using stereoscopy and autostereoscopy, however, are all in one plane, so the constant refocusing and perception of a mix of sharp and blurry images—which the inventor has found to be so important to the real 3-D experience—is absent. Due to this lack of variable accommodation cues, stereoscopy and autostereoscopy present another difference from reality that is significant.

When the two eyes receive different views of a scene, the brain overlaps them, trying to line the images up exactly. However, two different images viewed from two different angles cannot line up exactly. This binocular disparity gives the brain information about the depth of (or distance to) an object being viewed. If one holds one's thumb in front of some farther object, and focuses on the thumb with both eyes open, one will observe a double image of the farther object. A shift in attention to the farther object causes a double image of the thumb to be observed.

As long as there are some changes in both convergence and accommodation, the viewer's brain perceives a scene as not flat. Once a scene is observed to have depth, a variety of perspective cues complete the illusion of depth, and inform the viewer at what depth each object appears to be.

SUMMARY OF THE INVENTION

An image display system provides a viewer with an experience of three-dimensional imagery by presenting a composite image made up of at least two separate images. The system includes at least first and second image sources, a beam combiner, and a "background-image-occluding element" which prevents background imagery from being seen through foreground image elements. The system presents the image from one of the image sources, containing background image information, at a distance from the viewer which is greater than the distance from the viewer to the other image presented from the other image source, which contains foreground image elements. The "background-image-occluding element" is positioned at the same optical distance from the viewer as the image containing foreground image elements, eliminating any parallax error between them, enabling the foreground image elements to always occlude appropriate areas of the background image, regardless of the viewer's position or the background image brightness relative to the brightness of foreground image elements.

Also disclosed herein is a 3-D display system based on the inventor's realization that an observer (interchangeably referred to herein as a viewer or player) experiences a perception of 3-D as seen in real life when presented with as few as two planar images at different depths. An advantage is that the many of the embodiments disclosed herein present such images at low cost and in a manner that is remarkably easy to use. Moreover video images in accordance with the present invention can be transmitted using significantly less bandwidth than convention 3-D imaging techniques.

In one embodiment, the present display system employs an apparatus that presents two or more images in positions such that each of the images is spatially separated from each of the other images along a co-axial line-of-sight for a viewer (i.e.

co-aligned). A viewer looking at the resulting display perceives a three-dimensional scene. The display of the present invention uniquely provides traditional 2-D cues, parallax, lateral binocular disparity and depth disparity, with unparalleled efficiency.

Many of the embodiments described herein provide (at least) a foreground image and a background image which are co-aligned, and employ at least one optical element that acts as a beam combiner. The beam combiner is optionally a reflective element such as a semi-silvered mirror or a refractive element such as a Fresnel beamsplitter (herein called a Fresnel beam combiner because of the way it is used) or the Fresnel semi-prism disclosed hereinbelow.

The foreground image and the background image are optionally generated to display a foreground image plane that is imperceptible or at least transparent except where there are objects in the foreground image plane. This quality of transparency allows objects on a background image plane to be seen when the are not obscured by such foreground objects. However, the images are preferably related in a manner such that objects in the background image are not perceptible through objects on the foreground image plane that are supposed to be opaque (by which the inventor means non-transmissive in the wavelengths of interest). Disclosed herein are various techniques and embodiments for the formation of such images for this display system.

Some versions of the image display apparatus employed in the present invention require the use of at least one lens which is used to create a real image (as distinguished from a virtual image) as part of the display. Some versions present virtual images.

In a general form, the present invention provides an image display system comprising a first image source, a second image source, and a beam combiner, wherein these elements are arranged so as to present to a viewer a foreground image from one of the image sources, and a background image from the other of the image sources, the background image being presented at a greater distance from the viewer than the foreground image. In accordance with the invention, the viewer perceives the foreground image and the background image as part of a scene having depth. Generally the foreground image and background image are co-aligned to the line of sight of a viewer.

Optionally, when the first and second image sources are portions of a composite image source (e.g. a television screen or monitor), such a display system also includes a reflective element disposed to reflect the image of the second image source to the beam combiner. In that event it is frequently desirable to provide an optical element between the beam combiner and the viewer to modify the aspect ratio of the foreground image and the background image. Desirably the optical element is a cylindrical mirror or a cylindrical lens.

Various embodiments of the present invention involve the use of a housing which is adapted to be fastened to a conventional television set or monitor and which contains the optical elements of the present invention, the housing providing an aperture through which a viewer observes the display. Such a system desirably comprises a housing and a beamcombiner within the housing, wherein the housing has a viewing aperture, a first image aperture, and a second image aperture; wherein the first image aperture is adapted to a first image source; wherein the second image aperture is adapted to a second image source; wherein the first image aperture, the second image aperture, and the beamcombiner are so disposed as to present to a viewer through the viewing aperture a foreground image from one of the image sources, and a background image from the other of the image sources, the background image being presented at a greater distance from the viewer than the foreground image.

It is a feature of preferred embodiments of the present invention to provide means for minimizing bleed-through of the background images onto a foreground image, wherein the foreground image appears translucent or ghostly. Techniques disclosed herein include controlling relative brightness of the two images, using a approach to dim out portions of the background image that are occluded by the foreground image. To improve the presentation of foreground objects by minimizing image bleed-through, a mask is desirably interposed between the background image source and beamcombiner at a position that is the same distance from the beamcombiner as the foreground image source, so that the mask displays a silhouette of foreground objects that appear coincident with the foreground image source, acting to mask portions of the background image from the viewer. The mask may be a light valve, e.g. an LCD.

In some embodiments a lens may be interposed between the first image source and the viewer so as to present at least one of the foreground image and the background image as a real image. The lens may be a Fresnel lens or a lenserF lens as described hereinbelow. Desirably they have opaque rises as discussed below.

Some embodiments employ the optics of a conventional a projector, e.g. a slide or movie projector, to produce the 3-D effects of the present invention. A mirror is placed far enough out from the projector exit lens to divert portions of the projector's output to different projection screens. A portion of the beam is reflected to a projection screen. Another portion of the beam is caused to fall on a second projection screen, which may be disposed at a right angle from the first projection screen. Preferably, a lens is used to re-focus one of the portions, since the screens are at different distances from the projector. Each portion reflects from its screen to a beamcombiner whereby the portions are aligned. One portion is transmitted while the other portion is reflected in the same direction. Once the foreground and background images are so aligned, they are redirected, refocused into real images, and optionally magnified, corrected for aspect ratio, for distortion, etc., as elsewhere taught in this document.

Another aspect of the present invention is a method for displaying images to a viewer by simultaneously presenting to both eyes of a viewer a first image that is generally planar, simultaneously presenting to both eyes of a viewer a second image that is generally planar and is co-aligned with the first image along an axis that is in the general direction of the viewer but at a perceptibly different distance from the viewer than the first image, wherein the image that is at a distance closer to the viewer depicts objects in the foreground of the displayed images and the other of the images depicts objects in the background of the scene. A viewer observing the images perceives the depicted objects as part of a scene having real depth.

The method desirably applies to moving images.

The method may be one wherein the first image and second image are presented alternatingly to a viewer with a cycle that is within the time frame of persistence of vision; or the first image and the second image may both be presented to the viewer simultaneously.

In many embodiments of this invention, the first image and second image are each presented from an image source derived from a portion of the same television screen.

In some embodiments, the displayed images are real images of first and second image sources. In others the displayed images are virtual images of first and second image sources. In yet others, the first image is a real image of a first image source and the second image is a virtual image of a second image source.

In still others, the first image is a real image of a first image source and the second image is a second image source being viewed directly. And in still others, the first image is a virtual image of a first image source and the second image is a second image source being viewed directly.

Exaggeration of traditional 2-D cues within the foreground image and background image can greatly increase the sensation of depth. Use of traditional 3-D techniques, like stereoscopy, on the foreground and background image can also greatly increase the sensation of depth. In accordance with an aspect of the present invention, images are presented using any or all of the following enhancement techniques: exaggerated perspective, enhanced difference in brightness between foreground and background objects, presentation of background objects higher in the frame than corresponding foreground objects. Also, the foreground image plane, the background image plane, or both, are preferably tilted away from the viewer to enhance depth perception. Another enhancement technique is accordance with the invention is to present an additional floor-plane image to the viewer.

In one embodiment, the present display system employs an apparatus that presents two or more images in positions such that each of the images is spatially separated from each of the other images along a co-axial line-of-sight for a viewer (e.g. co-aligned). A viewer looking at the resulting display sees data which has value when viewed simultaneously. Software and hardware of the present invention produce image data which has value when viewed simultaneously.

Various means for generating information about images are disclosed in accordance with the present invention. For display on a TV screen or monitor, each source image is divided into at least two image signals. These separate image signals produce separate images on different portions of a single image display device, which are then optically combined to form a composite image scene or other display, or are used to synchronously generate a plurality of images, each on a separate display device, which are then optically combined to form the composite image scene or other display.

Image capture techniques may be employed in accordance with the present invention to capture live images. Using a first image capture technique for capturing images to be displayed using the present invention, a first camera is directed at one or more foreground objects in a scene to be captured. A second camera is positioned behind or above the foreground subject matter and directed at the scene to be captured. Techniques are presented to minimize or eliminate the background information from the foreground image. Focus detection algorithms may be employed to eliminate the out-of-focus subject matter from each image.

Two or three cameras horizontally displaced from one another, may be used: one to capture the scene from the left, one to capture the scene from the center, and one to capture the scene from the right. They provide a composite full view of all background objects behind the one or more foreground objects in the image.

Another multicamera technique comprises two horizontally-displaced cameras arranged in parallel fields of view at the same Z location. Matching objects from each image are recognized using computer matching techniques, and the distance from the image of each object to the edges of the frame in each of the two images are calculated to determine depth. At infinity, all objects overlap, but as objects get closer to the cameras, the corresponding images become separated by greater distances.

Techniques as have been employed in colorization of motion pictures (in which the computer tracks a selected object or area from frame to frame) may be used to create the foreground image frame. Where real-time processing is not an issue, foreground objects can alternatively be selected by hand. The same techniques can be used to produce a background image devoid of foreground objects.

A single-camera technique of the present invention for identifying foreground and background objects employs two lenses which are focused on the same scene through a single aperture by way of a beamsplitter One lens is focused on the foreground and the other is focused on the background, and each lens focuses an image on its own image detector. Using techniques which discard out-of-focus components, foreground and background objects are identified and eliminated from each of the foreground and background images as required. Fill techniques may be used to reconstruct background areas occluded by foreground objects.

One technique employs a camera whose sole purpose is to capture foreground objects. It is set for a narrow depth of field, and only in-focus objects are selected from the scene foreground. Another technique to select foreground images in real time is to analyze the spatial frequency of the various portions of the image. Spatial frequency is highest for in-focus objects. A spatial frequency threshold is selected, and groups of pixels having a spatial frequency above threshold are determined to belong to foreground objects.

Contrast detection may be used for this purpose as well. Highest contrast areas are generally found in foreground objects. Filtering techniques are employed to look for the highest difference between dark and light areas of an image.

Because objects in the foreground of an image generally move more quickly than objects in the background, frame-to-frame motion detection discriminates between foreground objects and background objects. Another characteristic that can be used is color saturation, which decreases as objects recede into the background. Others include brightness detection, since closer objects are usually brighter. Optical subtraction may be employed with these techniques to eliminate portions of the image that are the same in successive frames, resulting in an image of foreground objects. Different areas of the background will be blocked in successive frames of the image. By storing the successive frames, the blocked background areas may be reconstructed by using selected background data from different frames.

Various ranging techniques may be employed during capture of live images, as disclosed hereinbelow. Another scanning technique applicable to the present invention is to scan the scene with a laser beam and detect the reflection from objects in the scene. The reflected spot size is proportional to the distance traveled by the reflected beam. Another technique employs a scanned laser beam that is pulsed for short periods of time. The laser is configured to have a coherence length within which all foreground objects reside. When the beam is reflected from an object in the scene, the reflected beam is received and recombined with a reference beam from the same laser, and an interference pattern will develop only for objects which reside within the coherence length. A detector is used to detect the presence of the interference pattern. This technique identifies objects in the foreground. If the camera used is scanning the scene in synchronization with the laser beam, each pixel in the scene can be identified as coming from a foreground object or a background object by storing an additional bit with the pixel. Known object-detection techniques, such as analyzing pixels to find boundaries (large changes) which define the edges of an object, can be utilized to store Z-coordinate information for entire objects rather than for each individual pixel, reducing the amount of Z-coordinate data that must be stored or transmitted for each frame.

In accordance with preferred embodiments of the invention, source images are divided into at least two images, at least one foreground image and at least one background image. Some techniques for dividing source images are known and have been mentioned herein, while others are part of the present invention and have been disclosed herein. When both foreground and background images are displayed on the same display device, the computer or other device writing to the display device must be configured to write the foreground image to a first designated area of the display device and to write the background image to a second designated area of the display device. For example, if a raster-scanned CRT display is employed, the foreground image may be written to the top half of the CRT and the background image may be written to the bottom half of the CRT by supplying the pixel data for the foreground image during the first half of each display frame and supplying the pixel data for the background image during the second half of each display frame.

If the plurality of divided images are formed on a single display device, such as a CRT display, the present invention contemplates employing during viewing optical expansion of at least one of the images to recreate the aspect ratio of the original image. In the event that optical expansion techniques are employed, it is advantageous to display the image compressed in the direction which is to be expanded, e.g., vertically. Such compression allows optical expansion without resulting in an image stretched in that direction.

Resolution enhancement steps may be performed on image data if the image is to be optically expanded to restore aspect ratio. Pixel and line interpolating methods may be employed for this purpose.

The perception that a displayed object is undergoing Z-axis motion, i.e., receding into the background or proceeding into the foreground, may be enhanced according to the present invention by plane-switching techniques. Such techniques include the steps of gradually decreasing the size of the object as it recedes in the Z direction and, at a selected time, moving the image of the object from the foreground image to the background image. Likewise, objects in the background image which are moving in the Z direction towards the viewer may be gradually increased in size and at a selected point are transferred from the background image to the foreground image. This effect may be implemented on a frame-by-frame basis using known image-processing techniques.

Some versions of the image display apparatus of the present invention employ relatively inexpensive lenses, preferably annular lenses disclosed herein, that nevertheless avoid or minimize the objectionable characteristics of scatter, flare, chromatic aberration and spherical distortion that otherwise result from the use of lenses in such display systems. The improvement to optical elements having rises and faces (ones that are stepped, e.g. a Fresnel lens) disclosed herein employs a light-absorptive element adjacent the vertical rises so that the amount of light passing through or reflected from the rises is minimized.

Thus the present invention provides an improved optical element having rise portions and face portions, wherein light transmitting through or reflected from the rise portions is substantially prevented from being seen by an observer viewing an image formed by light passing through the annular lens. More particularly, the rise portions are coated with an opaque light-absorbent material.

The improved optical element may be a refractive optical element, in which event the rise portions are substantially opaque and the face portions are substantially transparent. It may also have an anti-reflective coating. It may, for example, be a Fresnel lens or a Fresnel semi-lens or a lenserF lens, as disclosed hereinbelow.

The improved optical element may be a reflective element, such as an annular mirror.

Various methods of making the improved optical element are part of the present invention. Such methods comprise the steps of producing an optical element having rise portions and face portions, and imparting a light-absorbent coating to the rise portions. The optical element may have a series of annular grooves, or the grooves may be linear. The element may be refractive, in which event an antireflective coating may also be applied, or the element may be reflective.

The light-absorbent coating may be imparted to the rises by applying light-absorbing material to the element and selectively cleaning it so as to leave a coat of light-absorbing material adhering to the rise portions but not to the face portions. Adherence may be enhanced by roughening the rise portions in advance, such as by scratching, scoring or abrading.

Positive or negative photoresist may be used in the process in various ways. A coating of negative photoresist may be applied to the optical element so as to coat all faces and rises, then illuminating the photoresist so that the rises are not illuminated, so that exposed photoresist is only on the faces. Alternative, positive resist can be used, and only the rises illuminated. In either case, the element is then developed to remove the photoresist from the rises, and opaque material that is capable of adhering to the rises is then applied to the element. The photoresist is then removed from the faces by more developing to dissolve away remaining resist together with any of the opaque material coated on it.

Alternatively a coating of negative photoresist may be similarly applied to the optical element, then illuminating the photoresist so that the faces are not illuminated, with exposed photoresist being only on the rises. The element is then developed to remove the photoresist from the rises, and opaque material that is capable of adhering to the rises is then applied to the element. The photoresist is then removed from the faces by developing to dissolve away exposed resist together with any of the opaque material remaining on it.

Alternatively, the photoresist itself may be dark colored or dyed and left on the rises. Negative photoresist may be made to coat the rises selectively by exposing the rises but not the faces to light and then developing the optical element to remove unexposed photoresist. Alternatively, dark positive photoresist may be made to coat the rises selectively by exposing the faces but not the rises to light and then developing the optical element to remove exposed photoresist.

Other means for reducing flare and the like with stepped optical elements that are disclosed herein are also within the present invention.

The present invention also contemplates use of a sandwich of optical elements to provide a compact and lightweight adapter that can be placed in front of a television screen or monitor. The sandwich comprises a Fresnel semi-lens of the present invention, which is aligned with a Fresnel beam combining element. The Fresnel beam combining element is preferably a commercially available Fresnel beamcombiner or a Fresnel semi-prism of the present invention. The result is that the viewer sees two co-aligned images, one at about the plane of the TV screen and another that is a few inches behind it. If aspect-ratio correction is desired, the image source is compressed on the TV screen and a Fresnel cylinder lens is disposed in front of the aforesaid sandwich.

Alternatively a holographic optical element may be constructed (using known techniques) with the equivalent functionality of the two or three subelements of the Fresnel sandwich described herein to accomplish the same tasks.

An embodiment of the present invention is a "narrow-profile" single image source display system. This embodiment uses numerous smaller mirrors which decreases the distance the optical elements protrude from the image source. The display is split into numerous foreground and background areas. Each top portion is the foreground portion, and each bottom is the background portion. Each set of portions is co-aligned. The resulting output is striped because no light passes directly from any background portion. An optional lenticular expansion array is used to expand each image set stripe so gaps or blank stripes are not presented to the user.

A further aspect of the invention disclosed herein is a multiplayer video game adapter. Such an embodiment allows two or more players to share a single monitor and yet have mutually independent and "secret" 3-D views of a computer screen or the like. Such a multi-player image display system would comprise two or more of the 3-D image display systems of this invention, wherein each image source (having a foreground and a background image) is a portion of an overall image source, e.g. a single monitor, and would further comprise means for reflecting each of the foreground and background images respectively from a specified one of the image sources to a specified one of the players.

An additional aspect of the multiplayer video adapter of the present invention is that a simplified version, presenting multiple 2-D images, may also be produced.

The techniques disclosed herein also include the fabrication of a virtual monitor of the present invention that minimizes glare that would otherwise reflect from the screen of a cathode ray tube (CRT), provides improved security through controlled angle of view, and reduces exposure to radiation.

Additional advantages and features of the present invention will become apparent from the detailed description presented hereinbelow.

BRIEF DESCRIPTION OF THE DRAWINGS

FIG. 16 is a view of a foreground image of two people.

FIG. 17 is a view of the foreground image in FIG. 16 which exaggerates the perspective cues in accordance with the invention.

FIG. 18 is a view of a foreground image and a background image.

FIG. 19 is a side view of foreground image and background image wherein the background image is larger than the foreground image.

FIG. 46C is a plan view of an optical element of the present invention.

FIG. 46D is a perspective view of two optical elements of the present invention.

FIG. 67 is a view of an image source.

FIG. 68 is a plan view of another multiplayer imaging system of this invention.

FIG. 69 is a perspective view of the multiplayer imaging system in FIG. 68.

FIG. 72 is a perspective view of another multiplayer imaging system of this invention.

FIG. 73 is a plan view of the multiplayer imaging system of FIG. 72.

FIG. 74 is a view of an image source.

FIG. 75 is a plan view of an imaging system of this invention.

FIG. 76 is a perspective view of the imaging system of FIG. 75.

FIG. 77 is a plan view of an imaging system of this invention.

FIG. 78 is a perspective view of the imaging system of FIG. 77.

DETAILED DESCRIPTION

Real-Depth 3-D Imaging

The present invention provides what may be termed real-depth imaging, since there are real differences in depth between images of objects in a scene. In accordance with the invention, different objects at different depths in a scene are presented in different planes in space, one behind the other. The object areas of each plane are perceived as opaque, and the non-object areas are clear to allow observation of the images in more distant planes.

The inventor's experimentation revealed that images created in only two planes provide a satisfactory real-depth experience. The inventor's discovery that only two images, projected in different planes, are needed to achieve a 3-D experience greatly simplifies from those of the prior art, the system necessary to produce such images. Moreover, the information content (i.e. the bandwidth) necessary to transmit such images is at a level which can be readily transmitted via a conventional TV channel or over the Internet. This discovery provides a solution to the previously mentioned dilemma that had been identified by Okoshi.

However, it is also within the scope of the present invention to utilize more than two planes, when desired to achieve even greater realism in a resulting display.

In designing and fabricating embodiments of the present invention, those skilled in the art of optical displays have reference to numerous books and catalogs which embody the conventional teachings and provide information about commercial sources of optical elements and supplies, and for conciseness of presentation need not be repeated in detail here. By way of example, a four-volume reference work collectively entitled The Photonics Directory (42nd International Edition 1996) is available in print and on CD ROM from Laurin Publishing Co., Inc. (Pittsfield, Mass. Photonics@MCIMail.com). Various suppliers of optical elements publish catalogs which not only identify their products but also helpfully summarize how to use them, for example Rolyn Optics Company (Covina, Calif.) Catalog 195; Oriel Corporation (Stratford, Conn.) Three Volume Catalog; Edmund Scientific (Barrington, N.J.) 1996-1997 Optics and Optical Instruments Catalog. These publications and all other references mentioned in this document are hereby incorporated by reference.

In a first embodiment of the invention, a foreground image is formed on a first plane and a background image is formed on a plane located more distantly from the observer. The images are generally co-axial from the vantage point of the observer. The foreground image presents selected objects on a black surround. This black area appears as a blank or transparent space through which the background image is seen.

Figure 1:
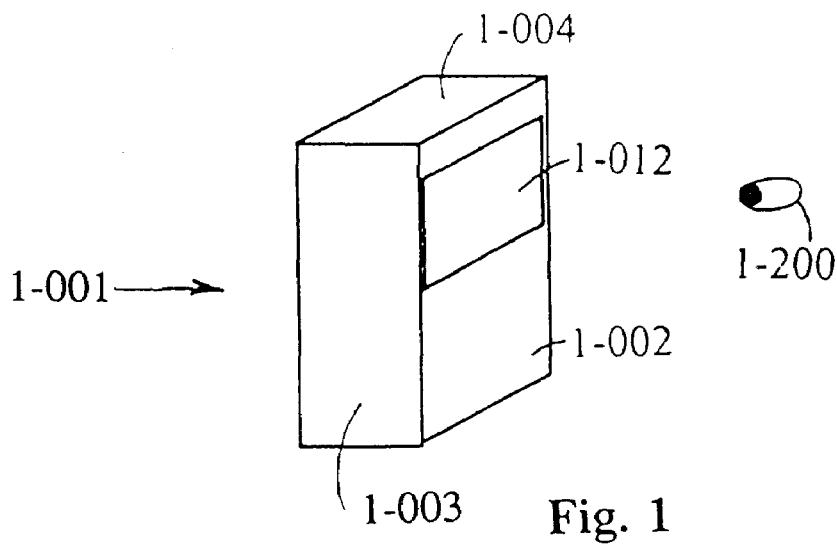
FIG. 1 is a perspective view of a 3-D imaging device of this invention. (Each of the 3-D imaging devices depicted herein is an embodiment of the present invention.)
Figure 2:
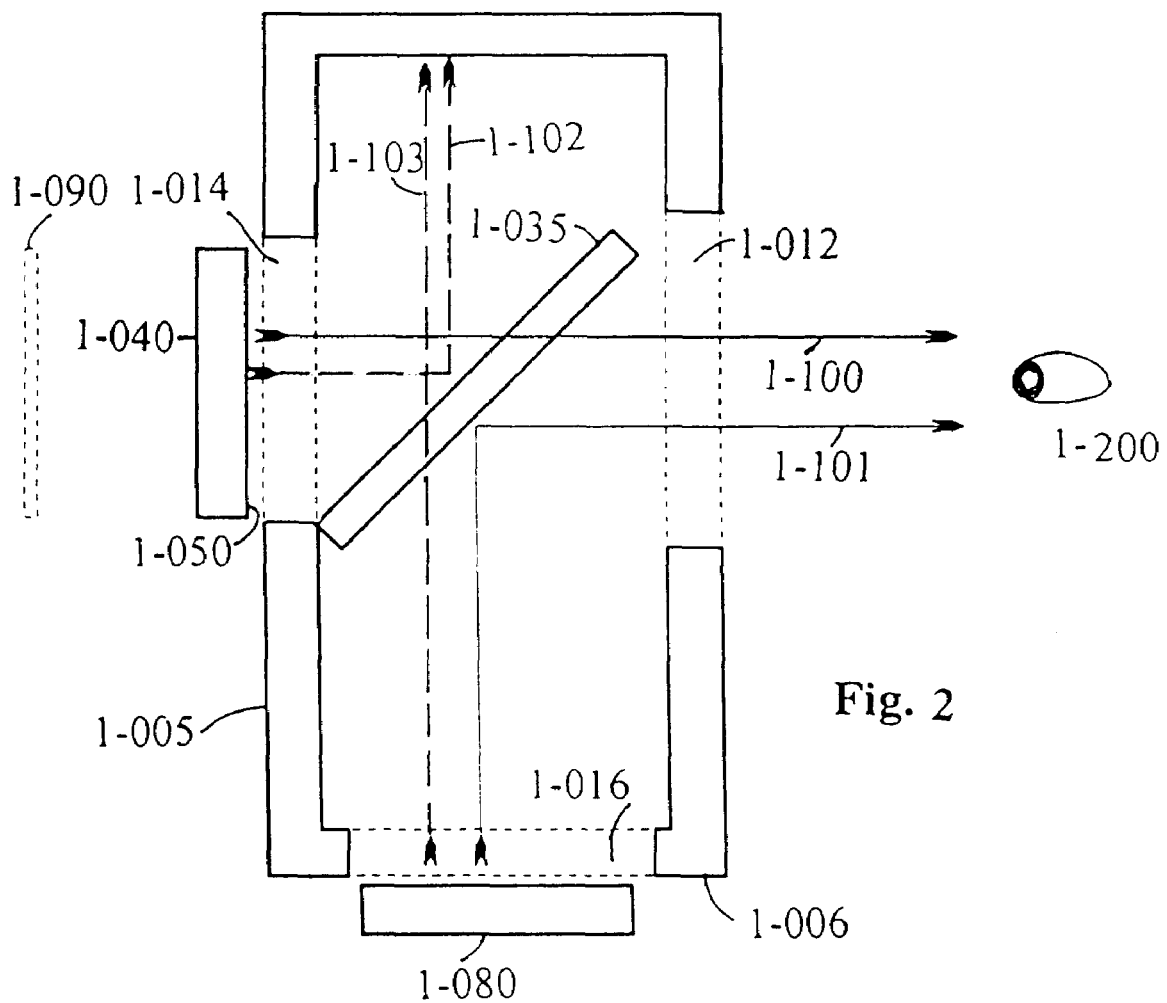
FIG. 2 is a cross-section view of the embodiment represented in FIG. 1.

FIGS. 1 and 2 show an embodiment of the present invention. FIG. 1 is a perspective view thereof. FIG. 2 shows a cross-sectional view of the housing 1-001. The housing 1-001 has a front face 1-002, a left face 1-003, a top face 1-004, a rear face 1-005, and a bottom face 1-006. The housing 1-001 has on its front face 1-002 a viewing aperture 1-012 through which a viewer 1-200 (diagrammatically represented as a stylized eye, although it is to be understood that both eyes of the viewer are typically open) can perceive a 3-D scene.

The housing 1-001 has on its rear face 1-005 a foreground aperture 1-014. The housing 1-001 has on its bottom face 1-006 a background aperture 1-016.

Disposed within the housing 1-001 is an optical element 1-035, such as a partially reflective (e.g. semi-silvered) mirror. In use, the foreground aperture 1-014 is positioned to permit light from a foreground image source 1-040 (e.g. a TV monitor) to pass into the housing. A foreground image 1-050 is shown on the foreground image source 1-040. The foreground image 1-050 is seen directly by the viewer (i.e. without reflection) through the partially reflective optical element 1-035. In use, the background aperture 1-016 is positioned to permit light from a background image source 1-080 (e.g. another TV monitor) to pass into the housing. A virtual background image 1-090 appears displaced behind the foreground image 1-050.

For illustrative purposes, FIG. 1 shows a first light ray 1-100 and a second light ray 1-101. The first light ray 1-100 passes from the foreground image source 1-040 through the foreground aperture 1-014, directly through the partially reflective optical element 1-035, and then through the viewing aperture 1-012 to a viewer 1-200. (Not shown is that some of the light from the foreground image 1-050 is reflected upwards within the housing by the optical element 1-035, since it is semi-reflective. The interior of the housing is light-absorbent, e.g. painted black or covered with black velvet, to prevent such stray light from interfering with the intended images.)

The illustrated second light ray 1-101 passes from the background image source 1-050 through the background aperture 1-016 to the semi-reflective optical element 1-035. The second light ray 1-101 is then reflected from the semi-reflective optical element 1-035 through the viewing aperture 1-012 to a viewer 1-200. Light (such as is represented by the second light ray 1-101) which comes from the background image source 1-050 is perceived by the viewer 1-200 as coming from the location of the virtual background image 1-090, even though it is in fact coming from the background image source 1-080. Note that the distance from the background image source 1-080 to the middle of the optical element 1-035 is the same as the distance from the virtual background image 1-090 to the same point on the optical element 1-035.

The aforesaid optical element 1-035 acts as a beamcombiner, aligning the foreground image 1-050 and the virtual background image 1-090. Some of the light 1-102 and 1-103 reflected or transmitted is misdirected in this embodiment by optical element 1-035 and is absorbed within the housing 1-004. A viewer 1-200 looking at the foreground image 1-050 and the virtual background image 1-090 will perceive both images as being co-axial along the same line-of-sight, but at different distances from the viewer 1-200. Objects located on foreground image 1-050 are physically closer to the viewer 1-200 than objects on the virtual background image 1-090.

Because the foreground image 1-050 and the virtual background image 1-090 are in different locations in space, a viewer 1-200 who bobs her head will notice parallax between the foreground image 1-050 and the virtual background image 1-090. In accordance with the inventor's discovery, the inventor has found that the typical viewer tends to perceive a foreground image and background image formed this way as parts of an overall scene having real depth.

The foreground image is presented in greater brightness than the background image. Hence the foreground image appears solid, appearing to obscure or block the background image as it would if it really were solid.

Note that when the source of the foreground image is a transparency held in place before a background image, the blank surround is desirably left clear at printing. The surround is desirably blank when the foreground image is a light valve held in place before a background image, or when multiple light valves are held in series to create multiplanar effects.

In the case of other image sources, like a CRT or a photograph, the blank surround is desirably black, so as not to interfere with the viewer's perception of the background image.

Image sources, as contemplated by the present document, are any source of imagery, such as CRT's, plasma displays, stereographic 3-D images, television monitors, LCD's, transparencies, photographs, illuminated objects, flat or curved front or rear-projection screens on which images are projected, or any portion thereof.

In accordance with the present invention, a scene to be viewed is preferably divided into at least two images, presented on two co-axial planes. Two-dimensional cues, including perspective and background object occlusion, are provided in each plane. A viewer observing the images continually shifts attention from plane to plane, simultaneously changing accommodation and convergence. As in real life, a scene presented by the 3-D display system of the present invention appears to be a mix of sharper and blurrier images and single and doubled images which keep shifting. If the viewer moves or shifts position, both horizontal and vertical parallax are perceived. At all times, in all viewing positions, the two eyes of an observer see different perspective views, creating binocular disparity that further stimulates the brain into perceiving a real-life depth experience. Surprisingly, a scene displayed this way with perspective cues appears to have continuous depth and not to be confined to only two planes, regardless of whether such a scene is moving or still.

Figure 3:
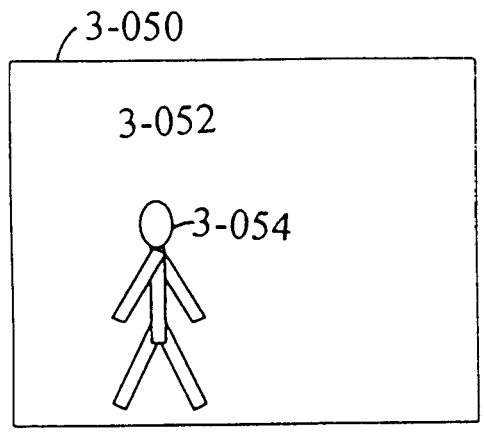
FIG. 3 is a view of a foreground image which consists of a person.
Figure 4:
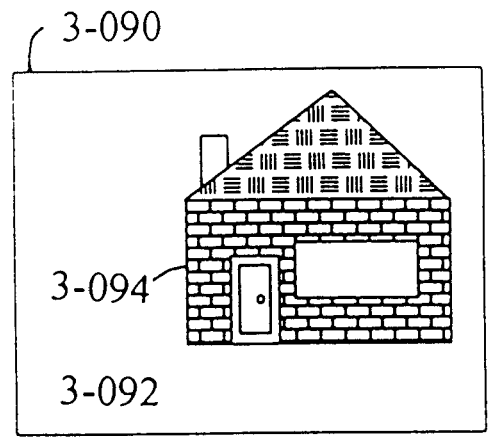
FIG. 4 is a view of a background image which consists of a house.
Figure 5:
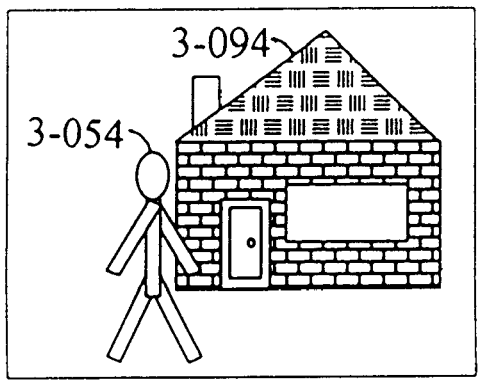
FIG. 5 is a "head-on" view of the foreground image of FIG. 3 and the background image of FIG. 4 displayed by a 3-D imaging device of this invention.
Figure 6:
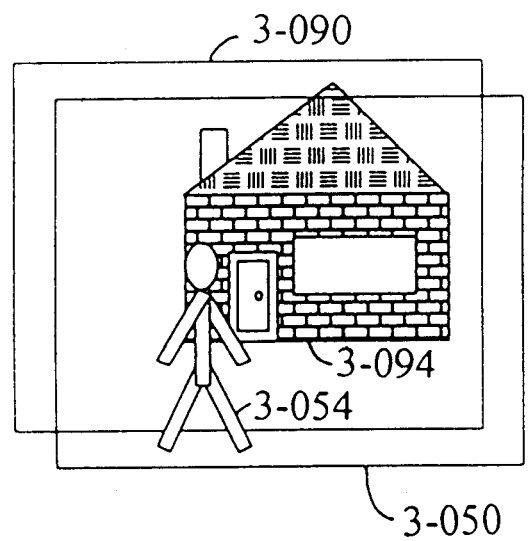
FIG. 6 is a perspective view of the foreground image of FIG. 3 and the background image of FIG. 4 displayed by a 3-D imaging device of the invention.

FIG. 3 shows an illustrative foreground image 3-050. On the foreground image 3-050 is a black surround 3-052 on which there is a foreground object 3-054, a person. FIG. 4 is a background image 3-090. On the background image there is a background object 3-094, a house. FIG. 5 is a "head on" perspective view of the foreground image 3-050 and the background image 3-090. The foreground object 3-054 partially occludes the background object 3-094. FIG. 6 is a different perspective view of the foreground image 3-050 and the background image 3-090. In FIG. 6, the foreground object 3-054 partially occludes a different portion of the background object 3-094 than it does in FIG. 5.

The foreground image 3-050 and the background image 3-090 appear in different planes. The foreground image 3-050 has a foreground object 3-054 or multiple foreground objects on a black surround 3-052. The black surround acts as a transparent space through which the background image 3-094 can be seen. The foreground object 3-054 will appear solid if it is of sufficient brightness with regard to the background image 3-090 and any background object 3-094.

As noted previously, the experience of 3-D is created in the presence of four conditions: traditional 2-D cues, parallax, lateral binocular disparity, and depth disparity. Traditional 2-D cues are present in this embodiment: the background object 3-094 is higher up in the frame, smaller, and less contrasty than the foreground object 3-054. There is parallax, as a change in the position of the viewer, as seen in FIGS. 5 and 6, produces a different view in which portions of a background object 3-094 previously hidden by foreground object 3-054 become visible. There is depth disparity as only one of the foreground object 3-054 or the background object 3-094 is in focus for a viewer at any one time.

If the foreground image 3-050 and background image 3-090 were displayed using the embodiment shown in FIGS. 1 and 2, a viewer 1-200 who bobbed her head from side to side or up and down would see the parallax change indicated in comparing FIG. 5 with FIG. 6. It was surprising that this simple embodiment can create such a true feeling of depth. The inventor first thought that more than two planes would be required to create a sensation of continuous depth, but it turns out that two planes are sufficient.

Problem areas occur when a foreground object is aligned with a background object. The foreground object may appear ghostly or insubstantial if the background object is visible through it. It is desirable to make the foreground image brighter than the background image source to avoid such bleedthrough of objects.

One way is to make the foreground image source brighter (i.e. by increasing the brightness of the foreground image). In some embodiments, it is possible to ensure that the background image is dimmed to the desired extent by the beam-combiner (e.g. reflector or refractor) used to co-align foreground and background images.

Another method to minimize bleedthrough involves dimming the background immediately behind the foreground objects. Of course, with parallax, it is difficult to ascertain what is "behind" a given foreground object, since that changes from viewpoint to viewpoint, and even from eye to eye of a (two-eyed) viewer. A solution to this difficulty is to dim an area on the background that is slightly larger than the foreground object. In some applications, this sort of "flying spot" shadow is desirable, whereas in others it would be distracting to the presentation. The shadow is preferably tapered so it is darkest in its center and lightens toward the edges so no hard boundary is created.

Figure 7:
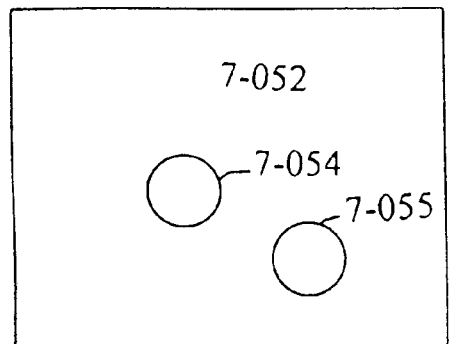
FIG. 7 is a view of a foreground image which consists of white circles on a black surround.

FIGS. 7 through 11 illustrate a potential problem with image bleed-through. FIG. 7 is a foreground image 7-050. On the black surround 7-052 on the foreground image 7-050 is a first foreground object 7-054 and a second foreground object 7-055.

Figure 8:
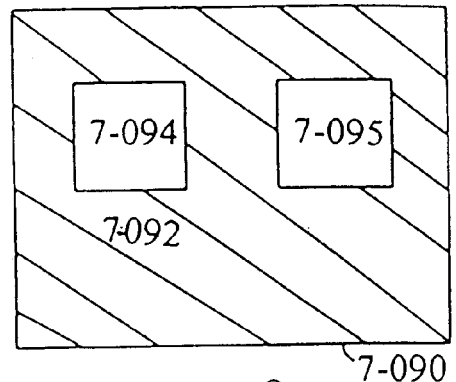
FIG. 8 is a view of a background image, which consists of white squares on a hatched background.
Figure 9:
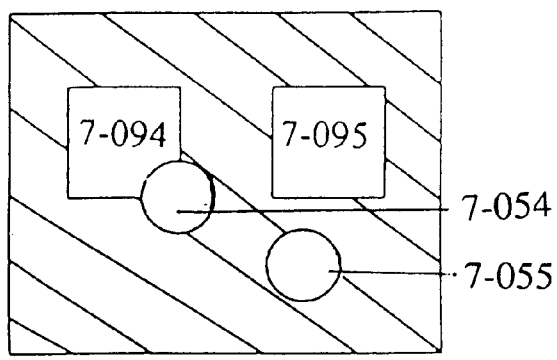
FIG. 9 is a "head-on" view of the foreground image of FIG. 7 and the background image of FIG. 8 displayed by a 3-D imaging device of the invention.
Figure 10:
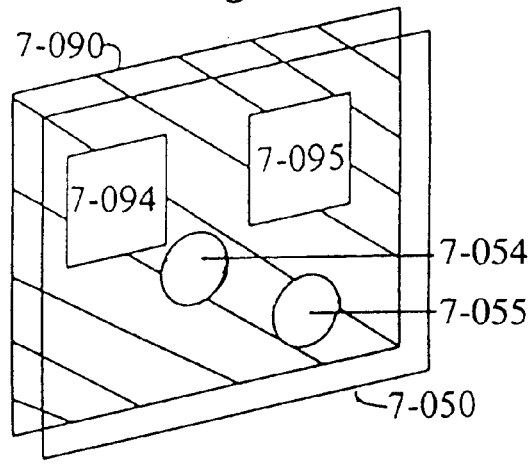
FIG. 10 is a perspective view of foreground image of FIG. 7 and background image of FIG. 8.

FIG. 8 is a background image 7-090. On the striped surround 7-092 on the background image 7-090 is a first background object 7-094 and a second background object 7-095. FIG. 9 shows a "head on" perspective view of the co-aligned foreground image 7-050 and the background image 7-090. Note that first foreground object 7-054 partially occludes the striped surround 7-092 and also partially occludes the first background object 7-094. FIG. 10 is a view from a slightly different perspective of the foreground image 7-050 and background image 7-090. Note that, in comparison with FIG. 9, different portions of the striped surround 7-092 are occluded by the first foreground object 7-054 in the view of FIG. 10.

Figure 11:
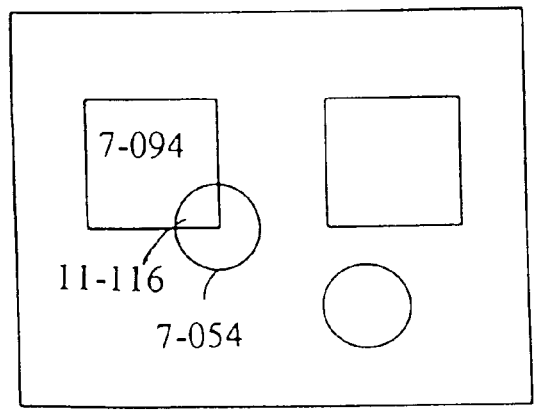
FIG. 11 is a head-on, wireframe view of foreground objects of FIG. 7 and the background objects of FIG. 8.

FIG. 11 illustrates a potential problem area 11-116 that may arise when foreground image 7-050 and background image 7-090 are viewed from a "head-on" perspective. Light from the first background object 7-094 may bleed through the first foreground object 7-054, giving the first foreground object 7-054 a ghostly or insubstantial appearance, damaging the perception of a 3-D scene.

In the context of an embodiment as in FIGS. 1 and 2, the inventor found that when the foreground image 2-050 is brighter than the virtual background image 2-090, it helps to eliminate this ghostly or bleed-through problem. The foreground image 2-050 can be made brighter than the background image 2-090 in various ways. One way is through selection of a reflective element 2-035 which reflects less of the light from the background image 2-090. Another method is to ensure that the foreground image source 2-040 is at least twice as bright as the background image source 2-080. Other methods as known in the art can be used to control the relative brightness of the final images.

Figure 12:
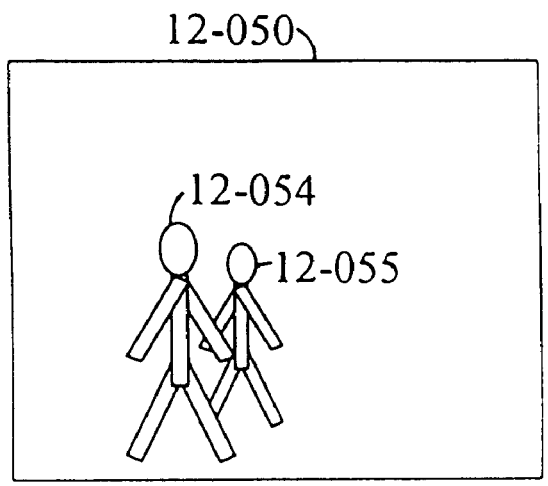
FIG. 12 is a view of a foreground image which consists of two people.
Figure 13:
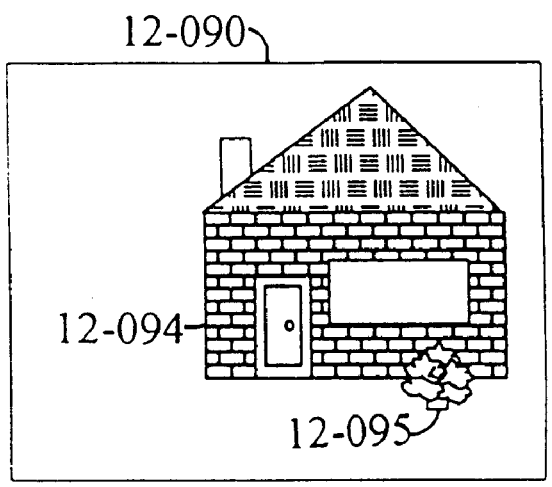
FIG. 13 is a view of a background image which consists of a house and a shrub.
Figure 14:
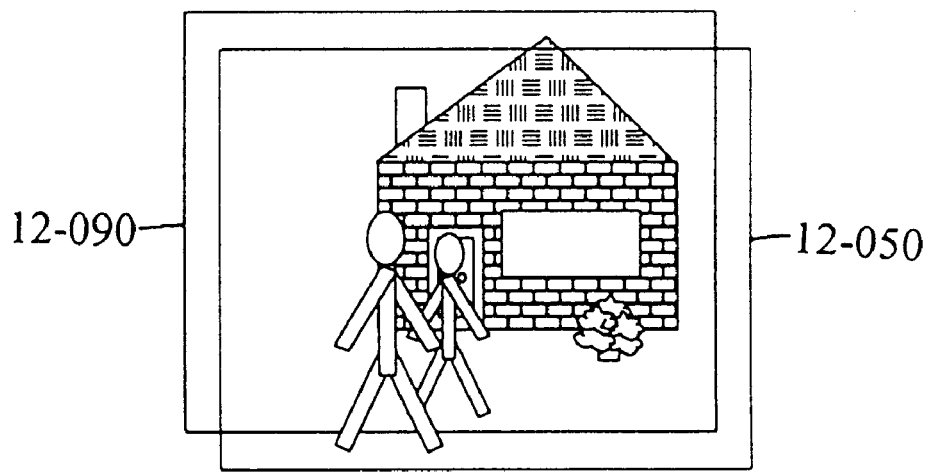
FIG. 14 is a perspective view of the foreground image of FIG. 12 and the background image of FIG. 13.
Figure 15:
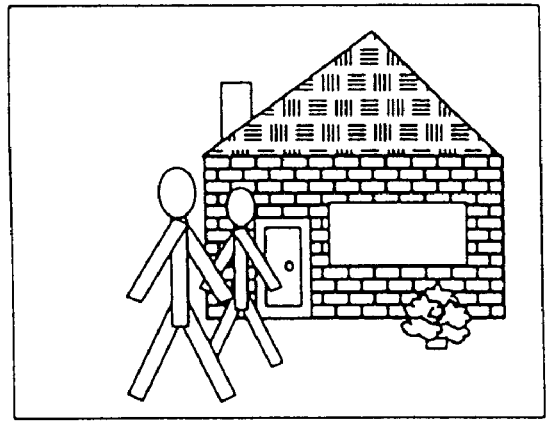
FIG. 15 is a "head-on" view of the foreground image of FIG. 12 and the background image of FIG. 13.

FIGS. 12 through 15 show a different foreground image 12-050 and background image 12-090. FIG. 12 is a foreground image 12-050. On it are a first foreground object 12-054 and a second foreground object 12-055. FIG. 13 is a background image 12-090. On it are a first background object 12-094 and a second background object 12-095. FIG. 14 is a slightly "off-line" perspective view of the foreground image 12-050 and the background image 12-090. FIG. 15 is a "head on" perspective view of the foreground image 12-050 and the background image 12-090.

The inventor has found that the addition of traditional 2-D cues within the foreground image 12-050 and the background image 12-090 greatly increases the perception of 3-D. Note that first foreground object 12-054 partially occludes second foreground object 12-055. The second foreground object 12-055 is higher in the frame, smaller, etc. than the first foreground object 12-054. Similar effects happen in the background image 12-090. In addition to what is shown in the drawing, it can be made to have less contrast.

Exaggeration of traditional 2-D cues within the foreground image and background image can greatly increase the sensation of depth. FIG. 16 shows foreground image 12-050. FIG. 17 shows a modified foreground image 17-050, on which are a first foreground object 17-054 and a second foreground object 17-055. The perspective cues in foreground image 17-050 have been exaggerated: the second foreground object 17-055 has been made much smaller than the first foreground object 17-054. Similarly, the second foreground object 17-055 is higher in the frame, more dim, etc.

Creation of a sensation of depth is further enhanced when the foreground image is smaller than the background image. FIG. 18 shows a foreground image 18-050 and a background image 18-090. FIG. 19 shows the foreground image 18-050 and the background image 18-090 as seen by a viewer 19-200. If the foreground image 18-050 is smaller than the background image 18-090, the images will appear properly proportioned when looked at by a viewer 19-200 since the background image 18-090 is farther away from the viewer than the foreground image 18-050. The background image 18-090 can be made larger by using a larger background image source. Alternatively, intervening magnifying optics are employed to expand the background image 18-090.

Figure 20:
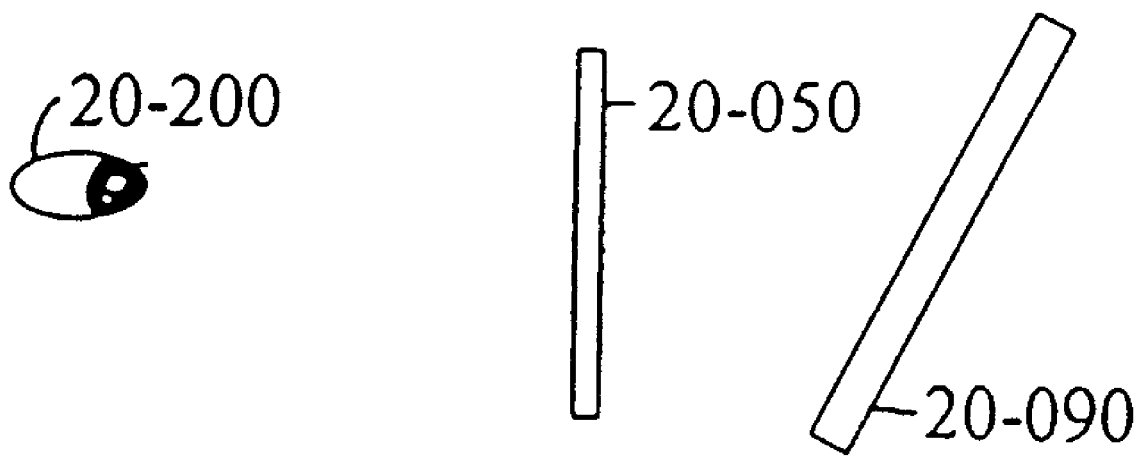
FIG. 20 is a side view of foreground image and background image wherein the background image is tilted with its top away from the viewer.

FIG. 20 shows a viewer 20-200, a foreground image 20-050 and a background image 20-090. A sensation of continuous depth can be enhanced by tilting either the foreground image 20-050, the background image 20-090, or both, away from the viewer. As a viewer 20-200 looks higher in the frame, the objects are actually farther away from the viewer than objects which are lower in the frame, contributing to a perception of a continuous depth scene. Although it is preferable to tilt the background image plane as a method to enhance connectedness between the planes, a third "floor-plane" image is optionally created with another image source, such as a CRT, being placed along the "floor" between the foreground image and the background image.

Use of stereographic and other "3-D" imaging techniques of the prior art as images for display systems and methods of the present invention can also greatly enhance the perception of 3-D.

Another method for solving the bleedthrough problem involves the use of a light valve. The light valve is placed between the background image source and any beamcombiner used to make the images co-axial. The light valve is placed the same distance from the beamcombiner as is the foreground image source. In the simplest embodiment, the light valve is a binary liquid crystal display (LCD) which is made black wherever foreground objects exist and is transparent otherwise. In this manner, no stray light passes from the background through the foreground object. There is parallax between the foreground image and the background image, which is tracked by the parallax between the light valve and the background image. A user who moves her head will see appropriate background around foreground objects, but not through them.

Such an embodiment of this invention will assist in making many sorts of foreground images appear to be very substantial. Take the example of a foreground object in which blackness is a feature. If any light from the background bleeds through the area that is supposed to be black, that object will appear ghostly and insubstantial. For example, where a foreground object is a person wearing a black tie and the background image is a roaring fire, seeing the fire through the tie would be an undesired effect.

Figure 21:
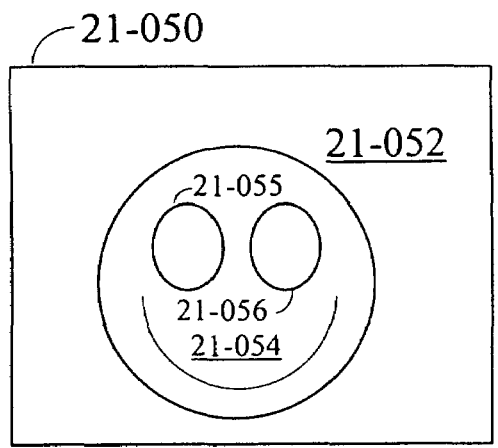
FIG. 21 shows a foreground image which consists of a "smiley face" on a black surround.

FIG. 21 is a foreground image 21-050. FIG. 21 has a black surround 21-052 on which is a foreground object 21-054. Foreground object 21-054 has a first eye 21-055 and a second eye 21-056. The first eye 21-055 and the second eye 21-056 are black areas where blackness is a feature of that area. The first eye 21-055 and the second eye 21-056 are meant to be opaque, in contrast with the black surround 21-052 which is black so as to allow perception of a background image.

Figure 22:
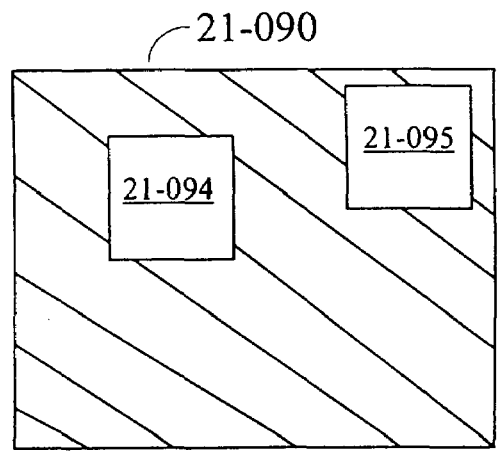
FIG. 22 shows a background image which consists of two square objects on a hashed surround.
Figure 23:
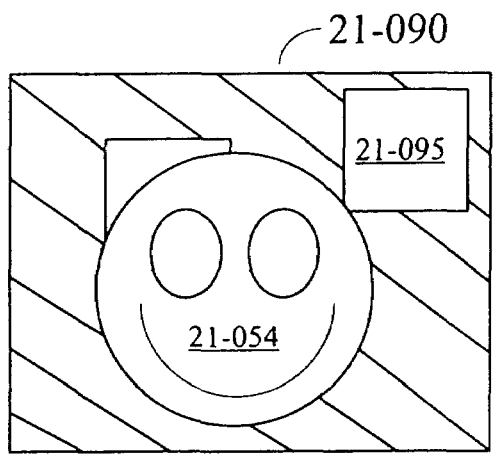
FIG. 23 shows 3-D output as viewed head-on, or how a unified image might look if presented on a 2-D imaging device.
Figure 24:
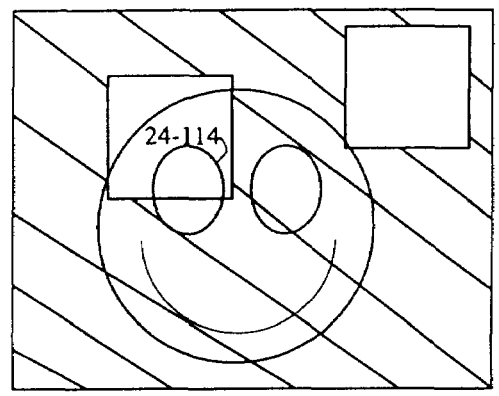
FIG. 24 shows the objects of foreground image of FIG. 21 as a wireframe from a head-on perspective as they would occlude the background image of FIG. 22 when displayed on a 3-D imaging device.

FIG. 22 is background image 21-090. Background image 21-090 has a striped surround 21-092, and a first background object 21-094 and a second background object 21-095. FIG. 23 is a "head-on" perspective view of the foreground image 21-050 and the background image 21-090, which have been co-aligned using a device of the present invention. FIG. 24 is also a "head-on" perspective view of the co-aligned foreground image 21-050 and the background image 21-090, with the foreground image 21-050 rendered as a transparent wireframe so as to define a problem area 24-114.

A problem area 24-114 results when a viewer has line-of-sight through a black object which is supposed to be opaque to a portion of the background image which is light colored. In this case light from background object 21-094 is in line with the first eye 21-055. Unimpeded, this light would give the first eye 21-055 a ghostly appearance. The first eye 21-055 would appear transparent, not black. Increasing the brightness of the foreground image 21-050 does not solve this type of bleed-through problem, as multiplying the brightness of black (namely, zero) by a factor results in zero, and thus still black.

One potential solution is to dim the portion of the background image 21-090 that is behind foreground objects like first eye 21-055. Depending on the position of the viewer 2-200, different portions of the background image 21-090 are behind foreground objects. Parallax makes areas like problem area 24-114 a moving target. A dimmed "head-on" problem area 24-114 is perceived by a viewer 2-200 looking around a foreground object 22-052 to the background 23-090. Using "flying spot" technology on the background 23-090 to solve the "head-on" problem areas is potentially damaging to realistic parallax.

Figure 25:
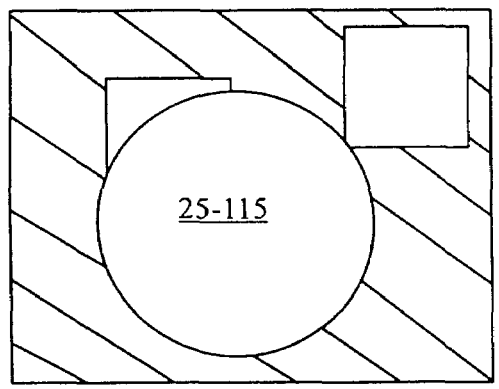
FIG. 25 shows a head-on perspective of the output of a light valve or LCD as it occludes the background image of FIG. 22.

A solution to the "flying spot" or masking problem is to employ an element which stops the background image 23-090 from interfering with the foreground image 22-050: a light valve 25-115 (or, in the case of a still picture, a silhouette will do) that is opaque wherever there are foreground objects. Using a light valve in this fashion will allow foreground objects which have blackness as a feature to occlude background objects. FIG. 25 depicts a silhouette that could be used to mask the problem area 24-114 discussed in connection with FIGS. 21 through 25.

Figure 26:
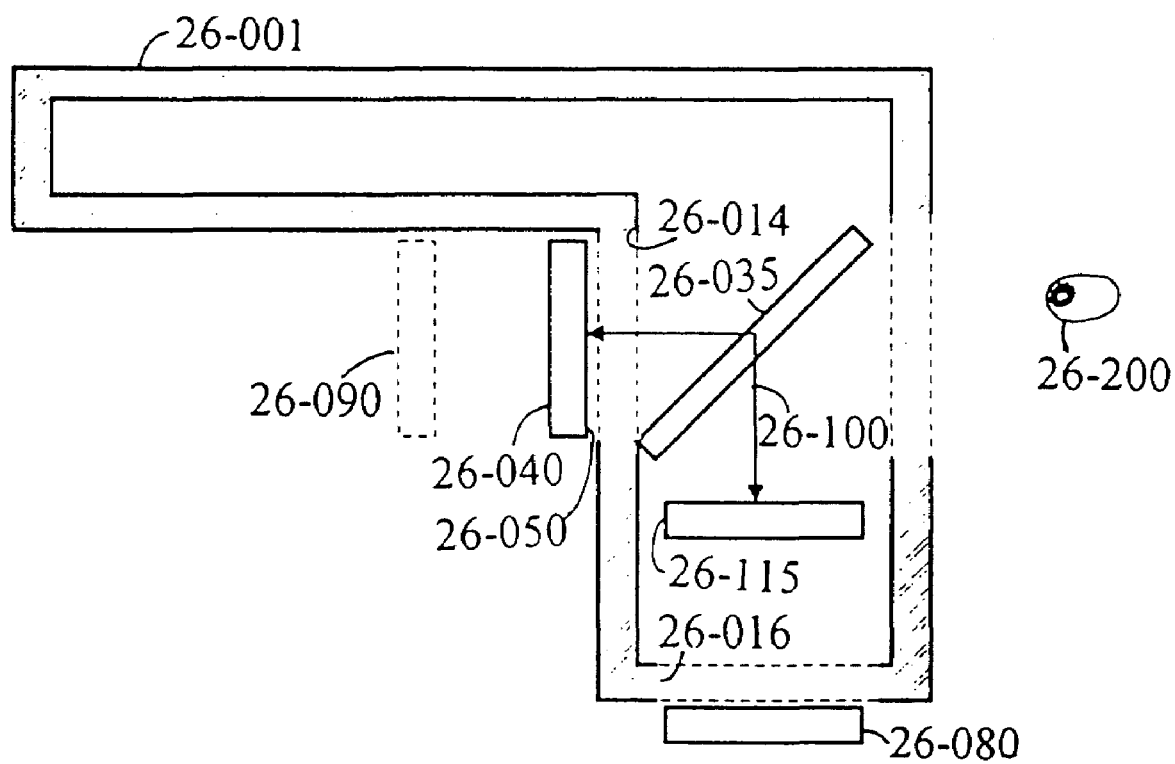
FIG. 26 is a cross-section view of an embodiment showing the placement of an LCD or silhouette so its output properly masks the background behind foreground objects.

FIG. 26 shows one embodiment of the present invention that uses such a light valve. Disposed within the housing 26-001 is a light valve 26-115. Also within the housing 26-001 is a reflective element 26-035, such as a partially reflective mirror. Disposed near the foreground aperture 26-014 is a foreground image source 26-040. A foreground image 26-050 is shown on the foreground image source 26-040. Near the background aperture 26-016 is a background image source 26-080. A virtual background image 26-090 appears, displaced behind the foreground image 26-050.

The light valve 26-115 is placed between the reflective element 26-035 and the background image source 26-080. The light valve is placed at the same distance from the reflective element 26-035 as the foreground image 26-050 on the foreground image source 26-040 (as indicated with arrows 26-100). In this manner, a virtual light valve is created which is coincident with the foreground image 26-050.

There is parallax between the foreground image 26-050 and the background image 26-090, which is tracked by the parallax between the light valve 26-115 and the background image 26-090. Any inappropriate light from the background image source 26-080 is blocked by the light valve 26-115, giving the desired effect without any of the complex problems of background object masking or background object fading. A simple binary light valve is the preferred embodiment for simplicity and lower expense.

Referring once again to FIG. 24, the first eye 21-055 would be perceived as black, while retaining its ability to occlude the background image 21-090. The black surround 21-052 would remain transparent so the background image 21-090 can be viewed around foreground object 21-054.

Some processing of the images, either manual (as is done in cartooning) or automatic (using for instance the sort of software that is used in colorizing movies) may be necessary in order to generate appropriate output for the light valve. In the case of computer-generated content (like a video game or a movie consisting entirely of computer-generated content like Toy Story or a television show consisting largely of computer-generated content like Reboot or Transformers Beast Wars CG series) a signal which is sufficiently sophisticated to drive the light valve of this embodiment may be readily provided as a byproduct of the computer-generation process.

By "sophisticated," the inventor means that it is capable of dealing with the particular combination of foreground image and background image being presented so as to provide realistic object occlusion. Consider as an example: in the foreground, a man wearing a black tie (i.e., object where blackness is a feature) holding at arm's length a donut that is oriented so the viewer has line-of-sight to the background (i.e., object where blackness is meant to be a transparency). For the background image, once again, a raging fire. A sophisticated object definition would allow light from the fire (the background object) to pass through the hole of the doughnut without passing through the man's black tie. In such a sophisticated representation of the image, the hole is not part of the donut, but is instead considered part of the blank surround through which the background is seen.

Additional discussion regarding the type and amount of depth information which is preferably captured (either at recording or on the fly through computer-aided image processing) is provided hereinbelow.

Most of the embodiments of the present invention preferably contain one or more optical elements in a housing. The housing contains one or more image sources, or alternatively it may be provided with one or more apertures through which light from an external image source passes. The housing is optionally designed to contain at least one image source while having an aperture for receiving light from at least one other image source. The housing preferably has an interior of light-absorbent material so any stray light which hits it is not reflected inappropriately (i.e. to the viewer directly or indirectly).

The housing preferably has a viewing aperture, through which the viewer perceives the images. The viewing aperture is preferably smaller than the image source, e.g. when a larger viewing aperture would impermissibly allow a viewer to have a potentially detracting direct line-of-sight to a background image source.

The housing is optionally designed so it can be easily placed on or near an image source and easily removed from being near an image source. For example, some embodiments for television sets and computer monitors are equipped with hinges or Velcro fastening tape so they can be flipped from being in front of the monitor to a storage position on top of the monitor.

The housing is optionally designed so an image source can easily be removed from being near it. A housing is potentially collapsible, to facilitate storage or portage of the unit. An adapter which uses a still picture as a background image, for example, can be made so the still picture is easily removed from the adapter. Similarly, an embodiment which is used as a demonstration unit or a portable advertising unit is preferably provided with a holding element which allows an image source such as standard LCD projector to be mounted on or in the housing.

The housing is often proportioned to the image source. Housings have been made for very small embodiments (image source having a diagonal measured in a fraction of an inch) and very large embodiments (image source having a diagonal of a few yards). Use in hand-held viewers, personal televisions mounted in head-gear, conventional television and computer monitors, projection units, and billboard size advertising displays are some of the contemplated embodiments of this invention illustrating part of the range of sizes contemplated for this invention.

Some embodiments of the display adapter invention use a single unified image source as the original source of at least the foreground image and the background image. For example, some embodiments use a single standard television or computer monitor as an image source. One portion of the screen is used for the foreground image and another portion is used to provide a background image. In some embodiments a mirror is used as a means to reflect light from the background image source to a co-aligning, or beamcombining, element.

In those embodiments using conventional reflective optics (e.g. a planar mirror) it is also contemplated to employ alternatively a magnifying reflective optic, such as a spherical mirror or Fresnel mirror, where a larger image is desired. Conversely a minifying reflective optic is optionally employed where a smaller image is desired.

As an example of the display adapter of this invention with a single image source, where the bottom half of a television screen is the background image source and the top half of it is the foreground image source, the background image is optionally reflected by a mirror to the beamcombining element. In fact, in one embodiment discussed hereinbelow, a lens sandwich assembly is provided, which acts to co-align the images without any additional reflective optics being necessary to reflect light from the background image source.

These "split screen" embodiments can suffer from small size and a distortion of aspect ratio. A halved television screen is either "landscape" if cut horizontally or "portrait" if cut vertically. For a halved screen, a 2:1 image compression can be used in conjunction with optics designed to uncompress the image. Such optics would include cylindrical optical elements to uncompress an image in a single direction. Cylindrical mirrors or cylindrical Fresnel lenses are relatively cheap to manufacture, and they can be used in pairs where uniform expansion of an entire image is desired.

Of course there are many times when it is not desirable to halve the screen even though it is split. For example, in some embodiments a larger background image source is called for so it will appear properly proportioned to the foreground image source. The background image, if not made larger, can appear too small for its foreground image since the background image is actually farther away from the viewer than the foreground image as discussed hereinabove.

Single Image Source for 3-D

By using a single image source for providing both the foreground image and the background image, a real-depth experience is optionally provided at moderate cost to the user, avoiding the expense of multiple image sources such as when each additional image source is a computer monitor or a television set. In one such method, an image source, such as a television or computer monitor screen, is split in portions. One portion is used to generate each plane. For example, one portion of the screen is used to generate a foreground image, and another portion is used to generate a background image. The background image is often reflected ninety degrees through the use of a mirror. Once that has been accomplished, foreground image and background image are optionally co-aligned as elsewhere taught in this document (i.e. through an element such as a beamcombiner). Once again, the inventor was surprised at the pronounced 3-D effect created through the use of the present invention, especially on foreground and background images generated from a single image source.

As mentioned elsewhere herein, it is desirable to present images which are farther from a viewer, (such as a background image) as larger than images which are closer to a viewer, (such as a foreground image). When a single image source is subdivided, for example, a larger portion of the image source may be used for the background image to compensate. Alternatively, magnification is used to enlarge the background image as taught elsewhere herein.

Figure 27:
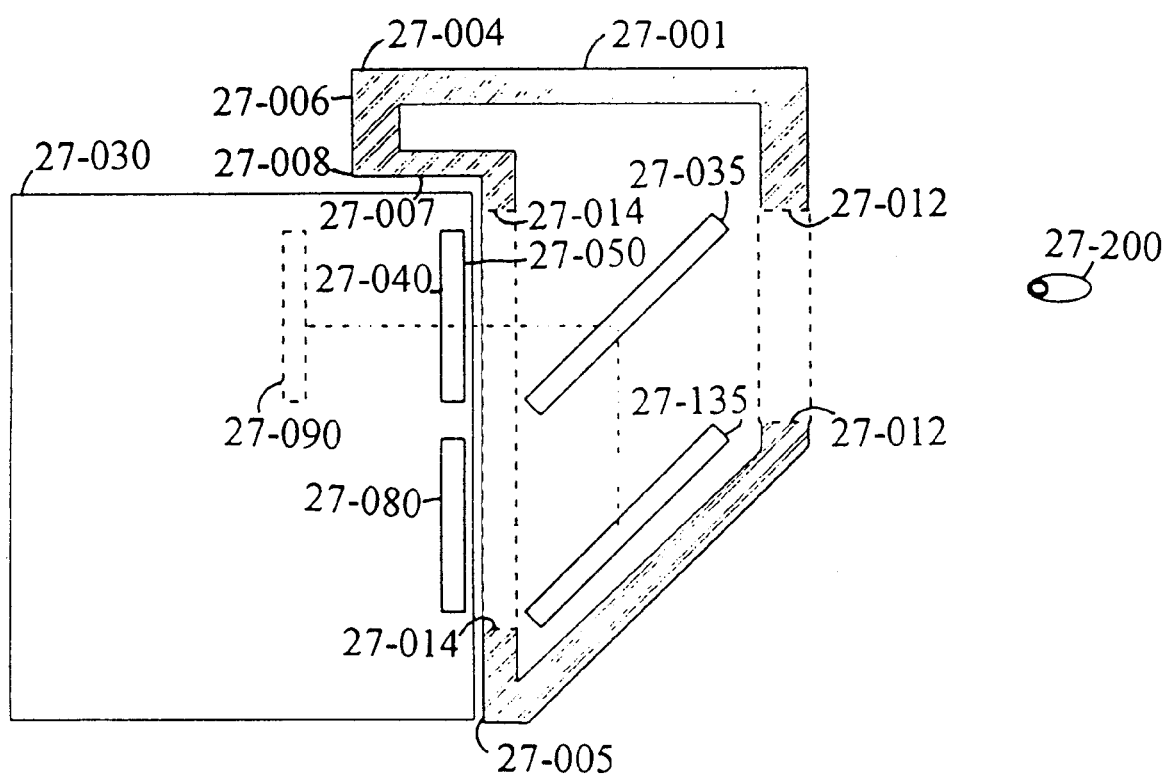
FIG. 27 is a cross-section view of a 3-D imaging device which utilizes portions of a single image source to create foreground and background images.

FIG. 27 shows an embodiment of the present invention. Housing 27-001 has a front face 27-002, a top face 27-004, a rear face 27-005, and an optional panhandle 27-006 which facilitates mounting. Panhandle 27-006 has a panhandle bottom face 27-007 and panhandle corner 27-008. On the front face 27-002 is a viewing aperture 27-012. On the rear face 27-005 is an image source aperture 27-014 adapted to cooperate with an image source 27-030, such as a CRT or television monitor. Disposed within the housing 27-001 is a reflective element 27-035, such as a partially reflective mirror, that acts as a beamcombiner.

Part of the image source 27-030 is used as a foreground image source 27-040. A foreground image 27-050 is on the foreground image source 27-040. Another part of the image source 27-030 is used as a background image source 27-080. A virtual background image 27-090 appears displaced behind the foreground image 27-050. Light path 27-100 shows the path from the background image source 27-080 to the virtual background image 27-090. A conventional mirror 27-135 is disposed within the housing 27-001 to reflect light from the background image source 27-080 to the reflective element 27-035 which reflects light to a viewer 27-200.

As in other embodiments, reflective element 27-035 acts as a beamcombiner to present the co-aligned foreground image 27-050 and the background image 27-090 to a viewer 27-200. In this embodiment, however, the foreground image source 27-040 and the background image source 27-080 are just different parts of the same image source 27-030. This embodiment is potentially smaller, cheaper, and easier to use than embodiments which use more than one image source as the sources of the foreground image and the background image.

Optionally, the housing 27-001 may contain all sources of imagery, whether a single image source or multiple image sources. In this embodiment, however, the housing 27-001 is optionally attached, permanently or temporarily, to the image source 27-030. For example, straps of fastening tape (such as Velcro) placed on the panhandle bottom 27-007 are optionally used to attach the housing 27-001 to the image source 27-030. Velcro straps, hinges, a brace or other known fastening devices or schemes are optionally used to dispose the housing 27-001 near the image source 27-030. The housing 27-001 is preferably collapsible.

Embodiments of the present invention may vary widely in size, as noted elsewhere in this document. For example, the embodiment of FIG. 27 are optionally made to fit a hand-held gaming device or a large projection television.

Figure 27A:
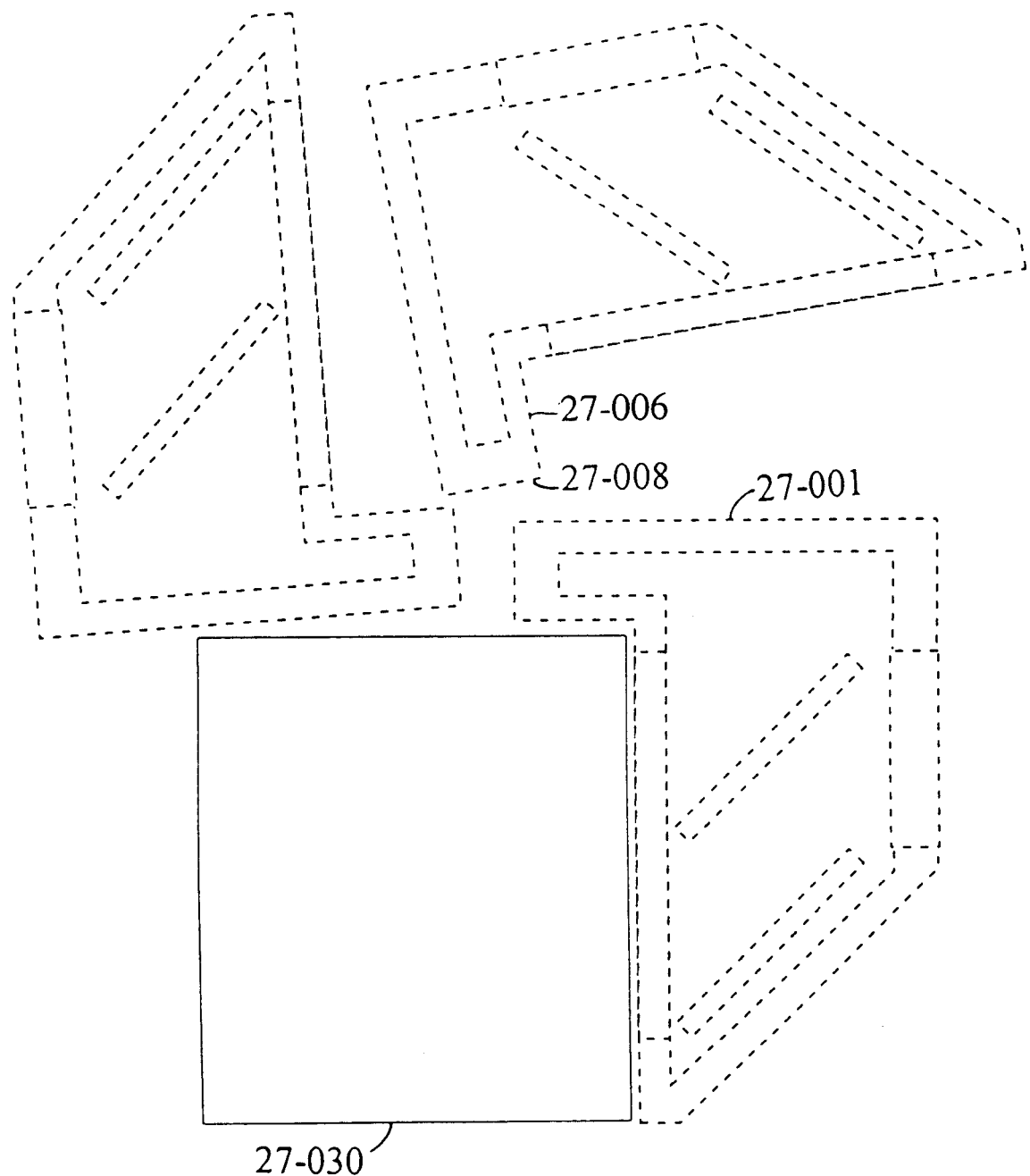
FIG. 27A is a cross-section view of the embodiment of FIG. 27 which shows the housing in alternate positions.

Referring now to FIG. 27A, the use of hinges at panhandle corner 27-008 or Velcro straps on optional panhandle 27-006 can allow the housing 27-001 to be flipped up onto the monitor.

Figure 28:
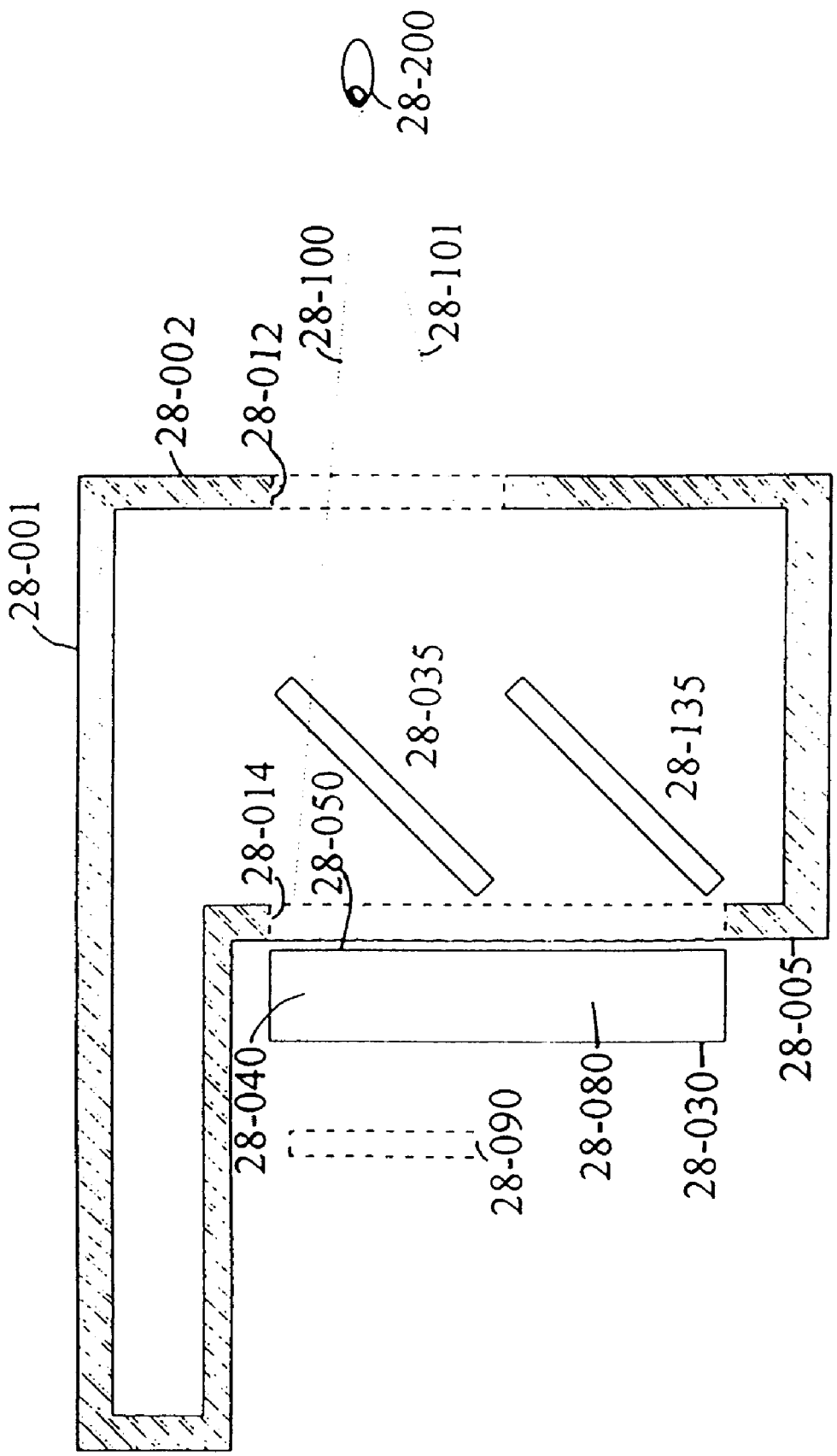
FIG. 28 is a cross-section view of a 3-D imaging device of this invention illustrating potential problems with a user having a direct line-of-sight to the image source.

FIG. 28 shows another single-image-source embodiment of the present invention. In FIG. 28, the embodiment has a housing 28-001. Housing 28-001 has a front face which has a viewing aperture 28-012. The housing 28-001 has on its rear face 28-005 an image source aperture 28-014.

Disposed near the image source aperture 28-014 is an image source 28-030, such as a CRT or television monitor. Disposed within the housing 28-001 is a reflective element 28-035, such as a partially reflective mirror. Part of the image source 28-030 is used as a foreground image source 28-040. A foreground image 28-050 is on the foreground image source 28-040. Another part of the image source 28-030 is used as a background image source 28-080. A virtual background image 28-090 appears displaced behind the foreground image 28-050. Light path 28-100 is shown. Light path 28-101 is shown. A conventional mirror 28-135 is disposed within the housing 28-001 to reflect light from the background image source 28-080 to the reflective element 28-035 which reflects light to a viewer 28-200.

As in some other embodiments, reflective element 28-035 acts as a beamcombiner to present the co-aligned foreground image 28-050 and the background image 28-090 to a viewer 28-200.

Light path 28-100 shows a proper line-of-sight from a viewer 2-200 to the foreground image source 28-040 (and thus to the foreground image 28-050, which is on its surface). Light path 28-101 shows a potential problem with this embodiment. A viewer 28-200 has line of the sight to the background image source 28-080 through viewing aperture 28-012. It is preferable that the user not have line-of-sight to the background image source 28-080 because it is distracting to the perception of 3-D a viewer 28-200 should perceive when looking at the co-aligned background image 28-090 and foreground image 28-050.

One way to avoid this problem is to make the viewing aperture 28-012 smaller, to reduce the viewpoints from which a viewer 28-200 has a line-of-sight to the background image source 28-090.

Figure 29:
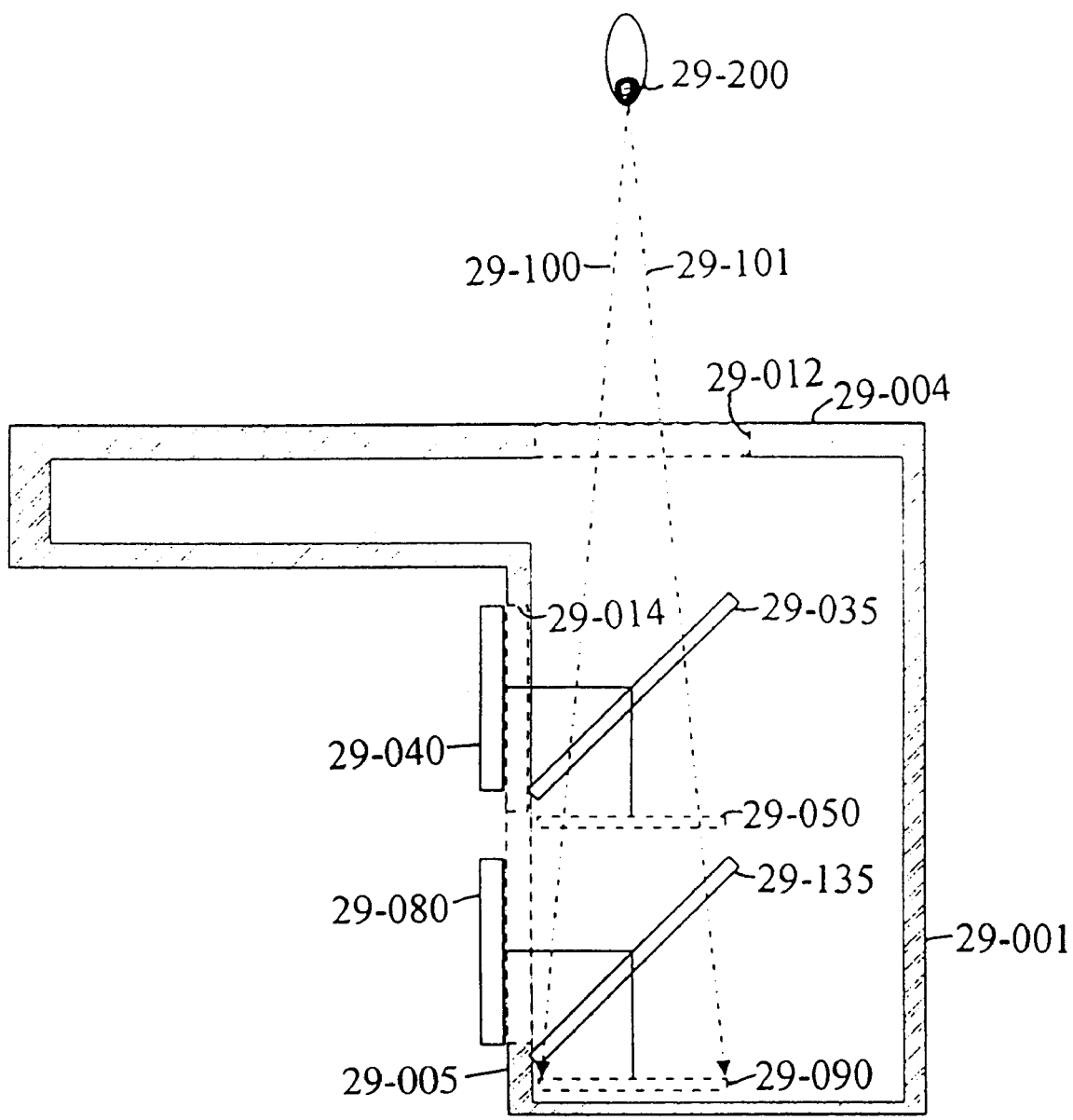
FIG. 29 is a cross-section view of a 3-D imaging device of the invention which avoids the line-of-sight problem presented in some other embodiments.

Another way to avoid the problem of line-of-sight to the background image area is shown in FIG. 29. The embodiment shown in FIG. 29 has a housing 29-001. Housing 29-001 has a top face 29-004 which has a viewing aperture 29-012. The housing 29-001 has on its rear face 29-005 an image source aperture 29-014.

Disposed near the image aperture 29-014 is an image source 29-030, such as a CRT or television monitor. Disposed within the housing 29-001 is a reflective element 29-035, such as a partially reflective mirror. Part of the image source 29-030 is used as a foreground image source 29-040. A virtual foreground image 29-050 is created by reflective element 29-035. Another part of the image source 29-030 is used as a background image source 29-080. A virtual background image 29-090 appears displaced behind the virtual foreground image 29-050. A conventional mirror 29-135 is disposed within the housing 29-001 to reflect light from the background image source 29-080 to the reflective element 29-035 which transmits light to a viewer 29-200.

As in some other embodiments, reflective element 29-035 acts as a beamcombiner to present the co-aligned virtual foreground image 29-050 and the virtual background image 29-090 to a viewer 29-200.

Light path 29-100 and light path 29-101 show a proper line-of-sight from a viewer 2-200 to the virtual foreground image source 29-050 and the virtual background image source 29-090.

There is a potential problem with this embodiment, as the images are directed at a ninety degree angle to the face of the image source. For a viewer 29-200 seated in a chair, for example, the image source 29-030 is placed "face up" so the viewing aperture 29-012 is oriented to the viewer 29-200. In the alternative, the monitor is turned ninety degrees to its left, and the adapter directs its output to its right. Changing the orientation of the image source, as with a television set or computer monitor, can be inconvenient and therefore undesirable (e.g. from a thermal management standpoint).

Figure 30:
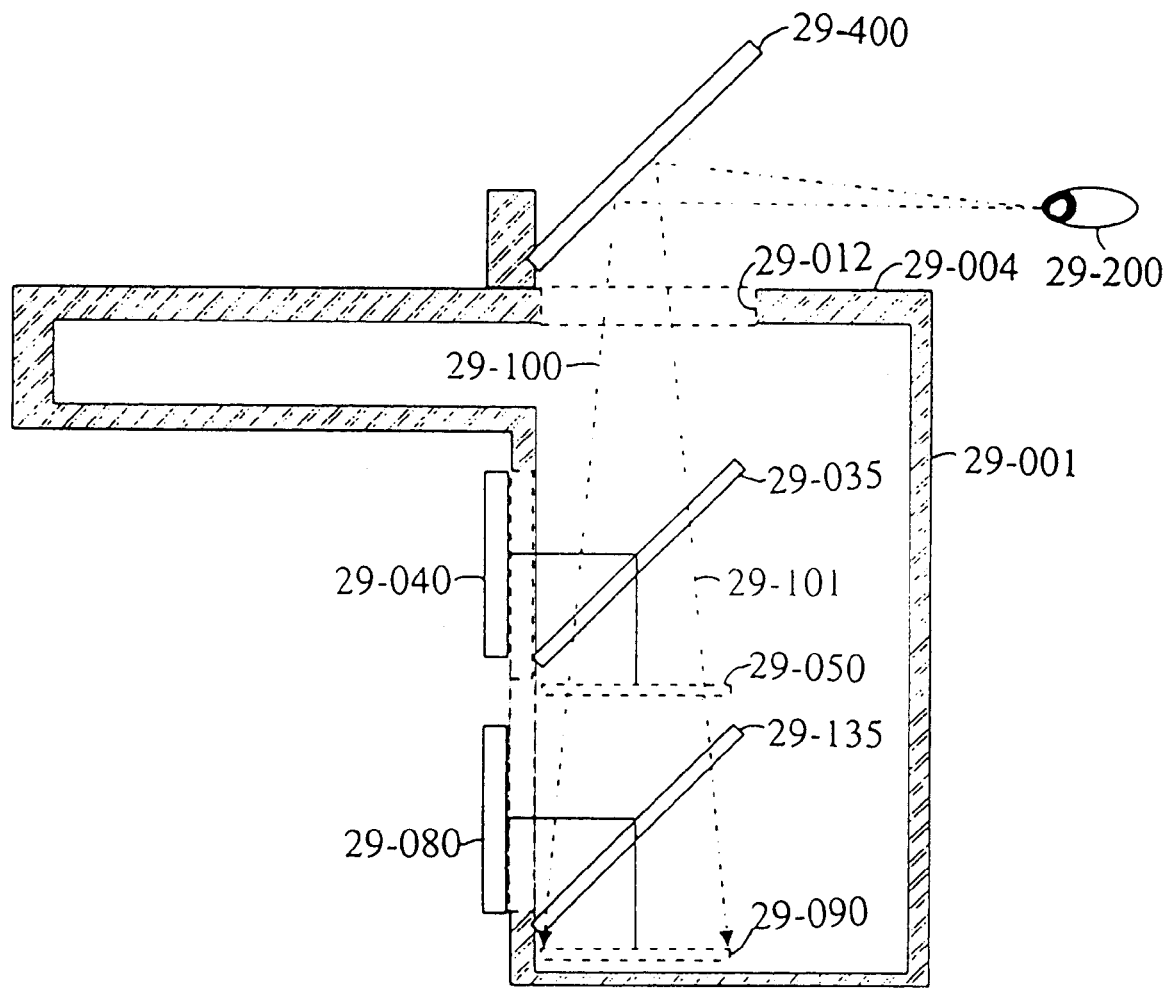
FIG. 30 is a cross-section view of a 3-D imaging device of the invention which has secondary optics to further change the path of light to a viewer.

FIG. 30 shows the embodiment shown in FIG. 29, in which a secondary reflective optic 29-400, such as a plane mirror, is used to direct the images to a viewer 29-200 seated in front of a conventionally oriented monitor or CRT.

Splitting a single image source, such as a television monitor or computer CRT, can create problems with the aspect ratio of the image. For example, splitting a television screen horizontally yields a very wide "landscape" or "letterbox" aspect ratio, while splitting it vertically yields a "portrait" aspect ratio. If the image that appears on the image source has been suitably compressed 2:1, additional optics, such as a cylindrical lens, are optionally used to expand the original image, if desired, to regain the desired aspect ratio.

Referring once again to FIG. 30, secondary reflective optic 29-400 is optionally a cylindrical expansion mirror. The cylindrical expansion mirror is designed to uncompress the image in one direction. Thus the co-aligned foreground image 29-050 and background image 2-090 are redirected and expanded for a viewer 29-200. Anamorphic curvature of the mirror can provide virtually any size image with any desired aspect ratio.

Real Imaging

Figure 31:
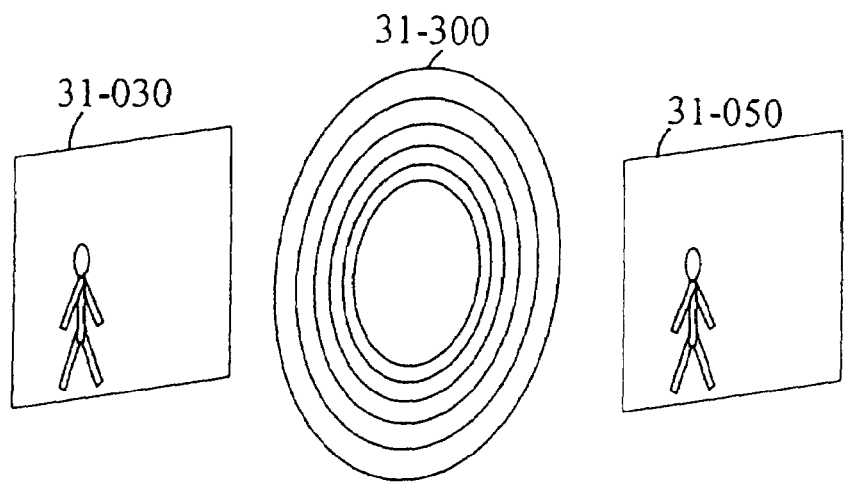
FIG. 31 is a perspective view of an image source, a Fresnel lens, and the real image of the image source.
Figure 32:
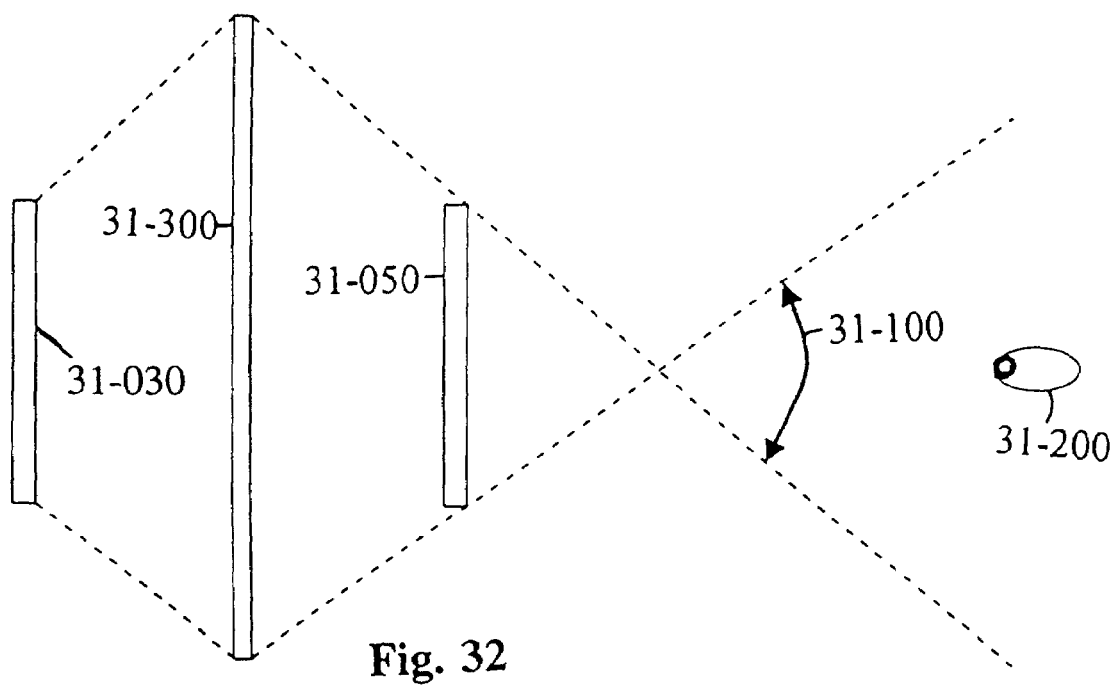
FIG. 32 is a side view of an image source, a Fresnel lens, the real image of the image source, and the angle of view in which the real image is perceived.

In FIG. 31 there is shown an image source 31-030, a real image 31-050, a viewer 31-200, and a Fresnel lens 31-300. In FIG. 32 there is an image source 31-030, a real image 31-050, an arrow 31-100, a viewer 31-200, and a Fresnel lens 31-300.

Any lens (whether Fresnel or conventional), if properly placed in relation to an image source, can create a real image for a controlled angle of view. Image source 31-030 is re-imaged by Fresnel lens 31-300. This real image 31-300 is visible to a viewer 31-200 who is within a controlled angle of view indicated by arrow 31-100. The size of the real image and the controlled angle of view can be altered by moving the image source, varying the focal length of the lens and relative position, etc.

A real image is an image in front of the optical element that reimages it, unlike a virtual image which appears to be behind the optic. For example, an image in a mirror appears behind the glass. A real image reimaged by a lens appears to float in space in front of the lens.

Fresnel lenses are preferred for most embodiments of the present invention that produce real images because they are relatively light and easy to manufacture. Unlike many lens types, they are optionally glued together in a sandwich, to correct for spherical aberration or chromatic aberration. For example, two or more different materials can be used in the elements of the sandwich (or any of the other optical elements disclosed herein) to correct for chromatic aberration. Those of ordinary skill in the art recognize that as other lenses become more economical, then other lenses may become preferred.

A properly placed Fresnel lens can re-image almost any image source. FIG. 32 is a single-image-source adapter of the present invention, such as depicted in FIGS. 27 and 29.

Figure 32A:
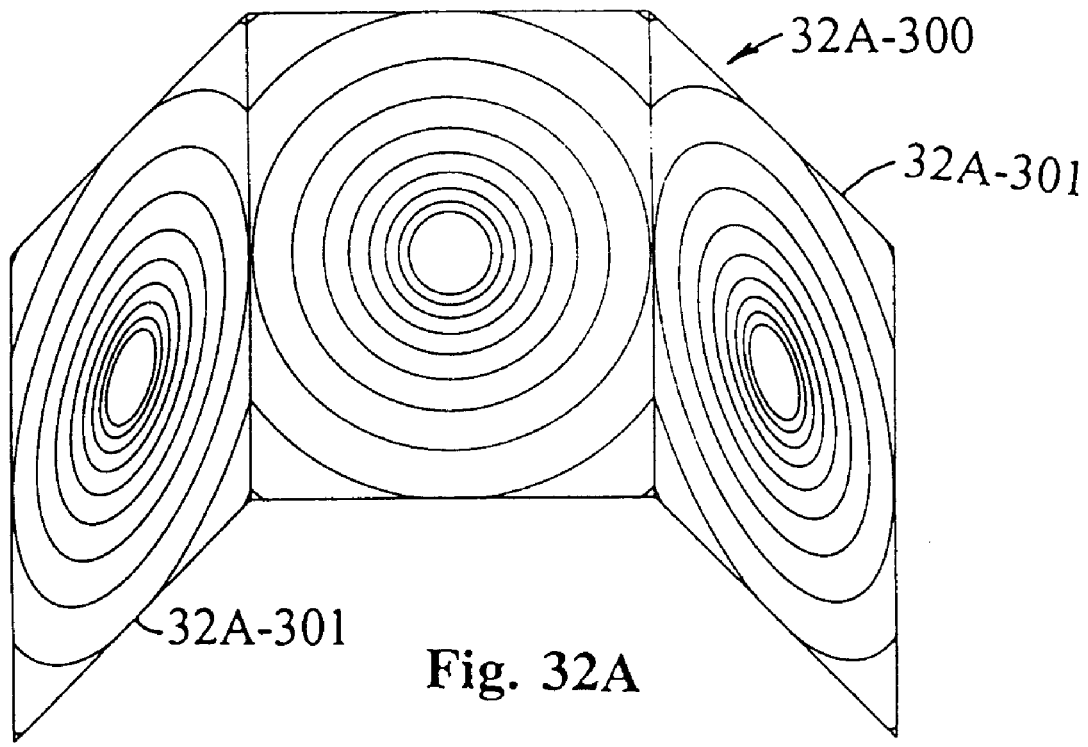
FIG. 32A is a perspective view of a faceted Fresnel lens.
Figure 32B:
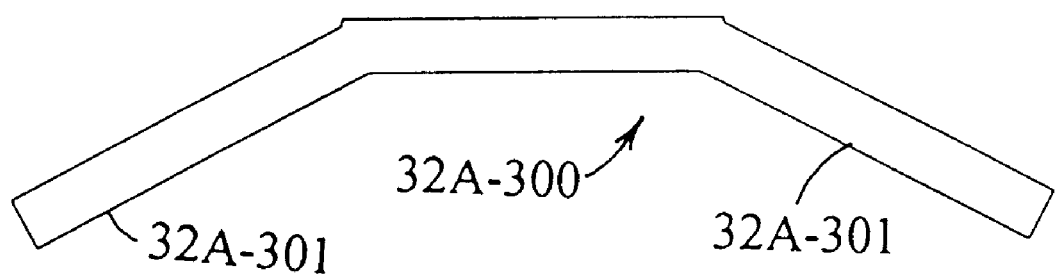
FIG. 32B is a plan view of the faceted Fresnel lens in FIG. 32A.

FIGS. 32A and 32B depict a Fresnel lens 32A-300, which has additional facets 32A-301. FIG. 32A is a perspective view, and FIG. 32B is a plan view. Facets 32A-301 help extend the controlled angle of view created by a Fresnel lens 32A-300 to nearly one hundred eighty degrees. Alternatively, the sheet forming the Fresnel lens 32A-300 is curved into a cylinder.

Figure 33:
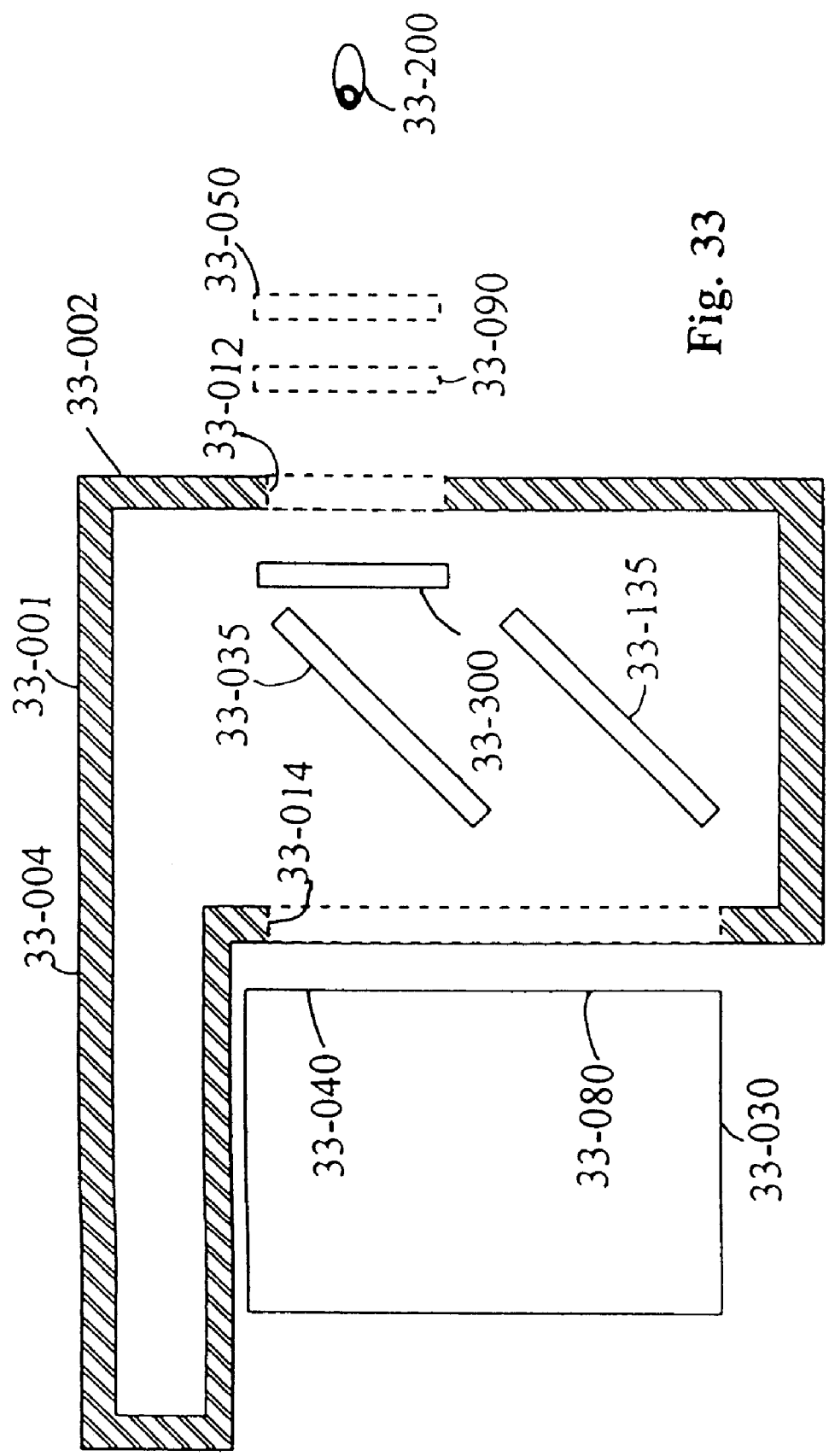
FIG. 33 is a cross-section view of a 3-D imaging system which uses a Fresnel lens.

Referring now to FIG. 33, housing 33-001 has a front face 33-002, a top face 33-004, and a rear face 33-005. The housing 33-001 has on its front face 33-002 a viewing aperture 33-012. The housing 33-001 has on its rear face 33-005 an image source aperture 33-014.

Disposed near the image source aperture 33-014 is an image source 33-030, such as a CRT or television monitor. Disposed within the housing 33-001 is a reflective element 33-035, such as a partially reflective mirror. Part of the image source 33-030 is used as a foreground image source 33-040. A real foreground image 33-050 is formed. Another part of the image source 33-030 is used as a background image source 33-080. A real background image 33-090 appears displaced behind the real foreground image 33-050. A conventional mirror 33-135 is disposed within the housing 33-001 to reflect light from the background image source 33-080 to the reflective element 33-035 which reflects light to a viewer 33-200. Fresnel lens 33-300 is disposed between the reflective element 33-035 and the viewer 33-200.

As in other embodiments, reflective element 33-035 acts as a beamcombiner to present the co-aligned foreground image 33-050 and the background image 33-090 to a viewer 33-200. The light from the background image source 33-080 is reimaged into real background image 33-090. The light from the foreground image source 33-040 is reimaged into the real foreground image 33-050.

The viewer 33-200 sees the real foreground image 33-050 and the real background image 33-090 hanging in space in front of all optical elements. The viewer 33-200 is often startled, expecting to find a plane of glass from which the real foreground image 33-050 and the real background image 33-090 are reflected. In this embodiment, the viewer 33-200 can place her finger on or through the foreground image 33-050 if desired, and still see the rest of the scene.

Other embodiments of the present invention may also utilize a lens, preferably a Fresnel lens, to generate at least one real image.

Figure 34:
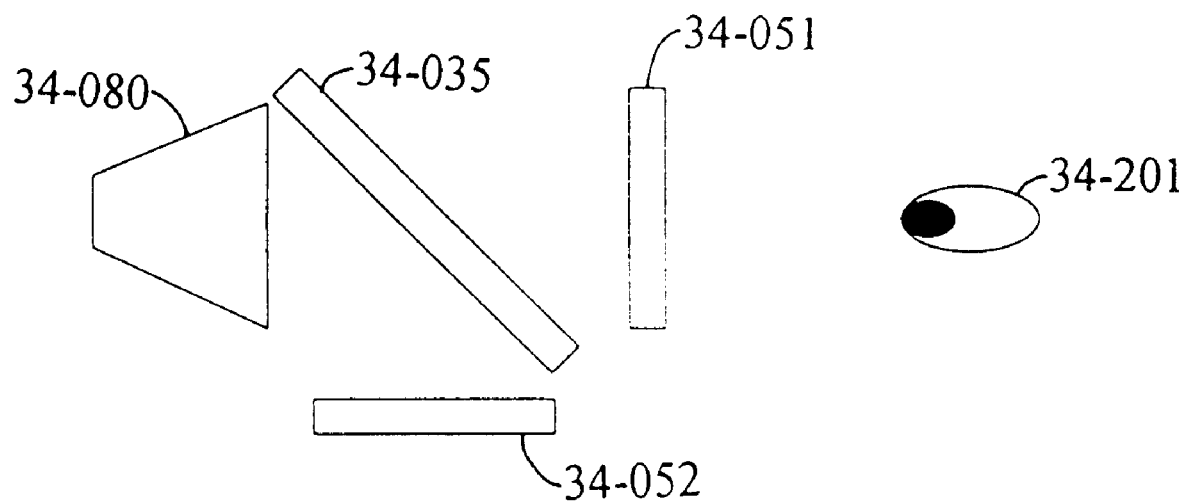
FIG. 34 is a plan view of a 3-D imaging system of the present invention which uses a Fresnel lens.

FIG. 34 is another embodiment of the present invention which utilizes a Fresnel lens to generate a real image. Depicted in FIG. 34 are reflective means (such as a beamsplitter) 34-035, foreground image source 34-040, real foreground image 34-051, real foreground image 34-052, background image source 34-080, a first viewer 34-202, a second viewer 34-202, and a Fresnel lens 34-300.

This embodiment uses a real foreground image 34-051 and/or 34-052. A viewer 34-201 sees the real foreground image 34-051 and has a direct line of sight to the background image source 34-080. A viewer 34-202 sees the real foreground image 34-052 and sees the virtual image of the background image source 34-052. Real image 34-051 is reflected by reflective means 34-035, and real image 34-052 is transmitted by reflective means 34-035.

A housing is optionally used which allows viewing from the position of viewer 24-201, viewer 24-202 or preferably both. An embodiment which allows viewing in such positions turns FIG. 2's "misdirected" light 1-102 and 1-103 into a potentially desirable feature of the invention.

As in other embodiments, reflective element 34-035 acts as a beamcombiner to present the co-aligned real foreground image and the background image to a viewer. The light from the foreground image source 34-040 is reimaged into the real foreground image 34-050.

The main difference between the embodiments of FIG. 33 and of FIG. 34 is the placement of the Fresnel lens 33-300. In FIG. 33, the Fresnel lens 33-300 is disposed between the foreground image source 33-040 and the reflective element 33-035. In the embodiment in FIG. 34, only the foreground image is a real image. The background image is a virtual image or a direct line of sight to the background image. By placing a Fresnel lens in an appropriate place in the light path, any or all image planes are reimaged into a real image.

Figure 41:
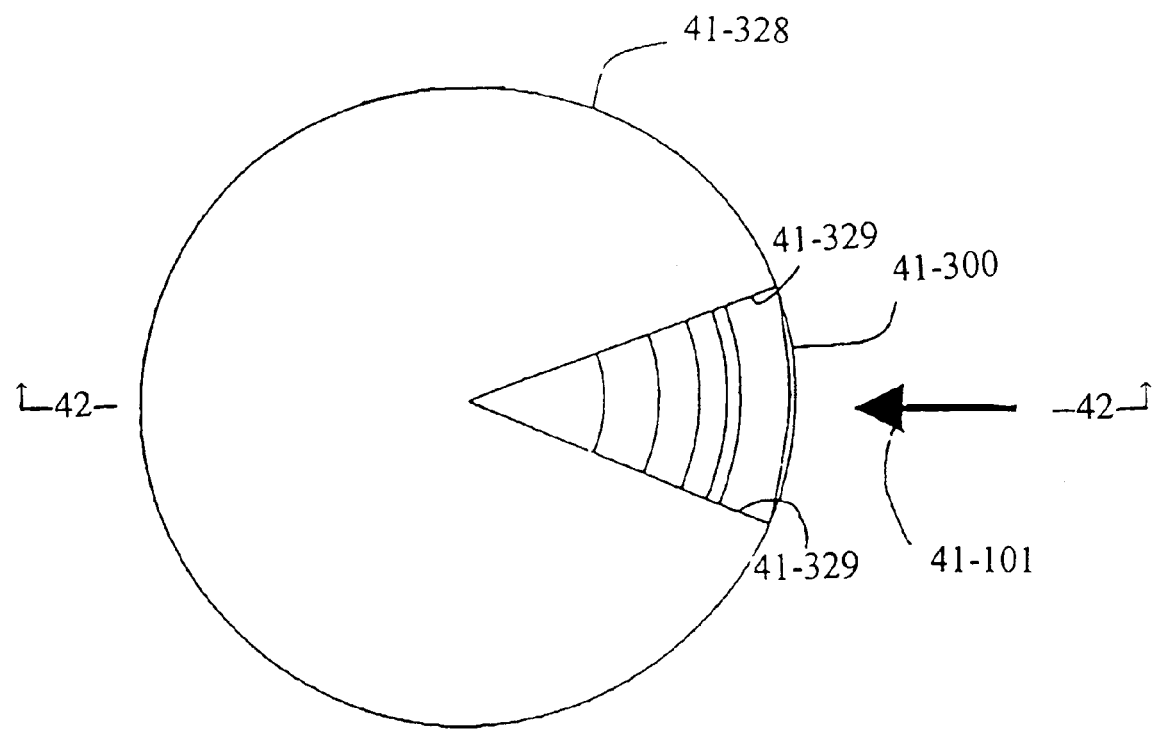
FIG. 41 is a plan view of an annular lens of the present invention which is coated with photoresist and is partially covered with a light shield.

FIG. 41 shows a single image source 3-D adapter as in FIG. 28. With the addition of the Fresnel lens, a viewer sees a real foreground image and a real background image. The optics are optionally placed that the real images appear to float in space in front of the housing and all accompanying optics.

When first presented with a real image, the viewer often expects it to be a projection on some type of screen. For many embodiments, the viewer can actually place his or her hand in plane with the image, much to their surprise. The use of real images can greatly contribute to the perception of depth in the scene.

The Fresnel lens may alternately be placed so as to "float" only the foreground image or only the background image. Multiple Fresnel lenses are optionally placed to refocus light in a shorter optical path, for example.

A more compact embodiment of the present invention uses a single projector (of any standard type as known in the art) as the source of foreground and background images.

One portion of the image projected by the beam from the projector lens is the foreground, while another portion is the background.

Consider what one sees on a screen that is perpendicular to the projection beam and is moved progressively farther away from the projection lens until the image comes into focus. At first for a certain short distance, the image is so out-of-focus that the beam appears as if it is homogeneous. Beyond that distance, the image is more nearly in focus and is susceptible of being split. This is subject to empirical determination.

That is, if one positions the screen so that the image is in focus and then slowly inserts an opaque object such as a sheet of cardboard into the path of the beam between the projector and the screen within that certain short distance, the entire image becomes progressively dimmer. Farther out from the projector than that certain short distance, when one similarly inserts such an object between the projector and screen, the image becomes partially eclipsed.

This more compact embodiment of the present invention uses a mirror that is placed far enough out from the projector exit lens to divert portions of the projector's output to different projection screens. It is important that the mirror be placed far enough out from the projector than that certain short distance, so the image is actually split rather than dimmed. For a typical projector the inventor has found that the mirror should be at least twelve inches and preferably about 18 inches from the projector exit lens face.

A portion of the beam is reflected to a projection screen. Another portion of the beam is reflected to a second projection screen, disposed at a ninety-degree angle from the first projection screen. Preferably, a lens is used to re-focus one of the portions, since the screens are at different distances from the projector. Each portion reflects from its screen to a beamcombiner whereby the portions are aligned. One portion is transmitted while the other portion is reflected in the same direction.

Once the foreground and background images are so aligned, they are redirected, refocused into real images, magnified, corrected for aspect ratio, for distortion, etc., as elsewhere taught in this document.

Figure 34A:
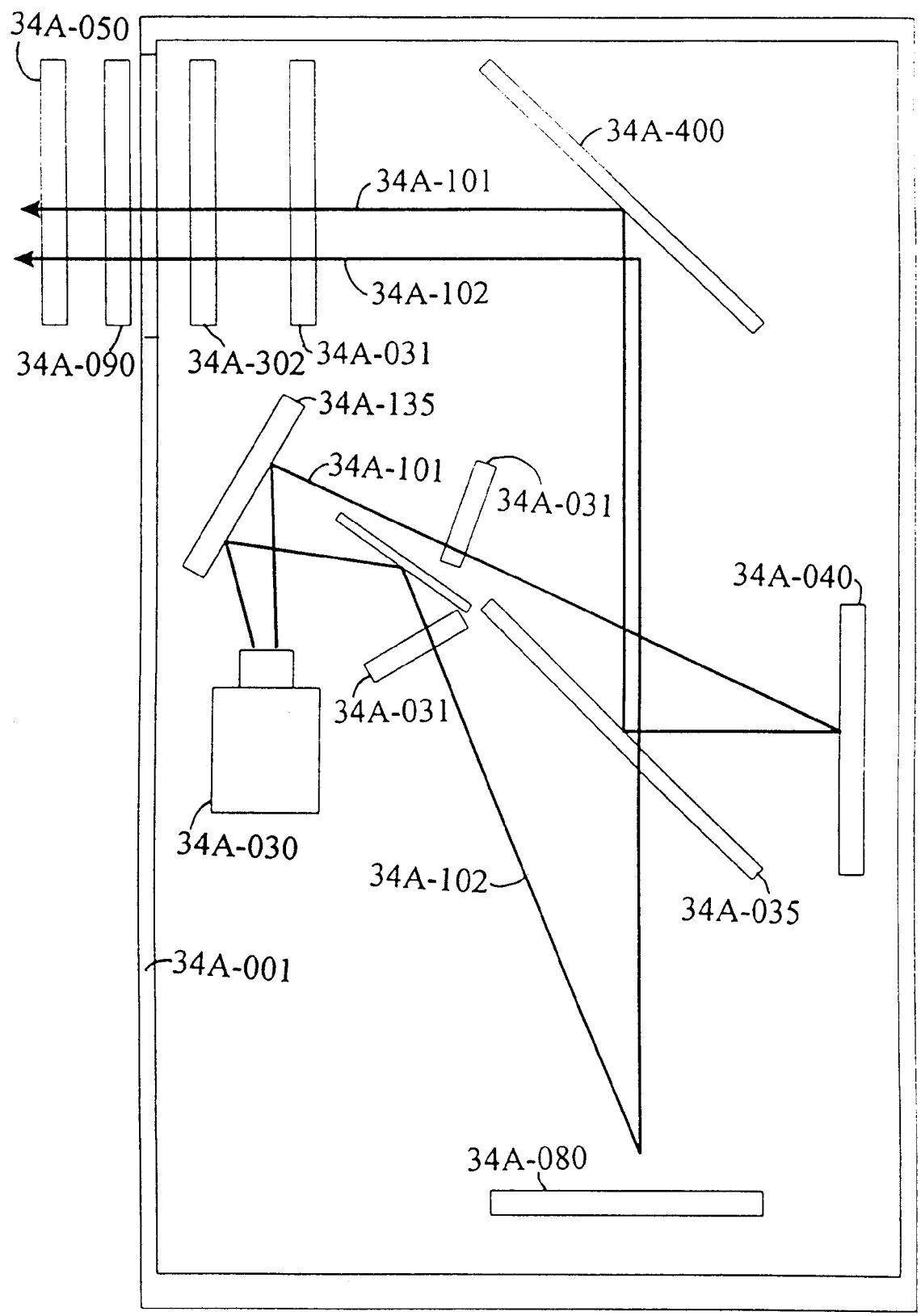
FIG. 34A is a plan view of a 3-D imaging system of the present invention.

Referring in particular to FIG. 34A, light ray 34A-101 leaves projector 34A-030 and reflects from a reflective element 34A-135 (preferably a plane mirror). By the time light ray 34A-101 by-passes reflective element 34A-136 (preferably a plane mirror) it contains only light which will eventually comprise the foreground image 34A-050. Light ray 34A-101 hits projection screen 34A-040, reflects back to a reflective element 34A-035, which acts as a beamcombiner, from which light ray 34A-101 reflects to a secondary reflective optic 34A-400, preferably a plane mirror, from which it is reimaged by a first Fresnel (or lenserF) lens 34A-301 and a second Fresnel (or lenserF) lens 34A-302. As a consequence, a real foreground image 34A-050 appears in space well outside the housing 34A-001.

Light ray 34A-102 is reflected by reflective element 34A-136, preferably a mirror, at a point when light ray 34A-102 is far enough from the projector that it contains only light that will comprise the background image. Light ray 34A-102 then hits the background projection screen 34A-080, from which it reflects through the reflective element 34A-035. Co-aligned with the light ray 34A-101 reflected from 34A-035, light ray 34A-102 is reflected and reimaged as a real background image 34A-090 outside the housing 34A-101. Varying the distances and arrangements of this embodiment in light of the rest of this document is a part of the invention.

One of light ray 34A-101 or 34A-102 is focussed by a lens 34A-031 since foreground projection screen 34A-040 and background projection screen 34A-080 are at different distances from the projector 34A-030. If light ray 34A-102 is focussed, a negative lens is used. Preferably light ray 34A-102 is focussed instead, so more plentiful positive lenses may be used.

Figure 34B:
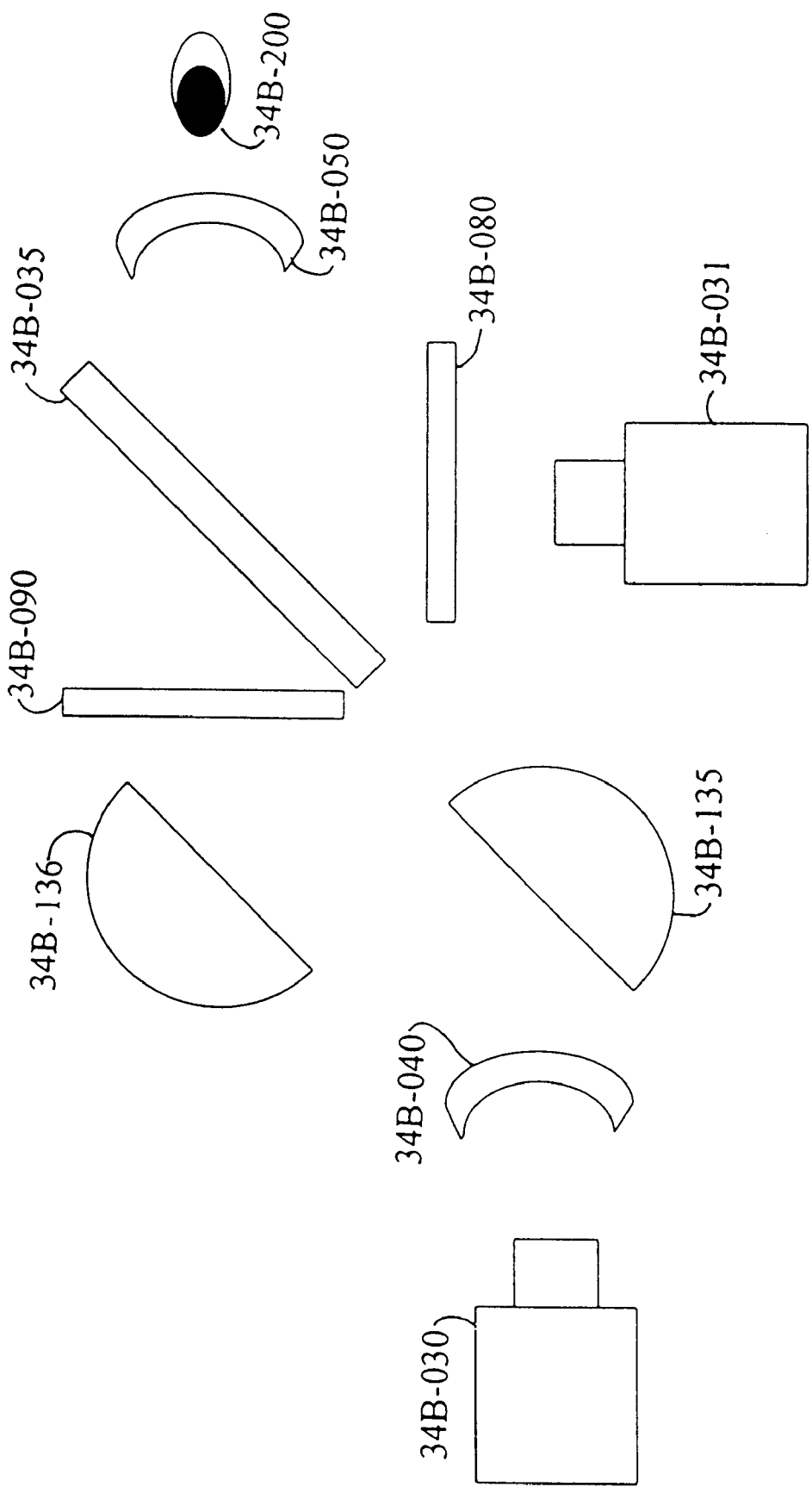
FIG. 34B is a plan view of a 3-D imaging system of the present invention.

FIG. 34B is a plan view of an image display system of the present invention. Foreground projector 34B-030 projects onto curved projection screen 34B-040. Mirror 34B-135 and mirror 34B-136 reflect and reimage light from the curved projection screen 34B-040 into a real foreground image 34B-050. Viewer 34B-200 sees a virtual background image 34B-090, the reflection of background projection screen 34B-080 from reflective element 34B-035.

Mirror 34B-135 and 34B-136 are curved Fresnel mirrors, faceted Fresnel mirrors (as shown in FIGS. 32A and 32B), planar Fresnel mirrors or equivalent optics. As noted elsewhere in the application, either or both image source may be curved. Preferably the background image is curved to take create a "Cinerama" effect described in the Background of the Invention.

Figure 34C:
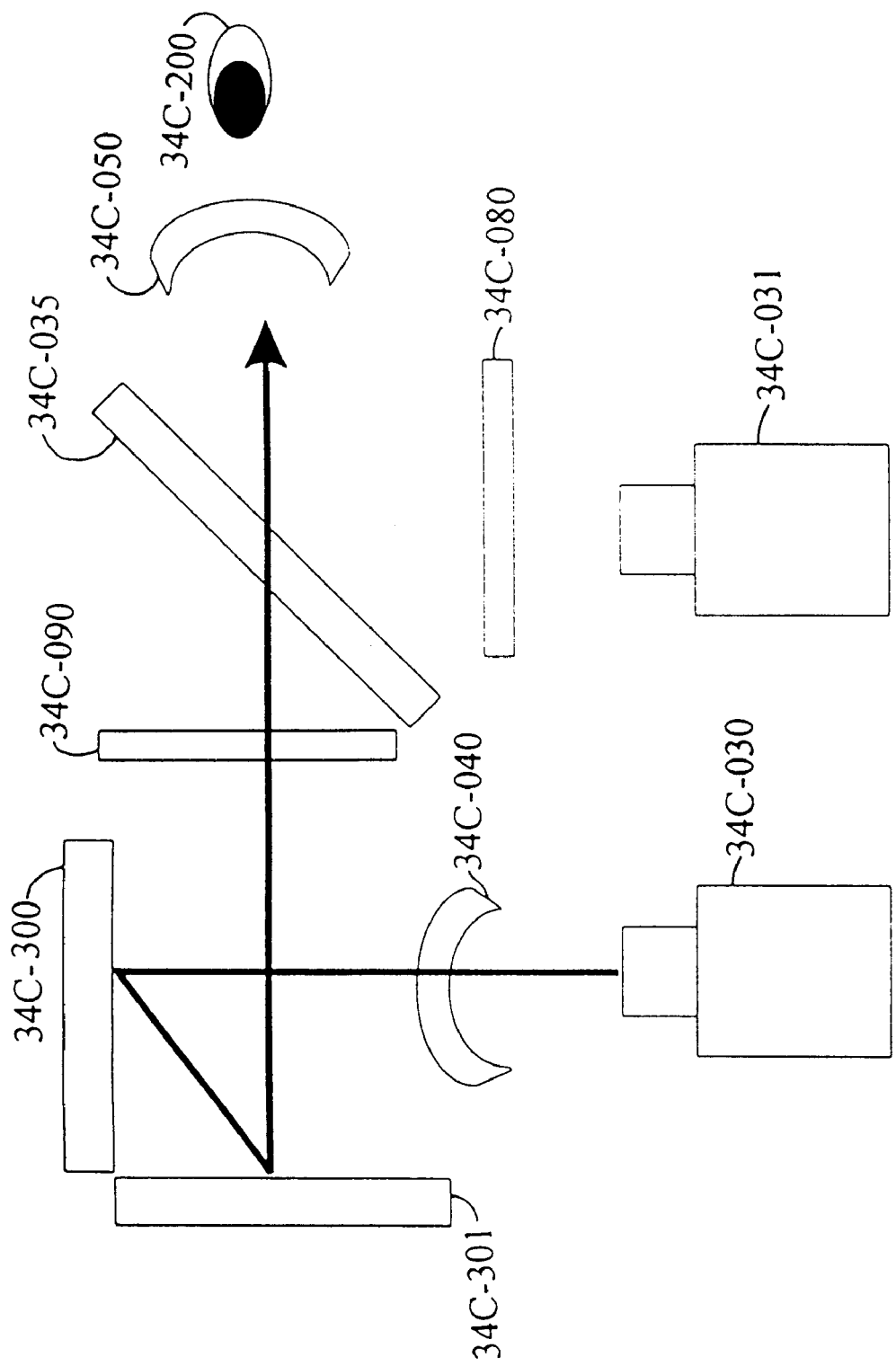
FIG. 34C is a plan view of a 3-D imaging system of the present invention.

FIG. 34C is a plan view of an image display system of the present invention similar to the one shown in FIG. 34B. In this embodiment, mirror 34C-300 is an off-axis Fresnel mirror and mirror 34C-301 is a Fresnel mirror.

Some embodiments of the display adapter use one or more lenses to present one or more real images to the viewer. While virtual images are "behind the glass," real images appear to leap from the optics and are an "above the glass" experience.

An image source placed at approximately 2F (twice the focal length) on one side of a lens causes a real image to form in space at approximately 2F on the other side of the lens. The exact location of the lens can be selected to increase or decrease the size of the final "floating" image. In many of the embodiments, at least one lens is placed so as to float at least the foreground image, the background image or both.

Fresnel Lens

In accordance with the present invention, an improved Fresnel lens is preferably employed. In general, a Fresnel lens is an optical element resembling a plano-convex or plano-concave lens that is cut into narrow rings and flattened out. Fresnel lenses can be large glass structures as in lighthouses, floodlights or traffic signals, or thin molded plastic plates with fine steps.

Fresnel lenses are commonly made from plastic, thus allowing them to be mass-produced inexpensively and quickly from a metal master. The metal master is typically made by rotating a copper or other material blank with a computer-manipulated cutting tool of diamond or other hard material. The master is then used to cast, emboss, compression mold or injection mold plastic replicas.

Conventional Fresnel lenses are formed with a series of annular rings and are therefore relatively thin, and relatively light. In contrast, conventional plano-convex and plano-concave lenses are thick, heavy, and expensive.

Fresnel lenses have poor resolving power when compared to conventional lenses because of the shape of the surface of each annulus. Each annulus of a Fresnel lens, when viewed in cross-section, has a vertical surface (a rise) and a lens-function surface (a face). Together the faces therefore merely approximate the desired curvature of the lens.

Annular lenses, such as Fresnel lenses, also suffer from flare or scatter of light as some of the light passes through and reflects off of the rise instead of through the lens face. To improve the optical performance of annular lenses, the amount of such light scattered by the rises should be reduced to a minimum.

Earlier workers have disclosed scratching or abrading the rises of Fresnel lenses. However, such methods do not provide a satisfactory solution to the problem of scattered light because the amount of scattered light is not reduced; rather it is merely scattered and flared in a different way.

The "lenserF" is another type of annular lens. The lenserF provides a lens which has as one side a series of spaced ring-shaped planar, or annular, faces, which together approximate the planar surface of a normal plano-convex or plano-concave lens. The annular faces are separated by rises. The concentric annular faces are reminiscent of a Fresnel lens, but with the planar face being stepped, rather than the curved face as in a Fresnel lens. Thus the name: "lenserF" is "Fresnel" spelled backwards.

A lenserF is thin, but, unlike a Fresnel, it is not flat. It retains the curved shape and depth of the plano-convex or plano-concave lens, and provides much better resolving power than a corresponding Fresnel lens that approximates the same curve. The effect of such a curvature is to create a cavity in which additional lenses (lenserFs or others) can be placed. Compounding or cascading of lenses can take place in a much smaller volume, allowing lenses to be closer together than with conventional lenses (allowing greater magnification, chromatic aberration correction, lower F number, etc.). Compound plastic lenses are capable of being made to minimize chromatic aberration.

An improvement to annular lenses, including Fresnel and lenserF lenses, disclosed herein comprises means for decreasing the amount of light scattered from the rises of the lens.

A number of techniques are disclosed herein which are optionally used alone, or in combination with scratching or abrading the rises, to reduce the light reflecting from the rises. These include: (1) coating the rise with opaque material; (2) applying an anti-reflective (AR) coating to the annuli of the lens; (3) pressing the lens from a blank having pre-printed opaque rings so that the pre-printed rings cover the rises of the lens; (4) using a transparent wave-retardation sheet in conjunction with polarized light; (5) using an opaque annular ring mask in conjunction with the lens; and (6) using photographic exposures of rings onto photosensitized rises and employing hydrophilic and hydrophobic coatings, copper over-coated with nickel with acid etched rings in the nickel, greasy ink, and water.

Specific substances appropriate to these purposes are known to those of skill in chemical technology. This information may be ascertained from customary reference works in this field, including for example the *Kirk-Othmer Encyclopedia of Chemical Technology, Beilstein's Handbuch*, and *Chemical Abstracts*.

These methods will be described below in greater detail using as an example an annular lens. However, it is to be understood that they are similarly applicable to other optical elements having rises.

One method employs coating the rises of the lens with an opaque absorptive material. Generally, an opaque material such as ink is made to adhere to the rise, while leaving other portions of the lens free of opaque material. The rise portion of the lens is preferably scratched, abraded or scored during manufacture to promote better adherence of opaque material to the rise portion.

(1a) The rise is desirably scratched, abraded or scored during manufacture to facilitate adherence. Opaque material such as ink may thereafter be applied to an annular lens or other optical element by dipping, spraying or other conventional means, then subjecting it to a brief wash, with or without wiping by rubber or other material with appropriate grooves. Such a technique results in a coat of ink adhering to the scratched rise and leaves the smooth lens faces uncoated.

(1b) In another embodiment of the invention, the application of opaque material to selected areas of an annular lens is optionally achieved by the use of a photoresist. The photoresist is then used to protect the coated regions of the lens from the opaque material. This embodiment of the invention is optionally implemented by applying a coating of positive photoresist to the entire lens. Positive photoresist generally softens or depolymerizes upon exposure to light. A light shield with an appropriate opening (e.g. wedge-shaped) is then placed over the lens, so that when the lens is exposed to light from the proper angle, the faces are not exposed to light. The lens is rotated to provide successive exposure of the lens rises around the entire 360 degrees. By this process the rises, but not the faces, are exposed to light. A resist developer is then used to rinse away the photoresist from the rises, while leaving the unexposed photoresist on the face portions. The entire lens can then be coated with opaque material that is capable of adhering to the lens rises but that is prevented from adhering to the lens faces because of the presence of the photoresist thereon. The photoresist is then removed from the lens faces by further rinsing with developer to dissolve away the unexposed resist together with the opaque material coating it. This process leaves rises coated with opaque material and clear faces.

(1c) Yet another embodiment of the invention that uses a negative photoresist is as follows. Negative photoresist generally hardens or polymerizes upon exposure to light. As in the method described in section (1b) above, the lens is dipped or sprayed in photoresist and then exposed to a properly masked light. In this method, however the light exposure is arranged to strike the resist only on the faces. A developer will rinse away the unexposed negative photoresist from the rises. Coating of the lens with opaque material, and removal of remaining resist and opaque material from the races is then performed as disclosed above.

(1d) Yet another embodiment of the invention involves using a photoresist that is black or other dark color, dyed black or other dark color, or is otherwise opaque once the process is finished. With proper exposure and development, e.g. as described above, the rises are left coated with the black resist, while the faces are left uncoated.

(1e) In another embodiment of the invention, pre-printed opaque rings or striations are positioned on material such as flat plastic such that when the lens or other optical element is pressed, stamped, embossed or molded, the rise portions of the completed lens will be made up of the opaque pre-printed rings.

(1f) In yet another embodiment, a transparent element having pre-printed thereon opaque lines or circles is positioned with respect to the rises of an existing stepped optical element such that the opaque markings intercept a substantial portion of the light which passes through, or which reflects off of, the rises. Optionally the opaque markings may be on the reverse side of the substrate from which the optical element is constructed.

(1g) In another embodiment, emulsion coated on both faces and rises of the lens are scanned by laser or exposed to an annular pattern to become dark on rises while being clear on faces after standard photographic development.

(1h) In another embodiment, grooves are formed in the lens surface when the lens is made. Then ink is put on and "doctor bladed" off, leaving ink in the grooves. Drying of the ink can be done by air, UV, heat, etc.

(2) Another embodiment of the invention involves applying an antireflective coating to virtually all surfaces of the lens to reduce reflection of any light from it. This embodiment of the invention effects its result in a manner similar to the way in which an AR coating on a television tube eliminates the reflections from room lights. In this embodiment of the invention, an AR coating applied to the Fresnel lens also coats the rises, thus reducing the reflection of light that impinges on or reflects from the rises.

Yet a further embodiment of the invention includes an AR coating on virtually all surfaces of an annular lens and an opaque coating on the rises. This embodiment combines a reduction of light reflected from the faces and an absorption of light that would otherwise pass outwardly through the rises, to further reduce light passing through or reflecting from the rise portions.

(3) In another embodiment of the invention, scattering from the rises of the lens is reduced by using an image source that produces circularly polarized light. Such an image source is optionally an LCD in conjunction with an appropriate polarizer, or it is optionally another source of light that has been circularly polarized. In this embodiment, only light which passes through the lens face directly without being reflected from the rise will be transmitted by a circular analyzer.

Annular Lens Embodiments

Figure 35A:
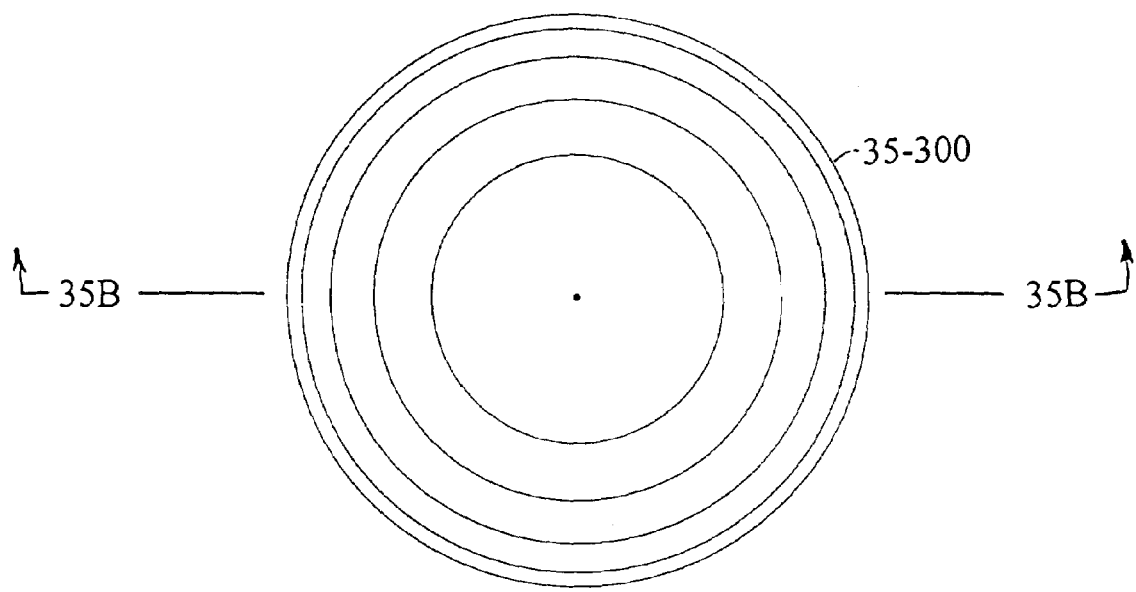
FIG. 35A is an elevation view of a Fresnel lens.
Figure 35B:
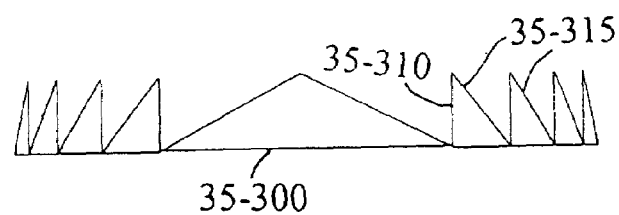
FIG. 35B is a cross-section view of a Fresnel lens taken at line 35B-35B.

FIG. 35A shows a plan view of a Fresnel lens 35-300 of the prior art. FIG. 35B is a cross-sectional view of a Fresnel lens 35-300, taken at line 35B-35B. Shown is a rise portion 35-310 and a face portion 35-315.

Figure 36:
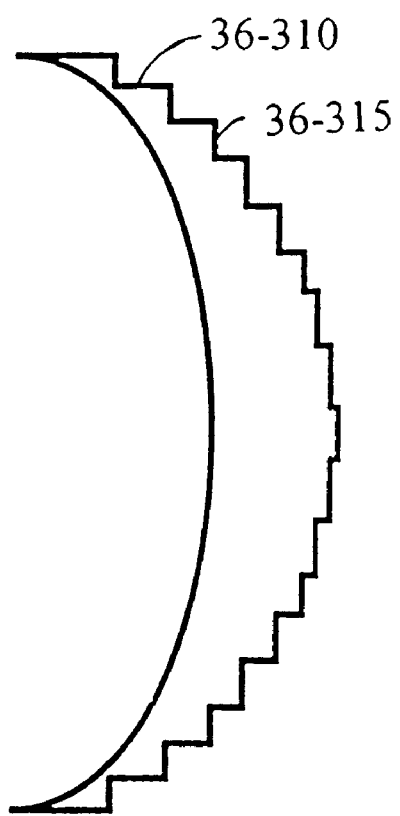
FIG. 36 is a cross-section view of a "lenserF" lens (LenserF is Fresnel backwards).
Figure 37:
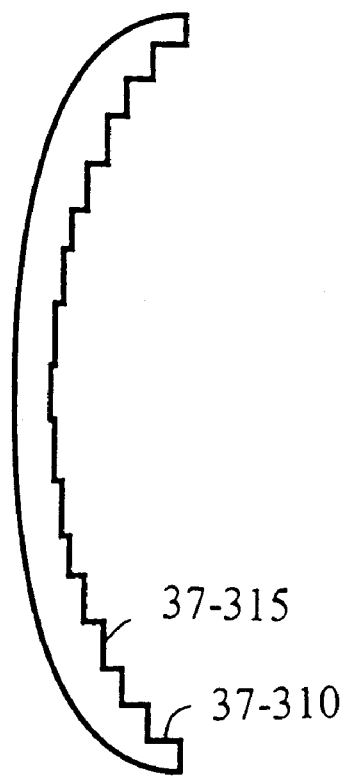
FIG. 37 is a cross-section view of a plano-convex lenserF lens.

LenserF lenses are shown in FIGS. 36 and 37. FIG. 36 shows a cross section of a plano-concave lenserF 36-300, which has rise portion 36-310 and a face portion 36-315. FIG. 37 shows a cross section of a plano-convex lenserF 37-300.

Figure 38:
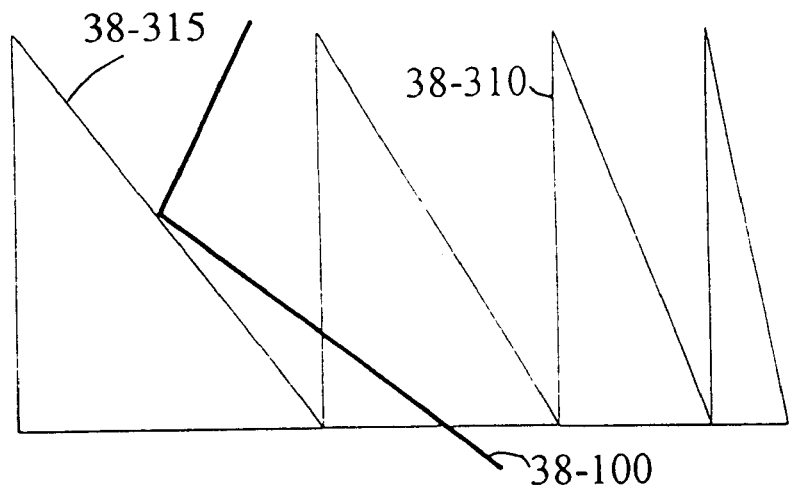
FIG. 38 is a cross-section view of a portion of a Fresnel lens schematically illustrating light passing through the rise portion of the lens.

In FIG. 38 are shown details of a Fresnel lens 38-300 in cross-sectional view. Light ray 38-100 is shown. Rise portion 38-310 and face portion 38-315 are depicted.

Light ray 38-100 passes through rise portion 38-310. Light ray 38-100 then reflects from face portion 38-315, contributing to scatter or flare.

Figure 39:
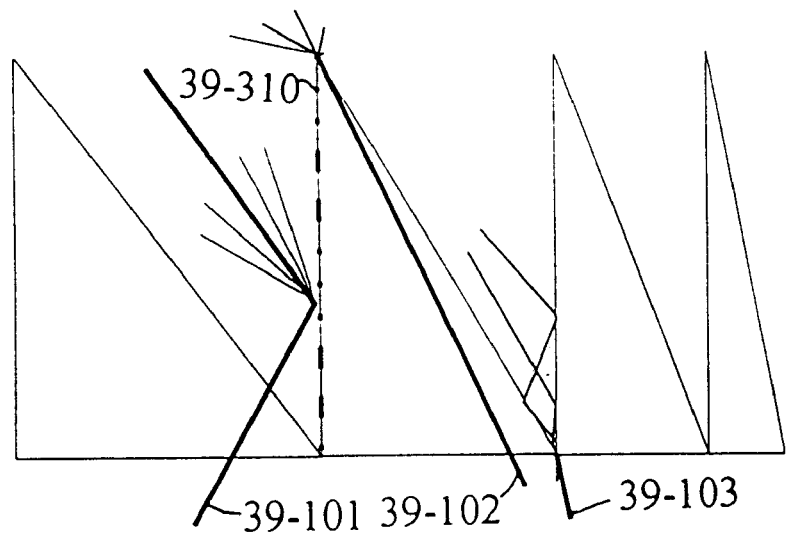
FIG. 39 is a cross-section view of a portion of a Fresnel lens which has a scored rise and shows light reflecting and scattering from the scored rise.

FIG. 39 shows details of a Fresnel lens 39-300 in cross-sectional view. Light rays 39-101, 39-102, and 39-103 are shown. Also shown is scored rise 39-310. FIG. 39 schematically illustrates additional scatter or flare arising from light ray 39-101 being reflected from a scratched rise 39-310 of a prior art Fresnel lens. Light ray 39-102 is shown to produce additional scatter or flare as it passes through the scored rise 39-310 and is refracted. Light ray 39-102 is shown to contribute additional scatter and flare. Light ray 39-103 contributes to scatter and flare.

Figure 40:
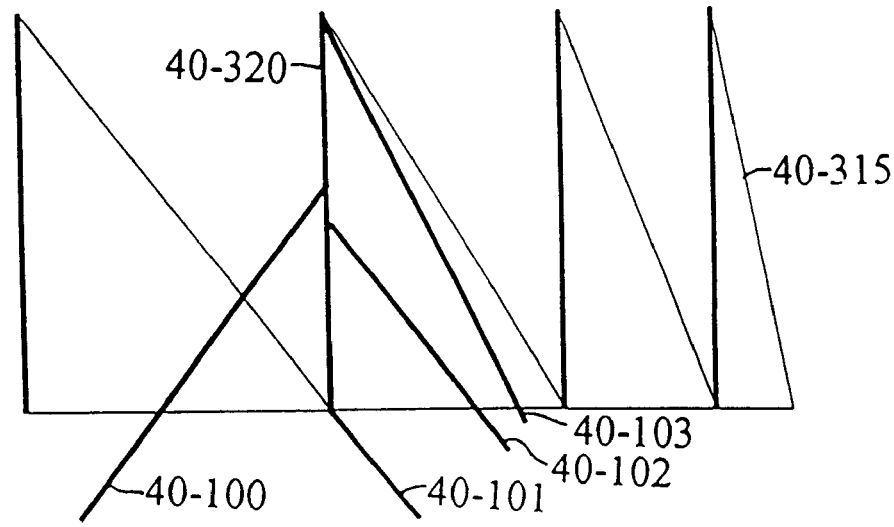
FIG. 40 is a cross-section view of a portion of a Fresnel lens which has an opaque coating on the rise, reducing scatter and flare.

FIG. 40 shows light rays 40-100, 40-101, 40-102, and 40-103. FIG. 40 also shows details of a Fresnel lens 40-300 in cross-sectional view. Also shown are each opaque rise portion 40-320. Light rays 40-100, 40-101, 40-102, and 40-103 are each shown to be absorbed upon hitting the rise portion 40-320.

In accordance with the present invention, an opaque material such as ink or other coating material is made to adhere to the rise, while leaving other portions of the lens free of opaque material. The rise of the lens is preferably scratched, abraded or scored during manufacture to promote better adherence of material to the rise.

Opaque material is optionally applied to a lens by dipping or spraying the lens with a coating such as ink, then subjecting the lens to a brief wash. Such a technique results in a coat of ink adhering to the scratched rise and leaves each smooth lens face uncoated.

Figure 42:
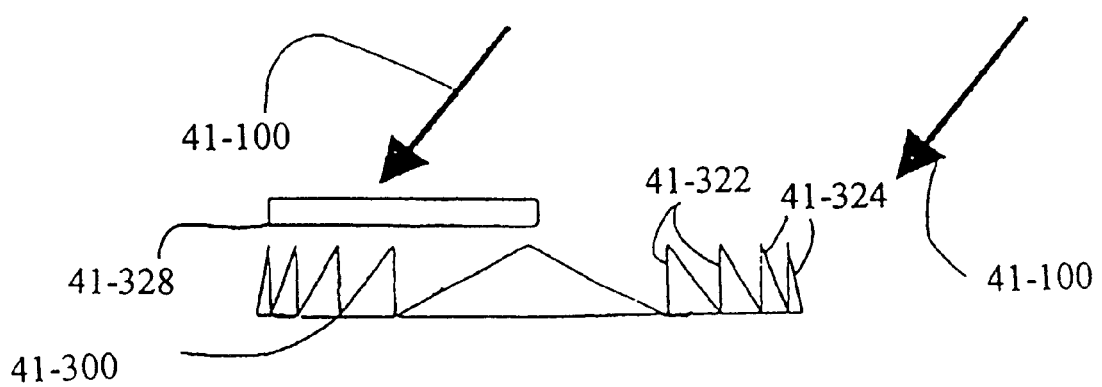
FIG. 42 is a cross-sectional elevation view of the annular lens of FIG. 41, taken along the line 48-48.

FIG. 41 shows another way to provide such opacity using photoresist on a Fresnel lens 41-300. A light shield 41-328 with a wedge-shaped opening 41-329 is shown. FIG. 42 is a cross sectional view of FIG. 41 taken along line 42. Light rays 41-100 and 41-101 are shown. Unexposed photoresist 41-322 is shown. Exposed photoresist 41-324 is shown. Also shown is light shield 41-328.

In an embodiment of the lens improvement, the application of opaque material to each rise of the lens is optionally achieved by the use of a photoresist. This embodiment of the invention is optionally implemented by applying a coating of negative photoresist to the entire lens 41-300. A light shield 41-328 with a wedge-shaped opening 41-329 is then placed over the lens 41-300, so that when the lens is exposed to light as from light ray 41-100 from the proper angle, each rise 41-310 is not exposed to light. The lens 41-300 is rotated to provide successive exposure of each lens face 41-315 around the entire 360 degrees. By this process each face 41-315, but not any rise 41-310, is exposed to light.

A resist developer is then used to rinse away the photoresist from each rise 41-310, while leaving the exposed photoresist on each face 41-315. The entire lens 41-300 can then be coated with opaque material that is capable of adhering to the lens 41-300 but that is prevented from adhering to the lens faces because of the presence of the photoresist thereon. The photoresist is then removed from each face 44-315 by further rinsing with developer to dissolve away the exposed resist 41-324 together with the opaque material coating it. This process leaves each rise 41-310 coated with opaque material and every face 41-315 clear.

Yet another embodiment of the invention that uses a positive photoresist is as follows. As in the method described above, the lens 41-300 is dipped or sprayed in photoresist and then exposed to a properly masked light. In this method, however, the light exposure is arranged to strike the resist only on each rise 41-310. A developer will rinse away the exposed positive photoresist from each rise 41-310. Coating of the lens 41-300 with opaque material is performed as disclosed above. The resist is developed away each face 41-315.

Yet another embodiment of the invention involves using a photoresist that is dyed dark. With proper exposure and development, each rise 41-310 is left coated with the black resist, while each face 41-315 is left uncoated.

Figure 43:
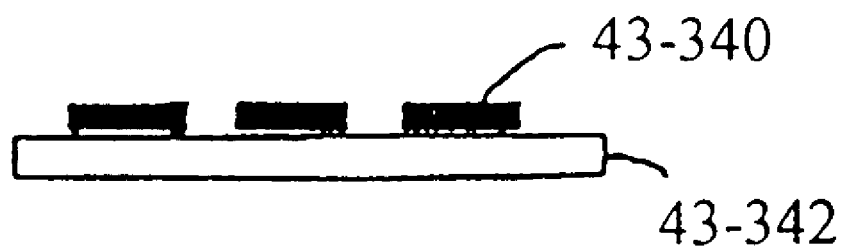
FIG. 43 is a cross-section view of a sheet of plastic lens material having opaque pre-printed rings thereon, preparatory to being formed into an annular lens of the present invention.
Figure 44:
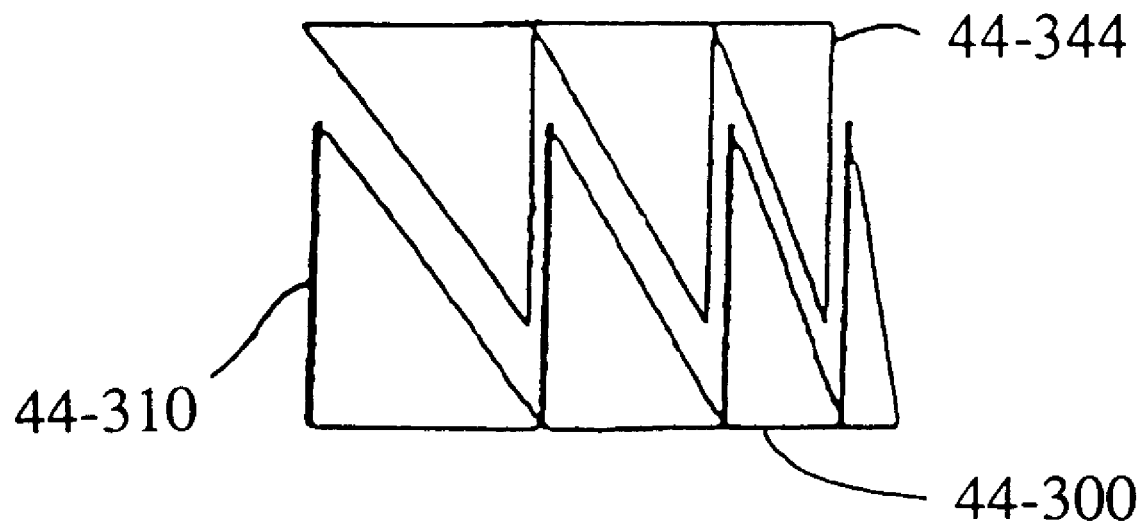
FIG. 44 is a cross-section view of a step in the formation of an annular lens of the present invention by a press or mold, forming a lens with opaque rises from the sheet of plastic material shown in FIG. 43.

Referring now to FIG. 43, in another embodiment of the invention there are opaque pre-printed rings 43-340 positioned on lens material 43-342. The opaque pre-printed rings 43-340 are positioned such that when a lens 44-300 is pressed, stamped, embossed or molded, each rise 44-310 of the completed lens 44-300 will be made up of the opaque pre-printed rings 44-390.

Figure 45:
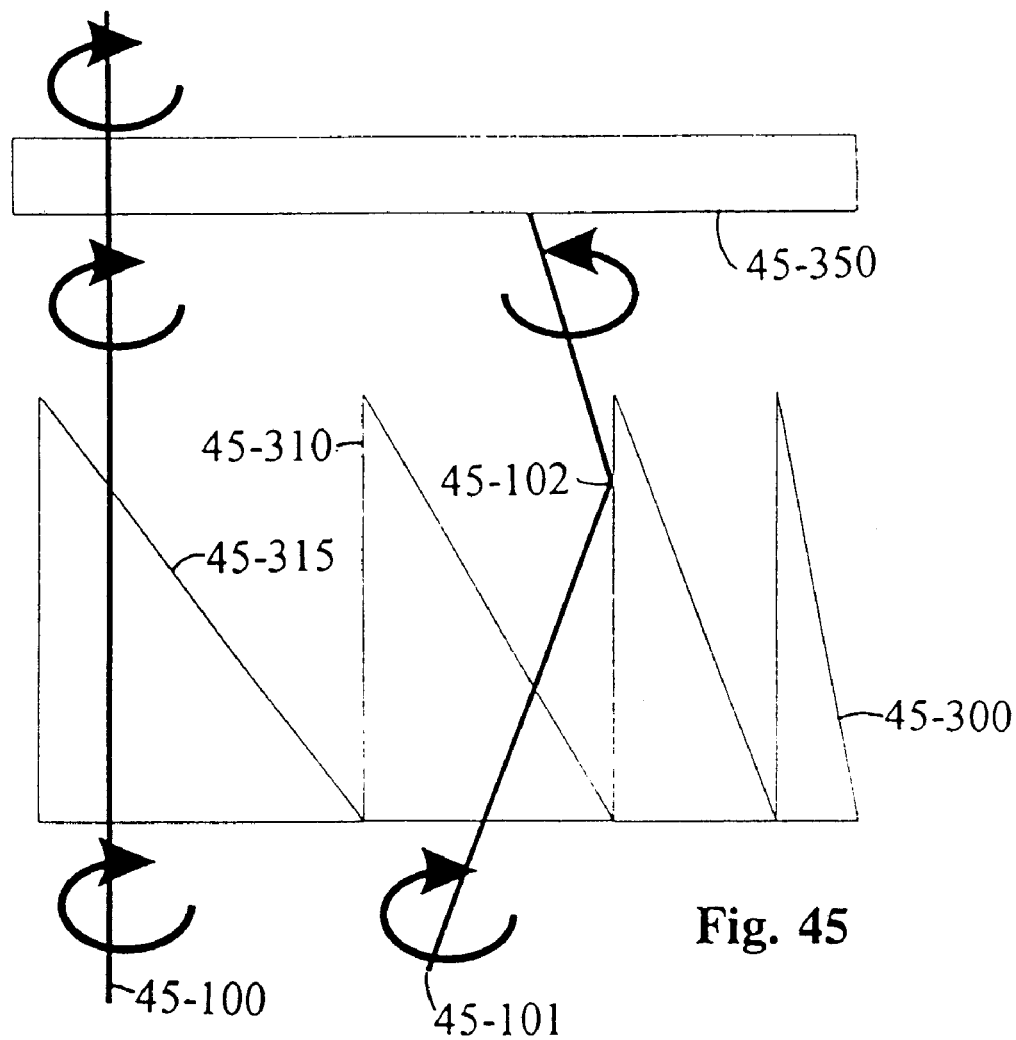
FIG. 45 is a cross-section view of a portion of an annular lens, and a wave plate, schematically illustrating the passage of beams of polarized light therethrough.

FIG. 45 shows an embodiment involving circularly polarized light. Light ray 45-100, light ray 45-101, and light ray reference point 45-102 are shown. Also shown are the Fresnel lens 45-300, each rise portion 45-310, each face portion 45-315, and a circular polarizer 45-350.

Scattering from each rise 45-310 of the lens 45-300 is reduced by providing an image source that produces circularly polarized light. Such light is optionally provided by the output from an LCD or is optionally other light that has been circularly polarized. In this embodiment, a circular polarizer 45-350 is provided so that light ray 45-100 which passes through the face will be properly transmitted by circular polarizer 45-350. However, when light ray 45-101 reflects from the rise 45-310 at light reference point 45-102, its polarization will change and it will not pass through the circular polarizer plate 45-350.

Figure 46:
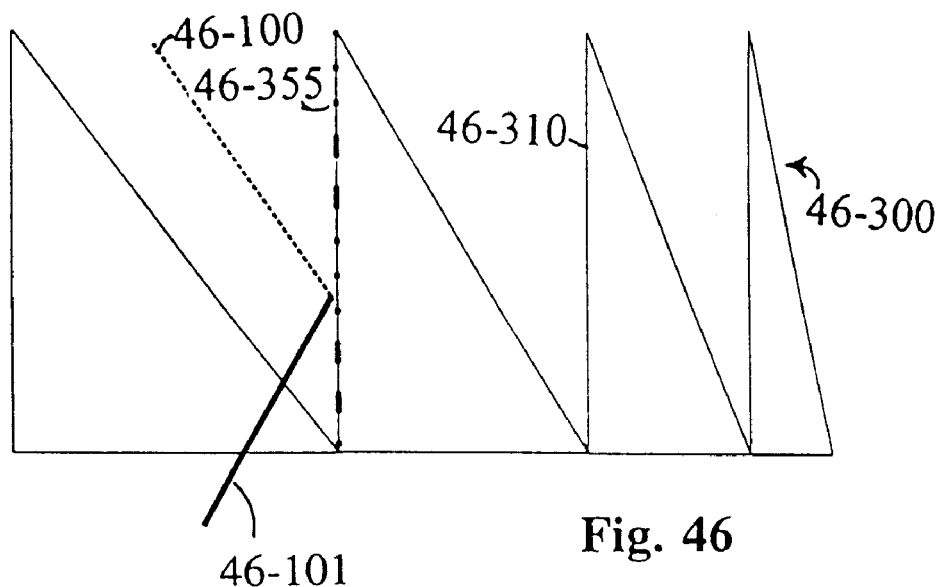
FIG. 46 is a cross-section view of a portion of an annular lens coated with anti-reflective (AR) coating, schematically illustrating the effect of AR coating on a beam of light.
Figure 46B:
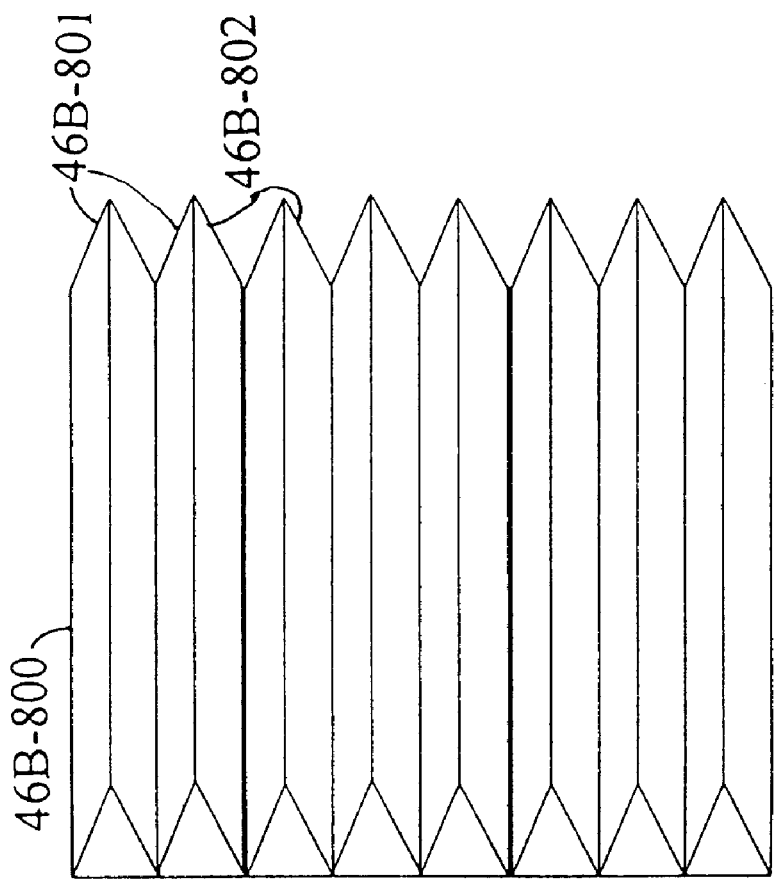
FIG. 46B is a perspective view of two optical elements of the present invention.
Figure 46A:
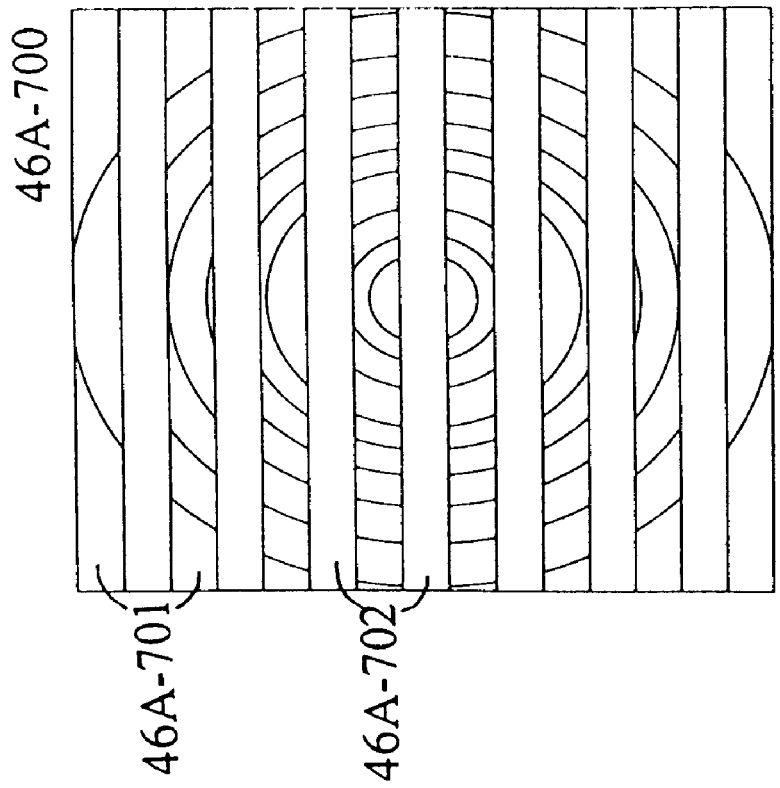
FIG. 46A is a plan view of an optical element of the present invention.

Referring now to FIG. 46, another embodiment of the invention involves applying an anti-reflective (AR) coating to the lens 46-300 to reduce reflection of any light from any face 46-315 and any rise 46-310. This embodiment of the invention effects its result in a manner similar to the way in which an AR coating on a television tube eliminates the reflections from room lights. In this embodiment of the invention an AR coating 46-355 applied to the Fresnel lens also coats each rise 46-310, thus reducing the reflection of light 46-100 that passes through the lens 46-300.

Yet a further embodiment of the invention uses an AR coating together with an opaque coating 46-355. This embodiment combines a reduction of light reflected from any face 46-315 and an absorption of light to further reduce light passing through or reflecting from any rise 46-310.

Another embodiment of the single-image-source 3-D display adapter invention uses a special "sandwich" of optical elements, some of which have been invented for this purpose. It has the advantage of light weight when the elements are annular or Fresnel-type elements are typically formed from plastic sheets and are relatively simple and inexpensive to fabricate.

The three sandwich elements in combination create a pair of co-axial displaced images: a foreground image on the image source, and a virtual background image which appears behind the foreground image. The Fresnel cylinder lens is optionally used to regain image size and restore aspect ratio.

The following description provides details for an illustrative embodiment for use with a standard 17-inch screen, but of course this invention is readily adapted for use on monitors or television sets of other sizes using calculations known to those in the art. On a television screen or computer monitor measuring thirteen inches in the horizontal and ten inches in the vertical dimension, the top portion of the screen is the foreground image source, and the bottom portion of the screen is the background image source. The lens element "sandwich" of the present invention is placed parallel to the screen. In the embodiment being described, it is spaced about eight inches (8") from the front of the screen. The lens element sandwich is optionally placed in a collapsible housing, attached to the monitor with L-brackets, mounted to a base, or secured by other means known in the art.

The lens element sandwich comprises a Fresnel semi-lens and a Fresnel beamcombining element. Optionally it also includes a Fresnel cylinder lens if it is desired to modify the aspect ratio of the displayed image, e.g. where it is desired to double the height of the images displayed on the image source.

The first element of the lens element sandwich is a novel optical element that is hereby disclosed, which the inventor calls a Fresnel semi-lens 46A-700. It is designed to permit the viewer to view a foreground image at the position of the image source (the face of the television tube) and a virtual background image which appears four inches behind the foreground image. It consists of alternating sets of segments, one set 46A-701 of segments being part of a Fresnel lens and the other set 46A-702 of segments being parallel to the baseline of the sheet (flat). The segments are preferably in the form of narrow horizontal stripes but may take other shapes if desired. In the embodiment being specifically described as an example, the segments that are part of a Fresnel lens have a focal length of twenty-four inches. Light which passes through the Fresnel semi-lens faces will thus be reimaged as a virtual image four inches behind the image source, magnified 1.5 times.

The Fresnel semi-lens is a generally sheetlike optical element that is grooved on one side, having circular grooves that form rises and faces. In a conventional Fresnel lens, the faces approximate the curvature of a regular optical lens. In the Fresnel semi-lens of the present invention, only a portion of the area of the optical element approximates the curvature of a convex (or for other purposes, a concave) optical lens) while the rest of the area of the Fresnel semi-lens is parallel to the baseline (i.e. flat) and thus permits light along the axis to pass through unrefracted. The Fresnel semi-lens is constructed to cooperate with the Fresnel beam combining element to produce the desired overall effect.

The Fresnel beamcombining element can be in one of two forms: a Fresnel beamcombiner 46B-800 or a Fresnel semi-prism 46D-800. The function of this element is to bring the foreground image and the background image into alignment, as discussed hereinabove in connection with other embodiments of the overall invention. Either form of the Fresnel beamcombining element is sufficiently fine (as measured, for example, in grooves on the order of a millimeter or less) to be unresolvable by the human eye. This characteristic is also desirable for the Fresnel semi-lens.

The specifics of how and where the Fresnel beamcombining element brings the image into alignment are somewhat different from those of the previously described embodiments utilizing reflective optics and merit further discussion.

By Fresnel beamcombiner 46B-800, the inventor means a generally sheetlike optical element, preferably of plastic such as acrylic, that is grooved on one side. Unlike a Fresnel lens, where the grooves are circular and form rises and faces, a Fresnel beamcombiner 46B-800 has a regular series of linear grooves that are isosceles triangular in cross section. The faces of each such triangle on the left side form a first set of facets that tend to act in unison on light from a particular source, and the faces of each such triangle on the right side form a second set of facets that similarly tend to act in unison. Commercial products that can be so employed are available from Fresnel Optics, Inc., Henrietta, N.Y., in the PR 700 series of catalog numbers (identified as beamsplitters, since a beam going in the opposite direction from the combined beam produced by the present invention is split into two directions).

In embodiments wherein the Fresnel beam combining element is a Fresnel beamcombiner, a viewer sees light from the light source through each of the two sets of facets. Light from the top half of the monitor coming through one set 46B-801 of facets of the Fresnel beamcombiner is bent toward the viewer. Similarly, light from the bottom half of the monitor coming through the other set 46B-802 of facets of the Fresnel beamcombiner 46B-800 is correspondingly bent in the opposite direction and also directed towards the viewer. The angle between the input beams in this embodiment is approximately thirty-five degrees. Light from the top half of the image source and light from its bottom half are thus co-aligned: from the viewer's vantage point the foreground image from the top half of the monitor is superimposed on the background image, from the bottom half of the monitor, in line with the center of the image source.

As an alternative embodiment, the Fresnel beam combining element is a novel optical element that is hereby disclosed, which the inventor calls a Fresnel semi-prism. To describe the novel Fresnel semi-prism, the inventor needs first to discuss conventional Fresnel prisms. Conventional Fresnel prisms are available from Fresnel Optics, Inc. in the PR 600 and PR 700 series of catalog numbers. A Fresnel prism is also a generally sheetlike optical element that is grooved on one side. Its faces consist of straight lines that are all sloped the same angle to the baseline of the sheet. Its rises approximate the vertical, as in a Fresnel lens, but they are linear rather than circular. A Fresnel prism differs from a Fresnel beamcombiner in that its cross section shows repeating right triangles, rather than isosceles triangles.

Just as a convex Fresnel lens tends to focus light from a source much as the corresponding planoconvex (regular) lens does, a Fresnel prism refracts light from a source much as a regular right-triangular prism does. If one looks at a scene and then at the same scene through a Fresnel prism, the scene appears to be offset from its actual position. When the lines of the Fresnel prism are oriented horizontally, the apparent offset is vertical.

A Fresnel semi-prism is a kind of Fresnel beam combining element that presents to the viewer, in one co-axial orientation, light beams deriving from images in two different locations, e.g. on two different areas of a television screen. It does this by refracting light beams originating from one location and by passing directly without refraction light beams originating from the other location.

Conceptually, to convert a conventional Fresnel prism into the Fresnel semi-prism of the present invention, a certain portion of the diagonal faces are, in effect, replaced with flat clear faces. In one form of Fresnel semi-prism each diagonal face alternates with a flat face. Similarly to the situation mentioned above with regard to the Fresnel semi-lenses of the present invention, e.g. if the need is to control the brightness ratio between one image source and the other, it is optionally desirable to vary the proportion of the total area of flat faces as compared to the total area of diagonal faces. Various arrangements of faces are within the scope of the invention of a Fresnel semi-prism, the important point being that it contains flat clear areas in some interdispersed distribution with prismatic areas. In use, light from the bottom half of the image source (e.g. television tube face) passes through a prism portion of the Fresnel semi-prism and is refracted so it is co-aligned with light from the top half of the image source. Light from the top half of the source passes through the non-prism or flat portion of Fresnel semi-prism, and its direction is unchanged. Thus the foreground image and background image are co-axially aligned from the vantage point of the viewer.

As mentioned above, the Fresnel semi-lens acts on light coming from the bottom half of the display (such as a CRT) to create a virtual image that is behind the face of the display (i.e. the face of the CRT). When viewed coaxially with the image from the top half of the screen that appears coplanar with the face of the tube, the viewer perceives a real-depth experience as described hereinabove.

A third, optional, element of the sandwich of optical elements of the present embodiment is a Fresnel cylinder lens, such as those from Fresnel Optics, Inc. in the catalog number series CY 500. In the embodiment being described, it desirably has a focal length of about sixteen inches. The images on the screen are each pre-compressed 2:1 in the vertical. The Fresnel cylinder lens acts to expand the picture to compensate for 2:1 vertical compression as discussed hereinabove, restoring aspect ratio and image size. This element is not necessary if restoration of aspect ratio is not desired. If it is not used, then the images are not pre-compressed in the vertical dimension.

Since the Fresnel beam combining element needs to be carefully aligned with the Fresnel semi-lens element, these two elements are preferably embossed or molded on opposite sides of the same plastic substrate. The flat faces on the Fresnel semi-prism and the flat areas of the Fresnel semi-lens are aligned so that the light from the top half of the screen is not re-imaged for the viewer by the Fresnel lens segments. The Fresnel lens segments of the Fresnel semi-lens are aligned with the optically refractive elements of the Fresnel beam combining element. If the Fresnel beamcombiner is used as the Fresnel beam combining element, the bottom half of each prism sub-element is lined up with a clear segment of the Fresnel semi-lens. Using either embodiment, light from the bottom half of the screen which passes through the Fresnel lens segments of the Fresnel semi-lens is reimaged as a virtual image about four inches behind the image source.

Alternatively a holographic optical element may be constructed (using known techniques) with the equivalent functionality of the two or three subelements of the Fresnel sandwich described herein to accomplish the same tasks.

Multiplayer 3-D Adapter

A further embodiment of the invention disclosed herein is a multiplayer 3-D adapter. As in the single-image-source 3-D adapters, the output of an image source (such as a television monitor or other standard CRT) is segmented. However, instead of being segmented into a single foreground section and a single background section, the screen is divided into multiple foreground sections and multiple background sections. One set of foreground and background images is routed to each player (or viewer) preferably in a manner which does not allow any other player to see another player's view.

In one embodiment, for example, a computer screen is split vertically. The right-hand portion of the screen is the first player image source. The left-hand portion is the second player image source. The right-hand portion is further subdivided into a foreground image section and a background image section as discussed hereinabove. Also, as previously discussed, the foreground image and the background image are co-aligned using reflective elements such as a beamcombiner. Additional optics are optionally used to re-direct and magnify the 3-D scene so that it is not visible from the second player's seating position. The same is done for the second player's image source.

Another embodiment splits the image source horizontally. The top of the image source is used as a first player section, and the bottom of the image source is used as a second player section. The upper left corner is used as the first player's background source, and the upper right is used as the first player's foreground source. A conventional mirror is used to reflect the background source to a reflective element which is used to co-align foreground and background images. Secondary optics, such as a conventional mirror, are optionally added to redirect the output to a seating position in front of the image source. Additionally, a Fresnel lens (or other reimaging optics) is optionally used to create a real image for a controlled angle of view. The controlled angle of view can be made so that the second player may not see the first player's image. The lower right corner is used as the second player's background source. The lower left corner is used as the second player's foreground source. Again, the images are co-aligned and preferably redirected so that the first player can not see the second player's image.

Dividing the screen into four player sections is optionally done as well. Each quadrant is further subdivided into foreground and background areas which are co-aligned. Again, they are preferably presented so that other players do not have a view of the screen. The secondary optics are preferably arranged so that all players sit in front of the monitor or so that the players may surround the monitor in various seating configurations.

A multiplayer adapter (whether or not 3-D) allows inexpensive home systems (like Sega Genesis, Nintendo or personal computers) to let people play multiplayer games that are preferably all of these: simultaneous, secret, multiperspective, multiplayer, non-networked. In the following paragraphs, current games will be examined that are missing at least one from that group of attributes.

Simultaneous action is lost in serial play: where first one player takes a turn and then another player takes hers. Games like Stratego or Battleship do not have simultaneous action, although they use secret multiperspectives in a non-networked game.

Some car racing games are multiperspective, and even split the monitor screen to provide each driver with his own view. These games lack the secret element because a player can simply look at the other player's portion of the screen. In the car racing game, that is largely unimportant, but in other games where stealth is a part of the action for example, secrecy is paramount.

Multiperspective is missing from a number of the "fight" games on the market (Virtua Fighter, Mortal Kombat). The contestants are shown battling it out in a ring from a shared perspective.

Multiplayer games like Doom, Heretic and Descent are currently played over networks: more than one machine and some connective means is required to play the game. For example they use a port-to-port connection, modem connection, local-area or wide-area network (LAN or WAN) connection, dial-up service (such as DWANGO) or the Internet. At the very least, a second image source is often used (i.e. a second monitor in some video arcade games).

Kali software (World Wide Web http://www.kali.com) allows people to play games over the Internet as if players were on the same local area network. TheLadder (World Wide Web http://www.theladder.com) hosts world-wide ranking systems for thousands of individuals and teams who play Doom, Descent, and WarCraft II.

The addition of the connective means makes it much more expensive and inconvenient to play games where a secret, multiperspective is important. The multiplayer adapter of the present invention solves all of those problems: on it one can play games that are simultaneous, secret, multiperspective, multiplayer, and yet non-networked.

As an example, two players can play Doom using the present multiplayer adapter. Doom is a "first person" game, that is, the player's view is what his character sees as he runs around in a maze, killing things. So if the first player sneaks up from behind the second player, the first player will see the second player, who may remain unaware of the first player's presence. As anyone who has played "twitch" games can attest: surprise is one of the fun parts.

In (non 3-D) multiplayer adapter, the output of a standard CRT is split and each portion is directed to a different player by the use of mirrors. This allows two players that share the same monitor to have independent and "secret" views of the computer screen. Additional divisions of the screen, as well as additional reflecting and/or magnifying optics, allow the game action to be routed to many players from the same monitor. The players may sit on different sides of the monitor or on the same side, depending on the embodiment.

Figure 47:
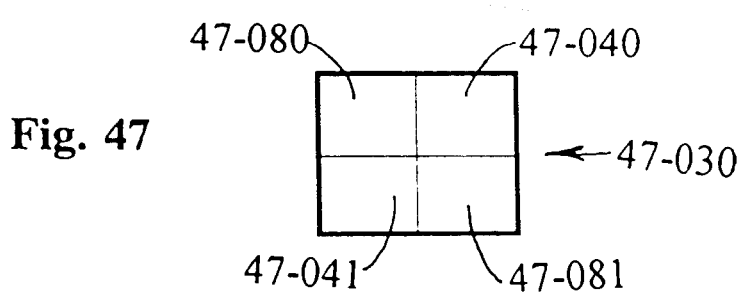
FIG. 47 is a view of an image source.
Figure 47A:
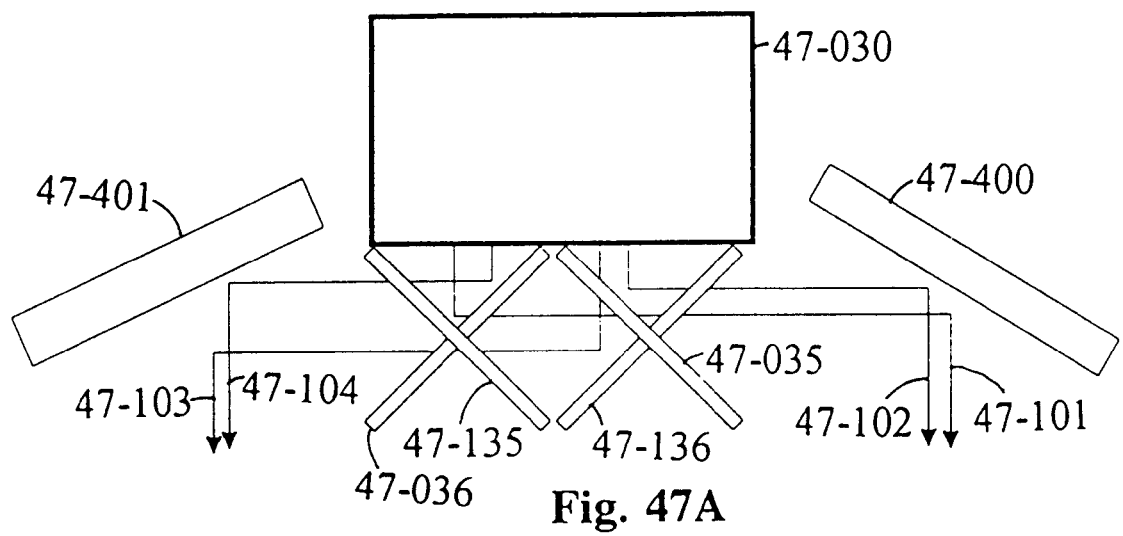
FIG. 47A is a plan view of a 3-D imaging system of this invention.
Figure 48:
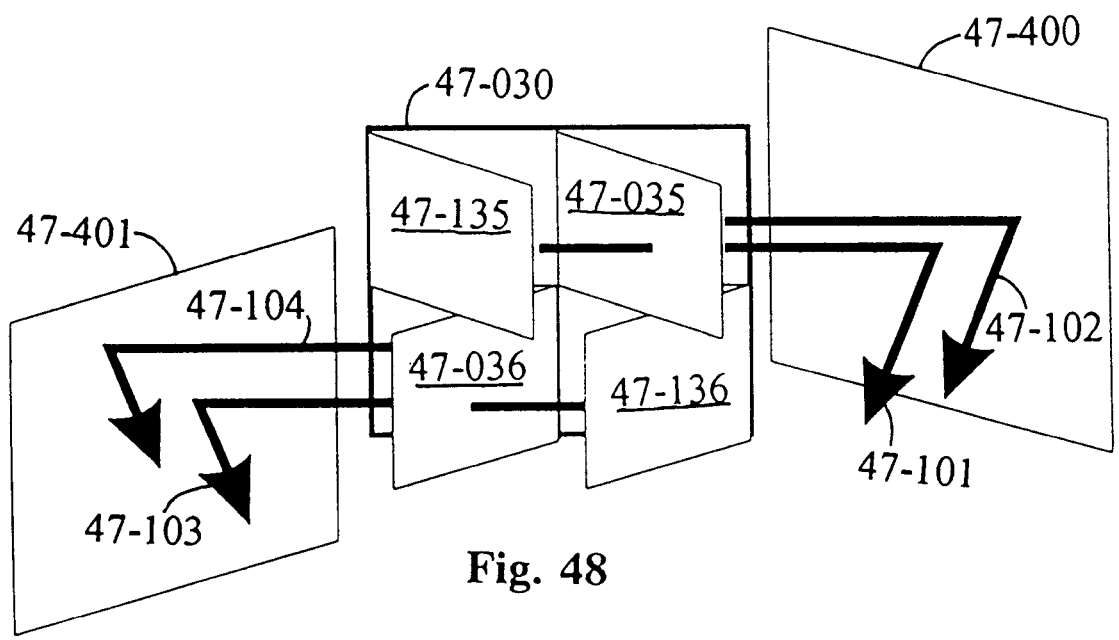
FIG. 48 is a perspective view of the 3-D imaging system of FIG. 47.

FIG. 47 shows an image source 47-030. FIG. 47A shows a plan view of a multiplayer 3-D imaging system. FIG. 48 shows a perspective view of a multiplayer 3-D imaging system. Depicted are: First reflective element 47-035 a second reflective element 47-036. First foreground image source 47-040 and second foreground image source 47-041. First background image source 47-080 and second background image source 47-081. First conventional mirror 47-135 and second conventional mirror 47-136. First spherical mirror 47-400 and second spherical mirror 47-401.

Just as the single-image-source-adapter segments an image source into a single foreground image source and a single background image source, the multiplayer adapter segments an image source into multiple foreground image sources and multiple background image sources. This embodiment segments the image source 47-030 into a first foreground image source 47-040 and a first background image source 47-080. First background image source 47-080 is reflected from a first conventional mirror 47-135 to the first reflective element 47-035. Light from the foreground image source is reflected from the first reflective element 47-035. Thus, as in other embodiments, first reflective element 47-035 acts as a beamcombiner. The co-aligned images are optionally further reflected and magnified as desired by first spherical mirror 47-400.

This embodiment also segments the image source 47-030 into a second foreground image source 47-040 and a second background image source 47-080. Second background image source 47-080 is reflected from a second conventional mirror 47-136 to the second reflective element 47-035. Light from the foreground image source is reflected from the second reflective element 47-035. Thus, as in other embodiments, second reflective element 47-035 acts as a beamcombiner. The co-aligned images are optionally further reflected and magnified as desired by second spherical mirror 47-400.

Figure 49:
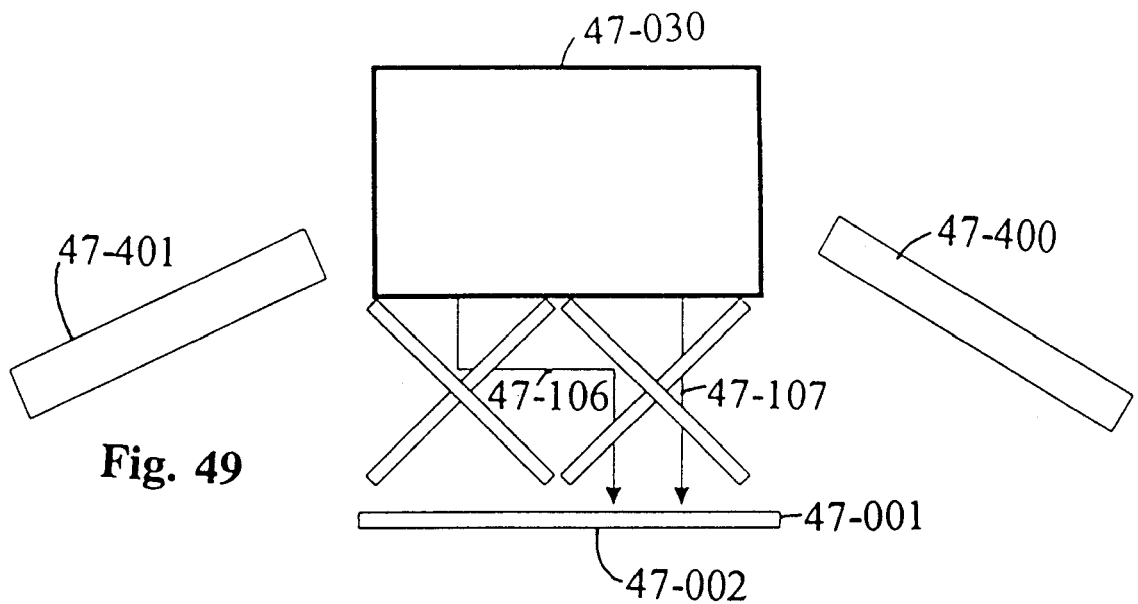
FIG. 49 is a plan view of an imaging system which functions as a multiplayer adapter.
Figure 49A:
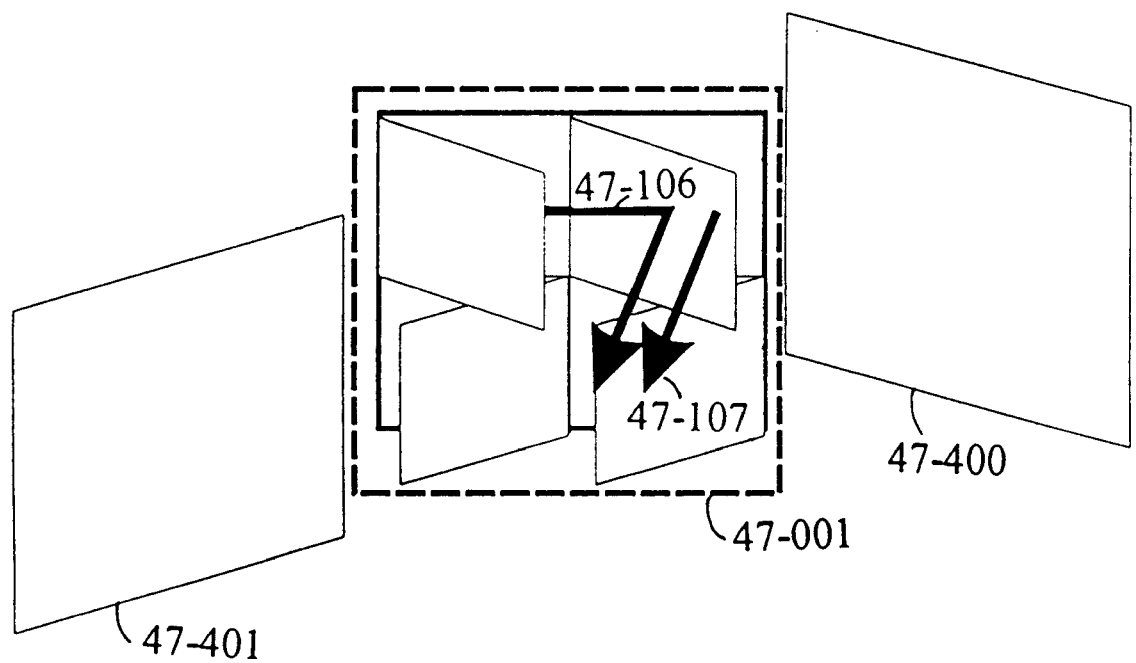
FIG. 49A is a perspective view of the imaging system of FIG. 49.

FIG. 49 is a plan view of the multiplayer adapter shown in FIGS. 47 and 48. FIG. 49A is a perspective view of the same embodiment. Shown is an additional optional housing 47-001. Also shown are Light ray 47-106 and 47-107. Optional housing 47-001 is provided with an opaque front face 47-002.

Light ray 47-106 emits from the first background image source 47-080, is reflected by conventional mirror 47-135 to the reflective element 47-035 from which it is reflected to the front of the monitor. Similarly, light ray 47-107 is transmitted by the reflective element and is visible to the a viewer sitting in front of the monitor. Similar problems occur with regard to the other player area. The opaque face 47-002 is provided to stop a viewer from having a direct line-of-sight 47-100 with either foreground image source.

Figure 50:
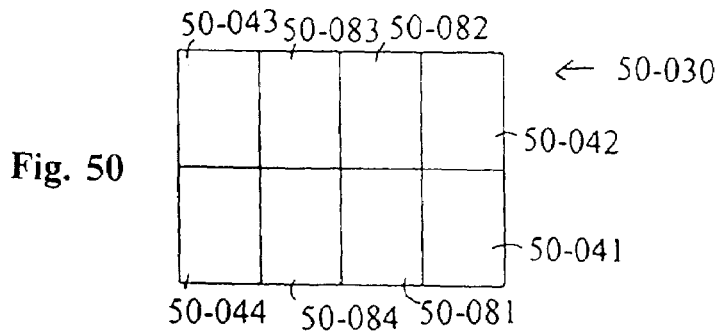
FIG. 50 is a view of an image source of the present invention.
Figure 51:
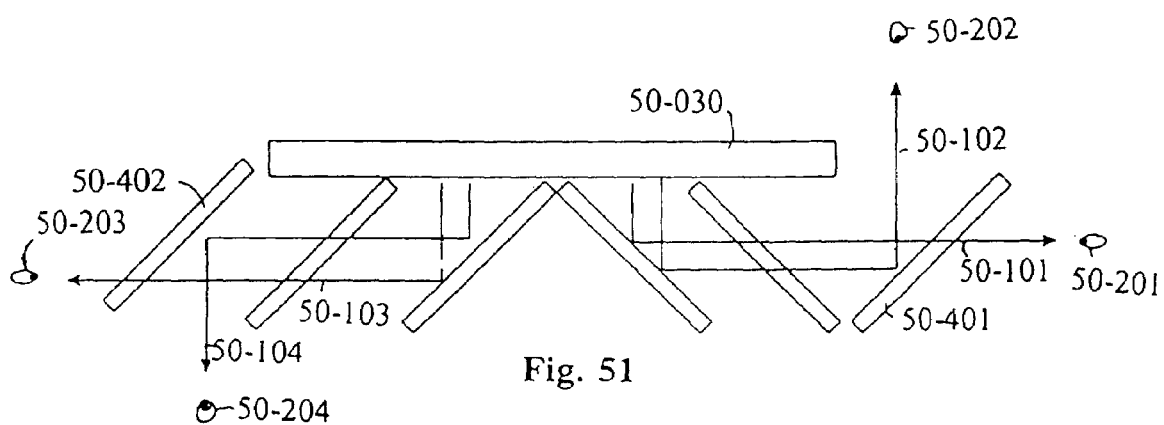
FIG. 51 is a plan view of a multiplayer 3-D imaging system of this invention.
Figure 52:
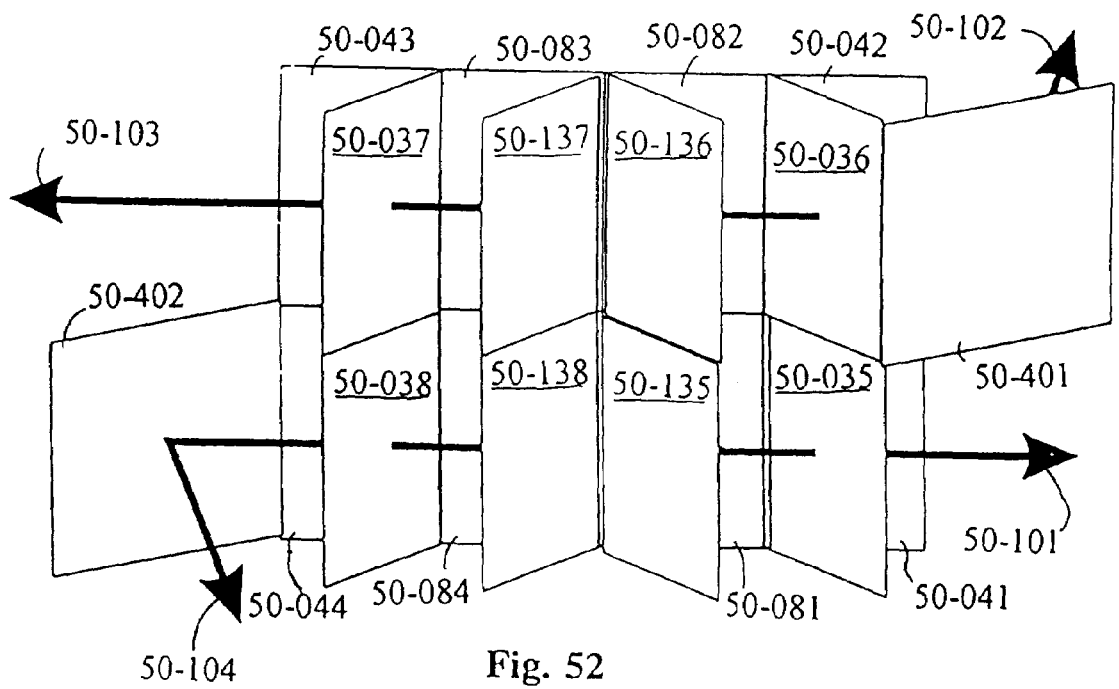
FIG. 52 is a perspective view of the embodiment in FIG. 51.

FIG. 50 is a view of a segmented image source. FIG. 51 is a plan view of a multiplayer imaging system. FIG. 52 is a perspective view of a multiplayer imaging system.

In FIGS. 50 through 52 there is an image source 50-030. There are reflective elements, which act as beamcombiners. Depicted are a first reflective element 50-035, a second reflective element 50-036, a third reflective element 50-037, and a fourth reflective element 50-038. Image source is divided to provide a first foreground image source 50-041, a second foreground image source 50-042, a third foreground image source 50-043, a fourth foreground image source 50-044, as well as a first background image source 50-081, a second background image source 50-082, a third background image source 50-083, and a fourth background image source 50-084. Also depicted are a first light ray 50-101, a second light ray 50-102, a third light ray 50-103, and a fourth light ray 50-104. Also depicted are conventional mirrors used to help co-align foreground image and background image, namely a first conventional mirror 50-135, a second conventional mirror 50-136, a third conventional mirror 50-137, and a fourth conventional mirror 50-138. Depicted are a first viewer 50-201, a second viewer 50-202, a third viewer 50-203, and a fourth viewer 50-204. Secondary reflective optic 50-401 and 50-402 are optionally provided.

As seen in FIGS. 51 and 52, light from each foreground section and each background section is co-aligned by the reflective element acting as a beamcombiner and directed to a viewer. Each final scene as seen by a viewer may suffer from a problematic aspect ratio and/or image size which may be corrected through the use of appropriate secondary reflective and magnifying optics (i.e. an appropriately oriented and disposed cylindrical Fresnel lens) as taught elsewhere in this document.

First light ray 50-101 is from the co-aligned images from first foreground image source 50-041 and the first background image source 50-081 and is directed to viewer 50-201. Second light ray 50-102 is from the co-aligned images from second foreground image source 50-042 and the second background image source 50-082 and is directed to viewer 50-202. Third light ray 50-103 is from the co-aligned images from third foreground image source 50-043 and the third background image source 50-083 and is directed to viewer 50-203. Fourth light ray 50-104 is from the co-aligned images from fourth foreground image source 50-044 and the fourth background image source 50-084 and is directed to viewer 50-204.

Figure 53:
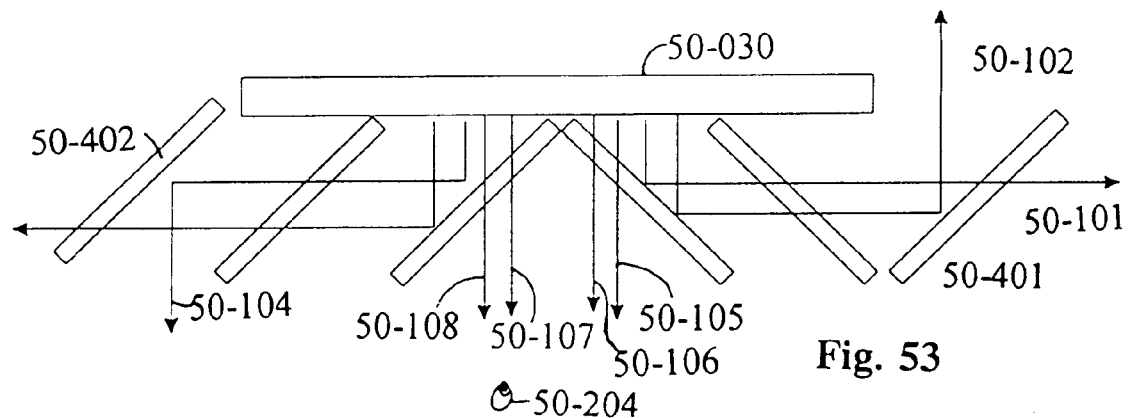
FIG. 53 is a plan view of another embodiment of the multiplayer 3-D imaging system of this invention.
Figure 54:
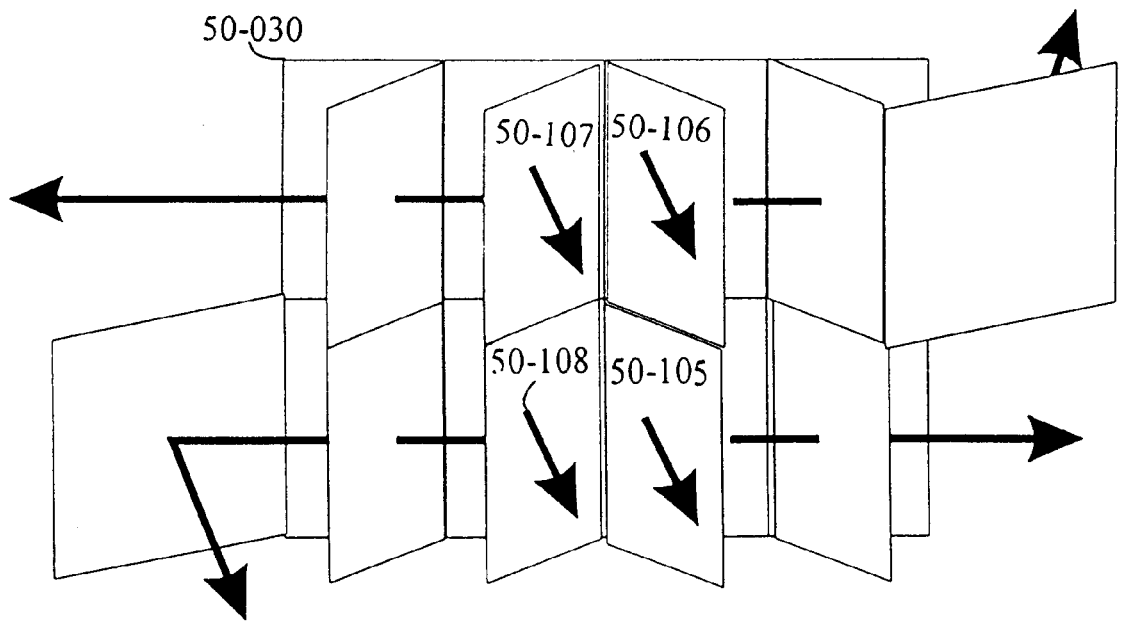
FIG. 54 is a perspective view of the embodiment in FIG. 53.

FIGS. 53 and 54 depict additional light rays 50-105, 50-106, 50-107 and 50-108 which represent light which is also combined by the various reflective elements. For example, viewer 50-204 may see any of these light rays and therefore may see any of the viewpoints of the other players. It is preferable that a housing having appropriate viewing apertures contain the reflective elements and conventional mirrors. A housing with an interior made of dark light absorbing material will help eliminate ambient light from entering the system, help against internal reflection, and shield the underlying images from undesired output as elsewhere taught in this application.

Figure 55:
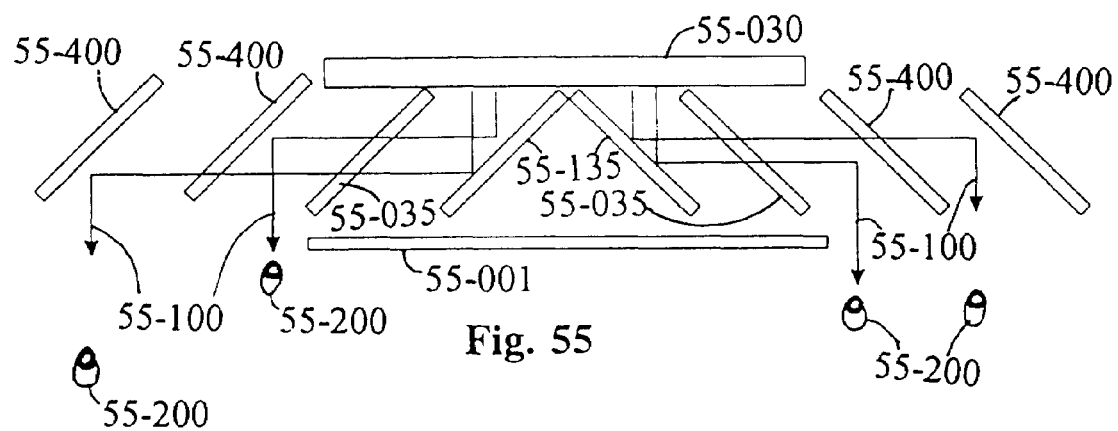
FIG. 55 is a plan view of yet another embodiment of the multiplayer 3-D imaging system of this invention.
Figure 56:
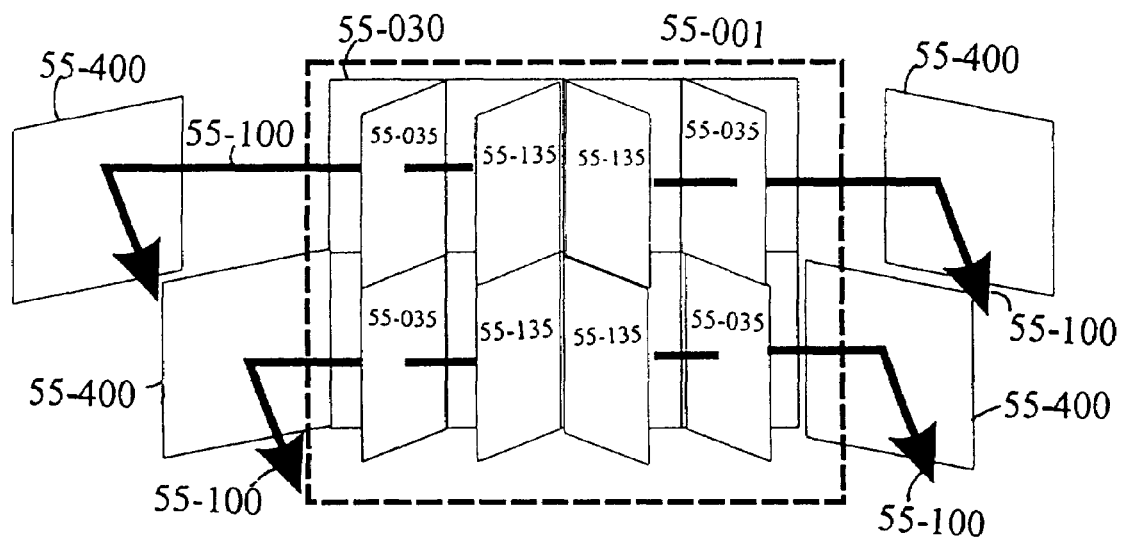
FIG. 56 is a perspective view of the embodiment in FIG. 55.

FIGS. 55 and 56 depict another embodiment of a four-player adapter. There is an image source 55-030. There are reflective elements 55-035, which act as beamcombiners. Image source 55-030 is divided to provide foreground image sources 55-040, as well as background image sources 55-080. Also depicted are light rays 55-100. Also depicted are conventional mirrors 55-135 used to help co-align foreground image sources 55-040 and background image sources 55-080. Viewers 55-200 are shown. Secondary reflective optics 55-400 are provided.

In this embodiment, all of the light rays 55-100 are directed to the front of the image source 55-030 allowing all viewers 55-200 to sit in front of the television or computer screen.

Figure 56A:
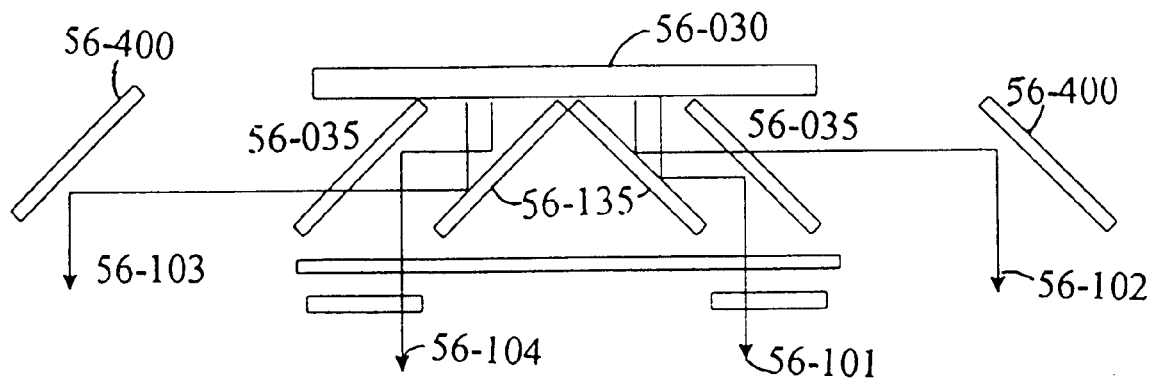
FIG. 56A is a plan view of yet another embodiment of the multiplayer 3-D imaging system of this invention.
Figure 56B:
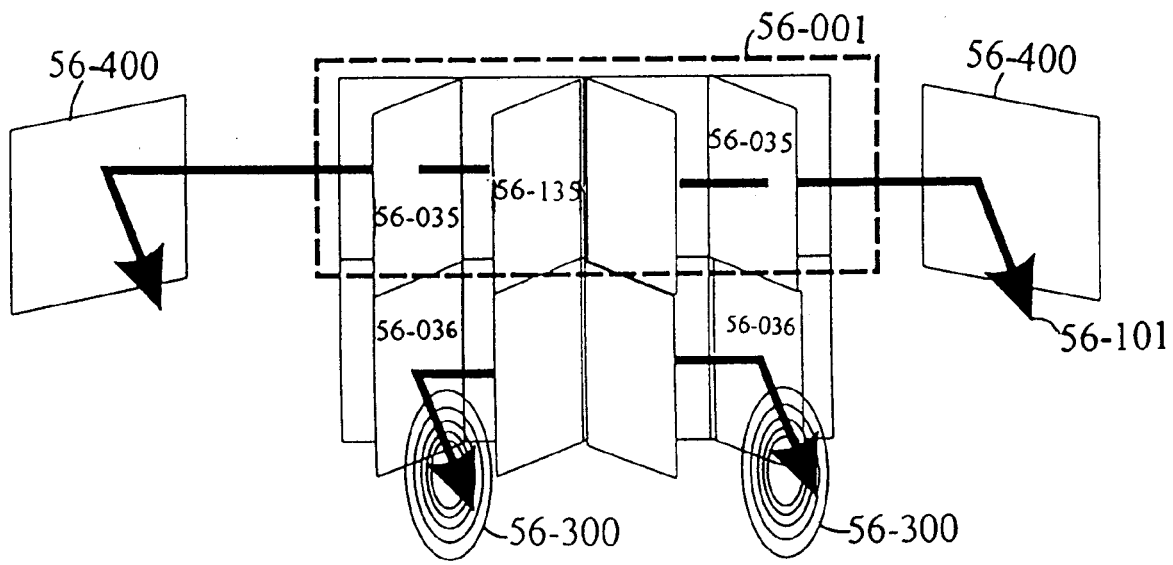
FIG. 56B is a perspective view of the embodiment in FIG. 56A.

FIGS. 56A and 56B depict another embodiment of a four-player adapter wherein all images are directed to the front of the image source. There is a housing 56-001 and an image source 56-030. There are reflective elements 56-035 and 56-036 which act as beamcombiners. Image source 56-030 is divided to provide four 3-D views indicated by light rays 56-101, 56-102, 56-103, and 56-104. Also depicted are conventional mirrors 56-135 and 56-135 used to help co-align foreground image and background image sets. Fresnel lens 56-300 and secondary reflective optics 56-400 are provided.

Light ray 56-102 and 56-103 are prevented from transmitting through reflective element 56-035 by housing 56-101. Light ray 56-101 and 56-104 are reflected from reflective element 56-036 through Fresnel lens 56-300 (which preferably expands and reimages) to the front of the image source 56-030. Secondary reflective optics 56-400 (such as a Fresnel mirror, spherical mirror, cylindrical mirror appropriate to restore aspect ratio, expand or magnify the image, create a real image, etc. as described in this document) are preferably present.

Figure 57:
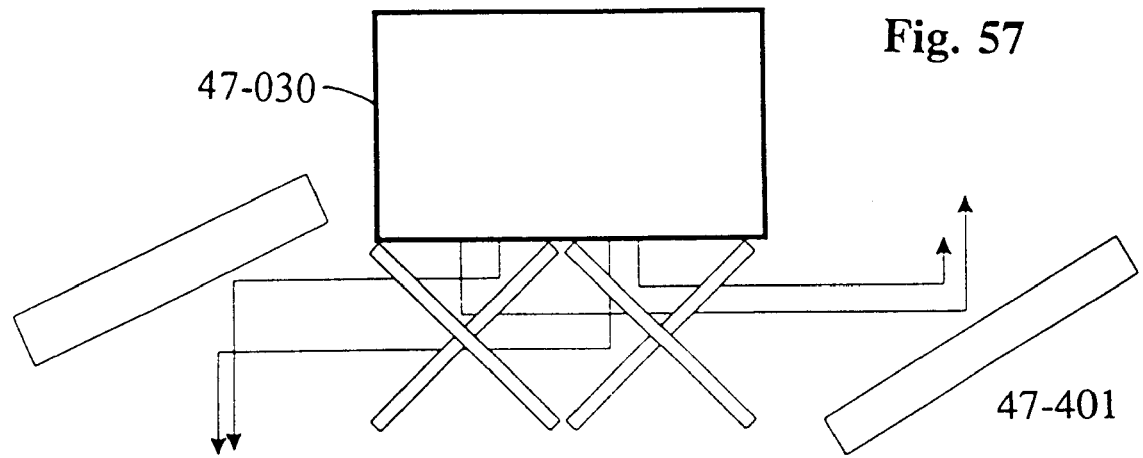
FIG. 57 is a plan view of another multiplayer 3-D imaging system of this invention.
Figure 58:
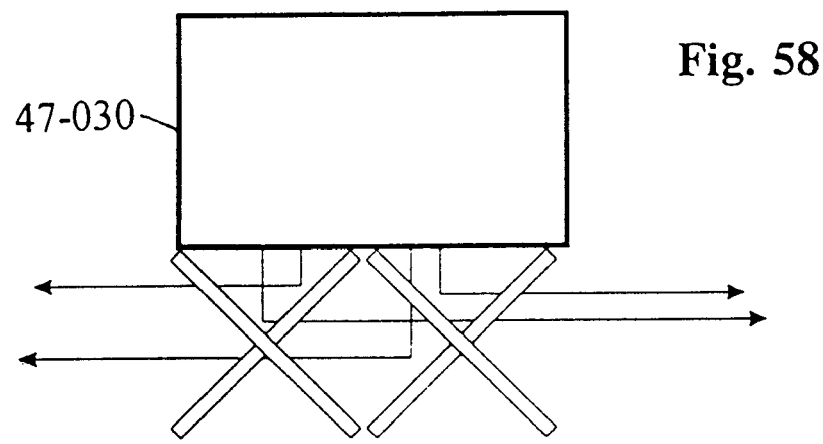
FIG. 58 is a plan view of another multiplayer 3-D imaging system of this invention.
Figure 59:
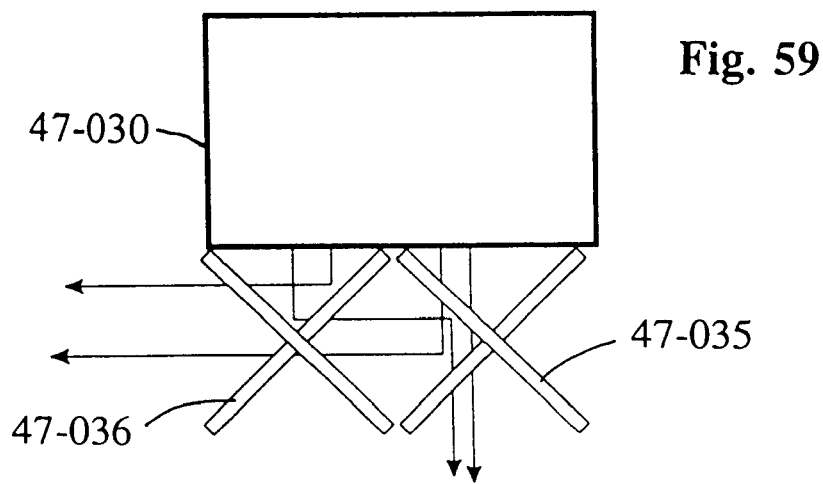
FIG. 59 is a plan view of another multiplayer 3-D imaging system of this invention.

FIGS. 57 through 59 are plan views of the single image source multiplayer adapter embodiment shown in FIG. 47. Referring now to FIG. 57, secondary optic 47-401 has been re-oriented to direct one player's output to a position behind the image source.

Referring now to FIG. 58, all secondary optics have been removed. One player would sits to right of the image source, and the other player sits to the left.

Referring now to FIG. 59, a housing is optionally provided which blocks light from reflective element 47-036 while providing a viewing aperture so that light from reflective element 47-035 may be seen from the front of image source 47-030.

Figure 60:
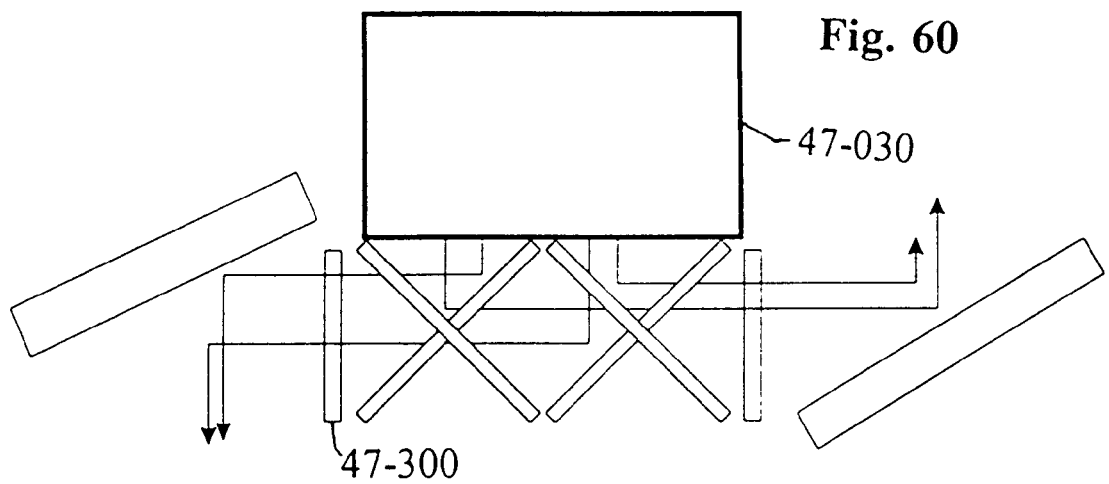
FIG. 60 is a plan view of another multiplayer 3-D imaging system of this invention.
Figure 61:
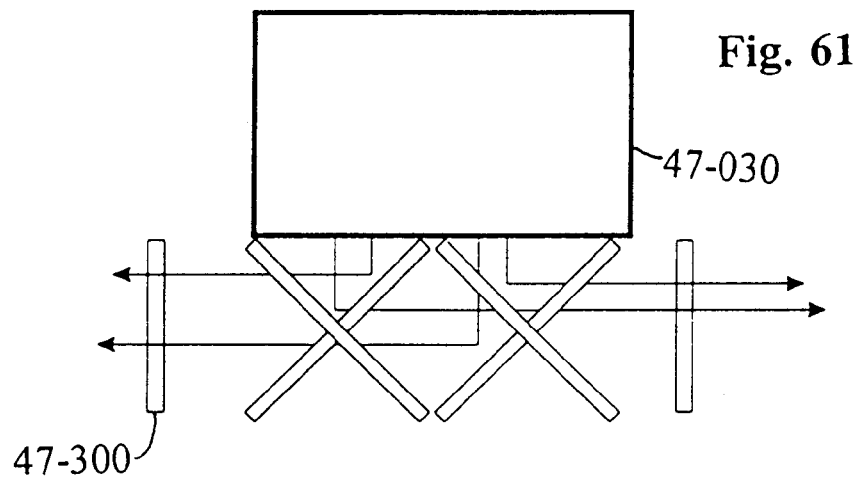
FIG. 61 is a plan view of another multiplayer 3-D imaging system of this invention.
Figure 62:
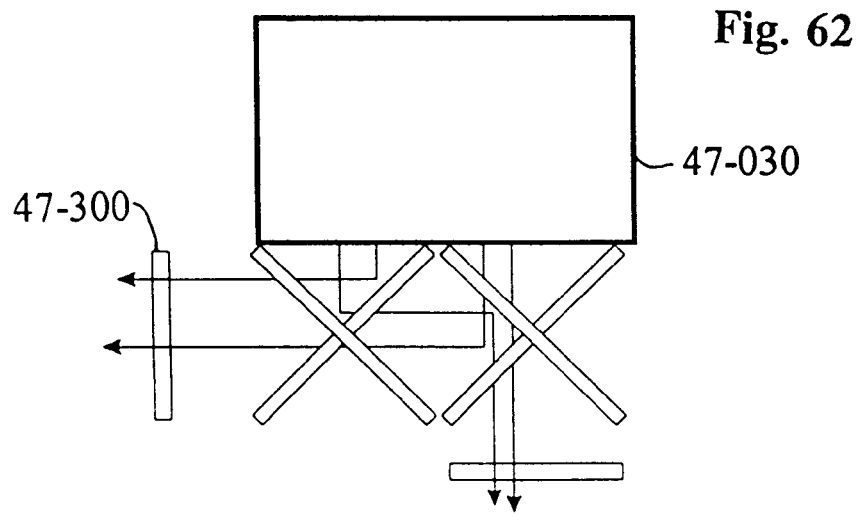
FIG. 62 is a plan view of another multiplayer 3-D imaging system of this invention.

FIGS. 60 through 62 are plan views of the embodiments shown in FIGS. 57 through 59. A Fresnel lens 47-300 has been added to the drawings. It is worth mentioning, that the various adapters as depicted are capable of utilizing a Fresnel lens (or any other economically and optically feasible lens known to one of ordinary skill in the art) to "float" or create real images of any or all image planes involved as taught herein.

The multiplayer adapter desirably provides 3-D real depth in accordance with the present invention. Alternatively, simplified versions provide 2-D images to multiple players, within the scope of the present invention.

Single Image Source Non 3-D Multiplayer Adapter

In addition to the various multiplayer 3-D adapter embodiments discussed hereinabove, a multiplayer adapter that uses some of the techniques of image redirection described herein.

The same advantages mentioned for 3-D multiplayer adapters—use of an inexpensive image source, excitement of secret perspectives, the glare-free images, etc.—apply as well to the non-3-D multiplayer adapters.

Figure 63:
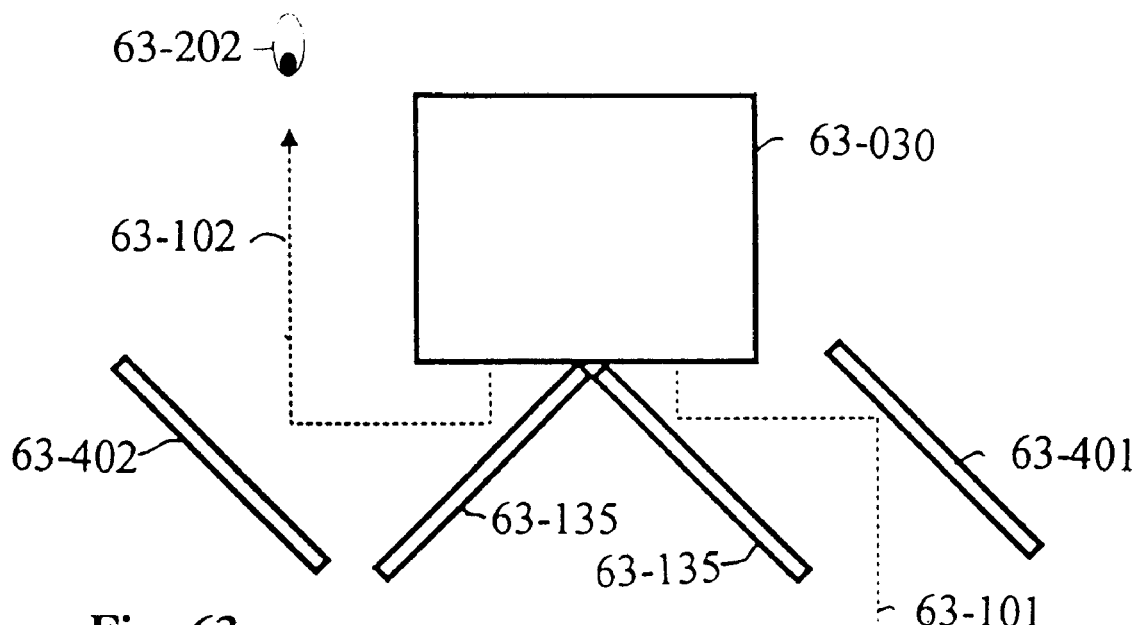
FIG. 63 is a plan view of another multiplayer imaging system of this invention.

FIG. 63 shows an embodiment of a single image source multiplayer adapter. Depicted are image source 63-030, light ray 63-101, light ray 63-102, conventional mirror 63-135, a first viewer 63-201, a second viewer 63-202, optional secondary reflective optic 63-401 and optional secondary reflective optic 63-402.

As pewvioaly taught the image source is divided into multiple portions: a first player portion and a second player portion. Light ray 63-101 from a first portion of the screen is reflected from a conventional mirror 63-135 to a first viewer 63-201 (directly or after interaction with optional secondary reflective optic 63-401). Light ray 63-102 is directed to another viewer. The display on image source 63-030 is optionally compressed 2:1 along one axis to allow an optional secondary reflective optic to recover the original aspect ratio, albeit at the cost of resolution.

Figure 64:
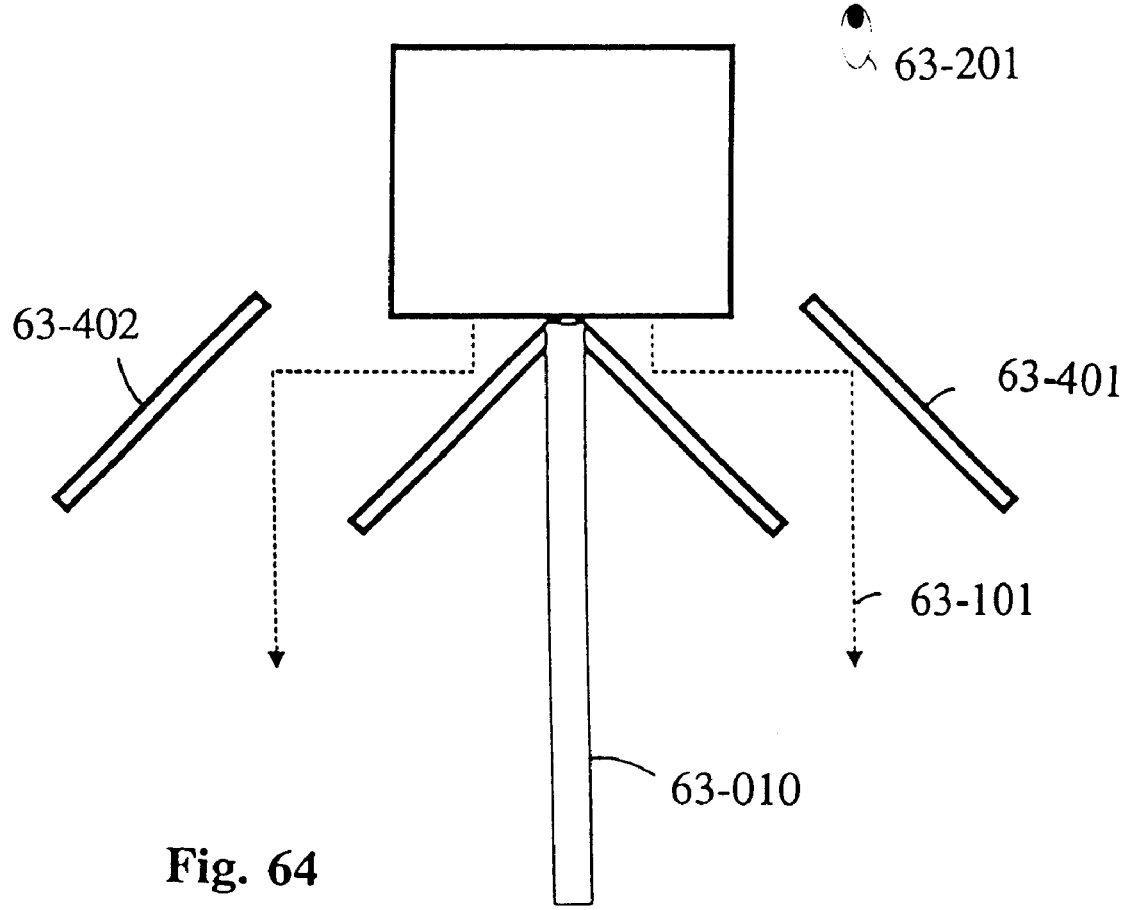
FIG. 64 is a plan view of another multiplayer imaging system of this invention.

FIG. 64 shows another embodiment of the single-image-source multiplayer adapter of FIG. 63. An additional piece, called a view splitter 63-010, has been attached between each conventional mirror 63-135. Optional secondary reflective optic 63-401 has been reversed to redirect light ray 63-101 to a different location. An optional view splitter is used to block one player from seeing the other player's screen. The angle of view may be controlled using a view splitter 63-010 or through the use of a Fresnel lens or other means of creating a real image (as taught hereinabove) with a controlled angle of view. Proper placement of a Fresnel lens along the path of light ray 63-101 can be used to make sure that a second viewer 63-202 is outside the controlled angle of view.

Figure 65:
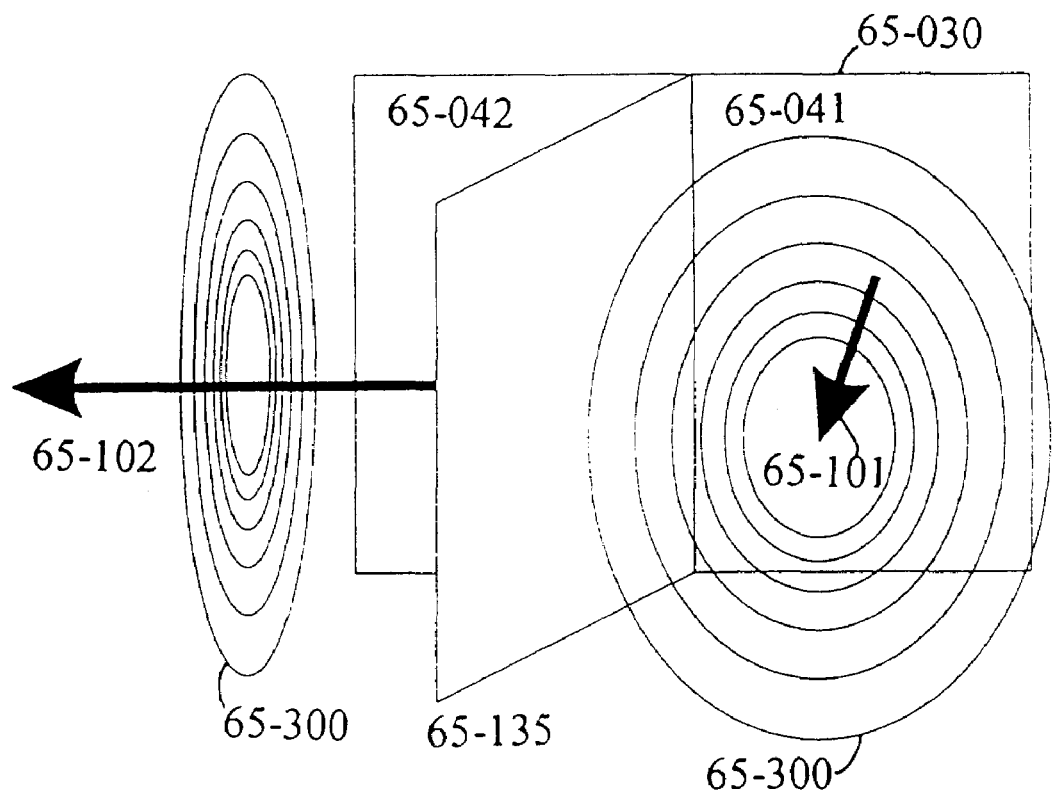
FIG. 65 is a perspective view of another multiplayer imaging system of this invention.
Figure 66:
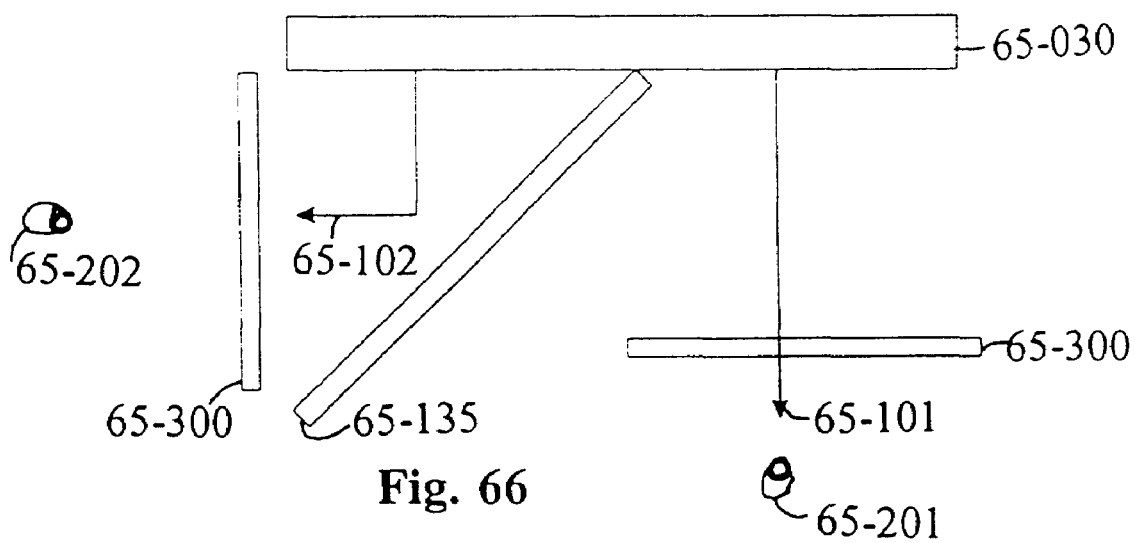
FIG. 66 is a plan view of the multiplayer imaging system of FIG. 65.

FIGS. 65 and 66 show an even simpler multiplayer adapter. Depicted are the image source 65-030, first player portion 65-040, second player portion 65-042, light ray 65-101, light ray 65-102, optional Fresnel lens 65-300, conventional mirror 65-135, a first viewer 65-201, and a second viewer 65-202. The first viewer 65-201 has a direct line-of-sight to the first player portion 65-040. The output is optionally reimaged and/or enlarged via use of a Fresnel lens 65-300 or other means. The second viewer 65-202 has a reflected view of the second player portion 65-042. That portion is also optionally reimaged, magnified or decompressed using techniques discussed hereinabove. The various parts of the present adapter, unlike many of the embodiments described herein, are not preferably kept in a housing, although some connective means is necessary to keep the conventional mirror 65-135 properly disposed to the image source 65-030.

FIGS. 67 through 69 show a non 3-D multiplayer adapter. FIGS. 67 and 68 are perspective views, and FIG. 69 is a plan view. The figures show image source 67-030, first player portion 67-041, second player portion 67-042, third player portion 67-043, fourth player portion 67-043, first light ray 67-101, second light ray 67-102, third light ray 67-103, fourth light ray 67-104, conventional mirror 67-135, second player conventional mirror 67-136, third player conventional mirror 67-137, fourth player conventional mirror 67-138, a first viewer 67-201, a second viewer 67-202, a third viewer 67-203, reference point 67-300, a fourth viewer 67-204, and a secondary reflective optic 67-400.

First light ray 67-101 is seen by first viewer 67-201. Second light ray 67-102 is reflected from second conventional mirror to second viewer 67-202. Third light ray 67-103 is reflected from third conventional mirror to secondary reflective optic 67-400 to a third viewer 67-204. Fourth light ray 67-104 is reflected from fourth conventional mirror to fourth viewer 67-204.

Additional secondary reflective optics may be used with this embodiment, as with many of the other embodiment discussed in this application. Additionally, a Fresnel lens (or other optic for creating a real image, an enlarged image or an image with a changed aspect ratio) may be included at each reference point 67-300 to reimage each player's perspective, as desired.

Figure 70:
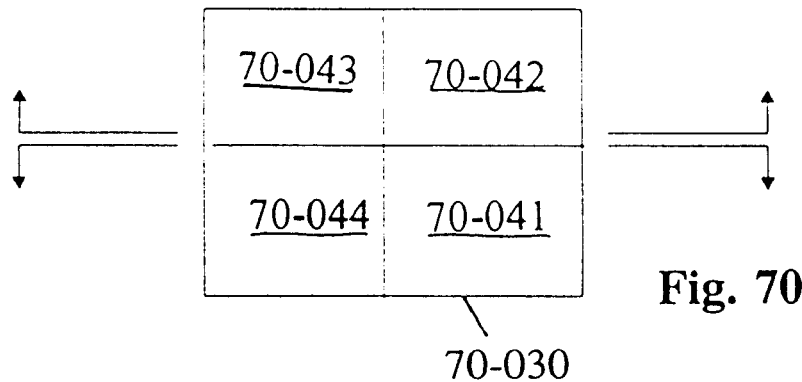
FIG. 70 is a view of an image source.
Figure 71:
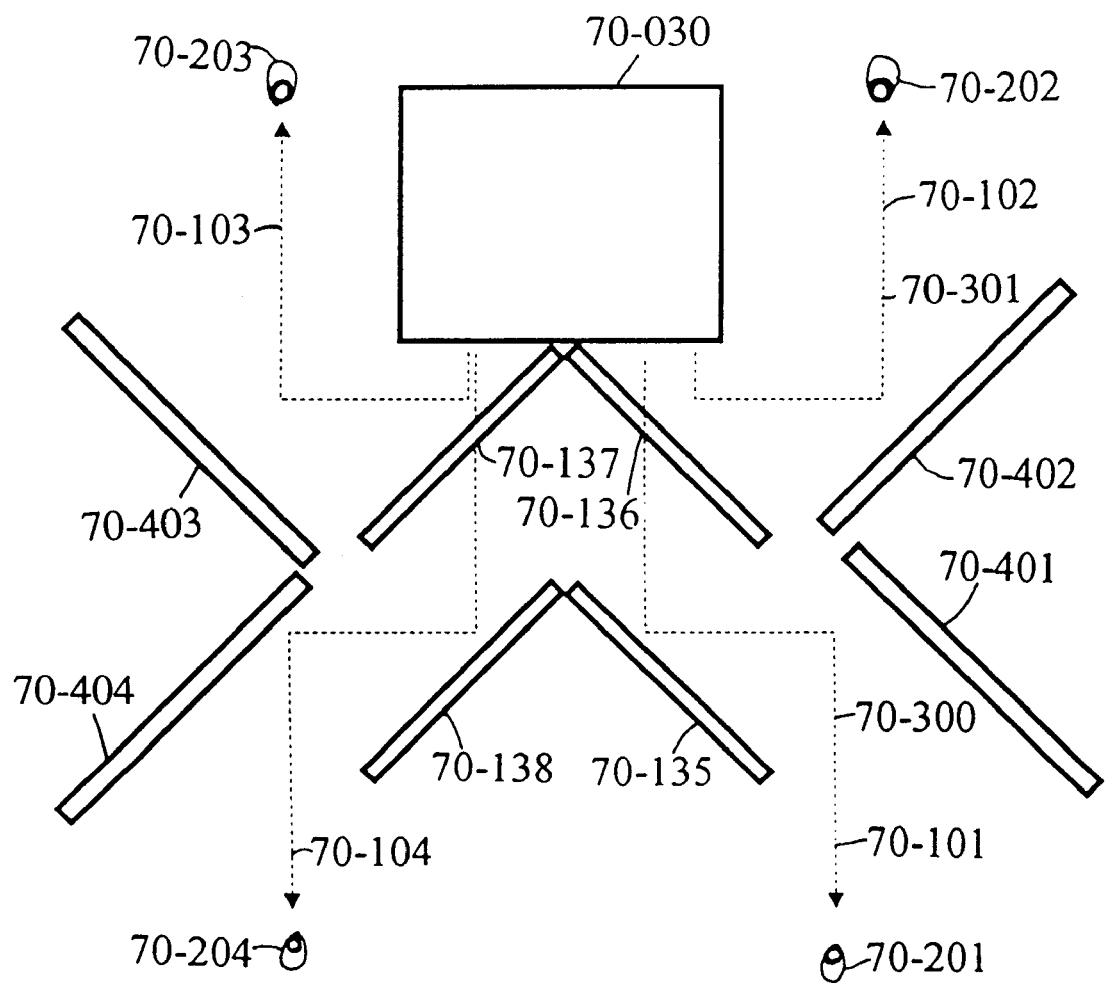
FIG. 71 is a plan view of another multiplayer imaging system of this invention.

FIGS. 70 and 71 show another four-player adapter variant. The figures show an image source 70-030, a first player portion 70-041, a second player portion 70-042, a third player portion 70-043, a fourth player portion 70-044, first light ray 70-101, second light ray 70-102, third light ray 70-103, fourth light ray 70-104, first conventional mirror 70-135, second conventional mirror 70-136, third conventional mirror 70-137, fourth conventional mirror 70-138, first viewer 70-201, second viewer 70-202, third viewer 70-203, fourth viewer 70-204, reference point 70-300, second reference point 70-301, first secondary reflective optic 70-401, second secondary reflective optic 70-402, third secondary reflective optic 70-403, fourth secondary reflective optic 70-404.

In this adapter, two of the player portions are directed to the rear, and the other two player portions are directed to the front. Other combinations of directions are within the variations in design of such a multiplayer adapter or other adapter directing portions of the screen to different viewpoints.

The aspect ratio in this embodiment has not been altered. Each player portion is half as tall and half as wide as the original image source. The appropriate action, if any, to take with additional secondary optics is uniform magnification. As discussed elsewhere, this may done through the us of cylindrical lenses, cylindrical Fresnel lenses, Fresnel lenses, spherical mirrors, or any of the cylindrical expansion elements used in tandem (one to expand the image in the vertical, the other to expand it in the horizontal). This embodiment illustrates the potential placement of spherical mirrors because the spherical mirrors must be a good deal larger than that which they will magnify.

If this embodiment used cylindrical expansion mirrors, then secondary reflective mirror 70-404 could be placed directly under 70-403 making a more compact system. However, given the size of the spherical mirrors contemplated in these Figures, the offset is necessary.

FIG. 72 depicts another embodiment of a four-player adapter. Image source 72-030, player portion 72-040, conventional mirror 72-135, light rays 72-100, viewers 72-200, optional reference point 72-300, and optional secondary reflective optic 72-400 are shown.

As in the other embodiments, light ray 72-100 is reflected to the appropriate viewer 72-200, all of whom sit in front of the image source 72-030. Embodiments which direct all output to the front accommodate themselves well to consumer set-up of their homes: televisions and computers are often backed to walls.

Reference point 72-300 shows possible locations for placement of Fresnel lenses (or other optical elements for creating a real image with a controlled angle of view) to provide additional "security" to those using this adapter.

FIGS. 74 through 84 depict a multiplayer adapter. Shown in the figures are a first view splitter 74-010, a second view splitter 74-011, the image source 74-030, first player portion 74-041, second player portion 74-042, third player portion 74-043, fourth player portion 74-044, light ray 74-101, 74-102, 74-103, 74-104, a conventional mirror 74-135, Fresnel lens 74-300, and secondary reflective optics 74-400.

Referring to FIG. 76, an image source 74-030, such as a television monitor, is placed "face-up." A view splitter 74-010 is used to create two different views, one on each side of the view splitter 74-010. In this fashion, one person can see his own portion of the videogame in privacy, as previously discussed.

A second view splitter 74-011 is preferably slotted or otherwise detachable from first view splitter 74-010. When the second splitter is in place, this embodiment may be used as a four-player adapter. Each viewer sits in her own quadrant looking at her respective screen area.

Figure 79:
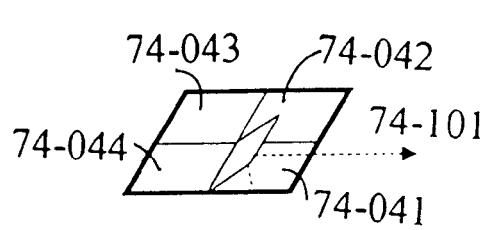
FIG. 79 is a perspective view of the image source and a conventional mirror.
Figure 79A:
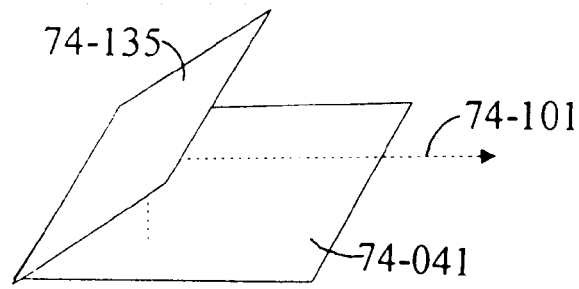
FIG. 79A is a perspective view of the image source and a conventional mirror.
Figure 80:
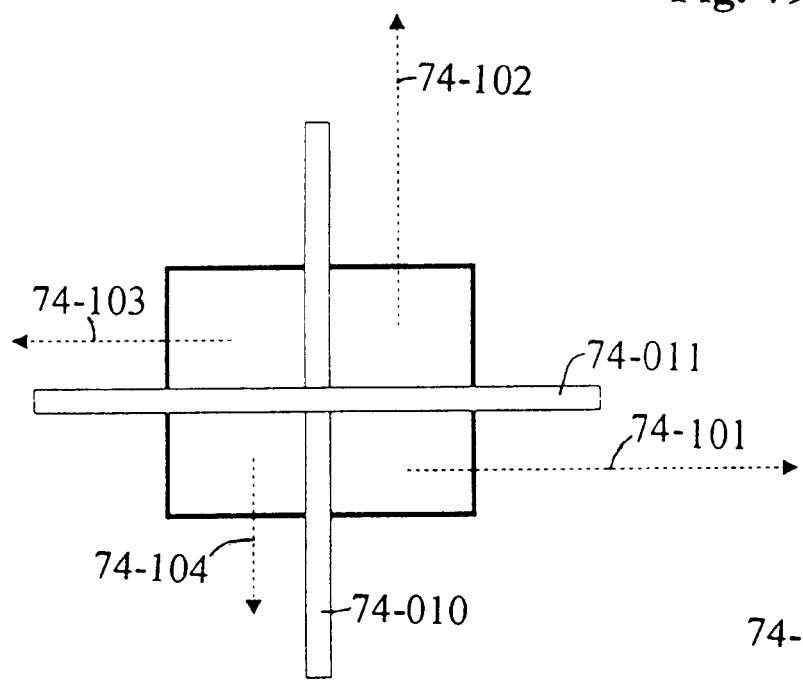
FIG. 80 is a plan view of another multiplayer imaging system of this invention.
Figure 81:
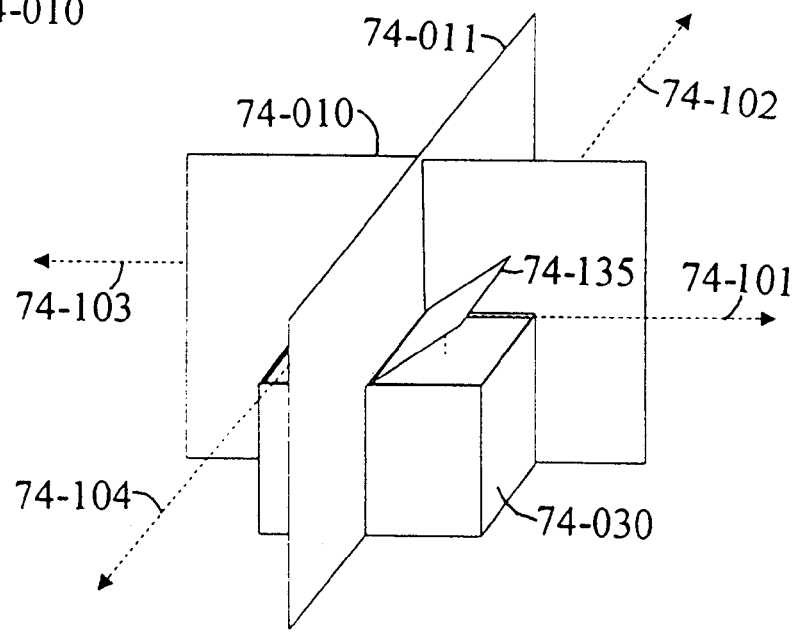
FIG. 81 is a perspective view the multiplayer imaging system of this invention.

A preferred embodiment of this invention can be seen in FIGS. 79 through 81. A conventional mirror 74-135 is angled so as to reflect the first player portion 74-041 to make it easier to view. Viewers may sit comfortably back from the image source, rather than gazing down on the monitor face itself. This improvement may alternatively be used with the two-player version of this embodiment. However, in that instance either larger conventional mirrors are necessary, or it may be necessary to be able to change the orientation thereof to present an integrated image to both players.

Figure 82:
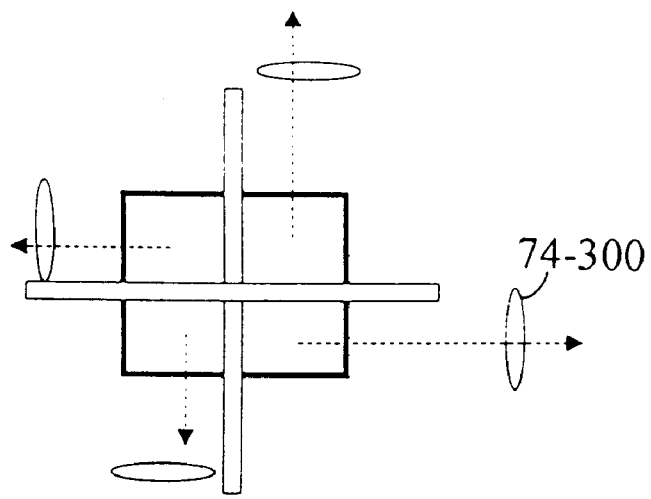
FIG. 82 is a plan view of another multiplayer imaging system of this invention.
Figure 83:
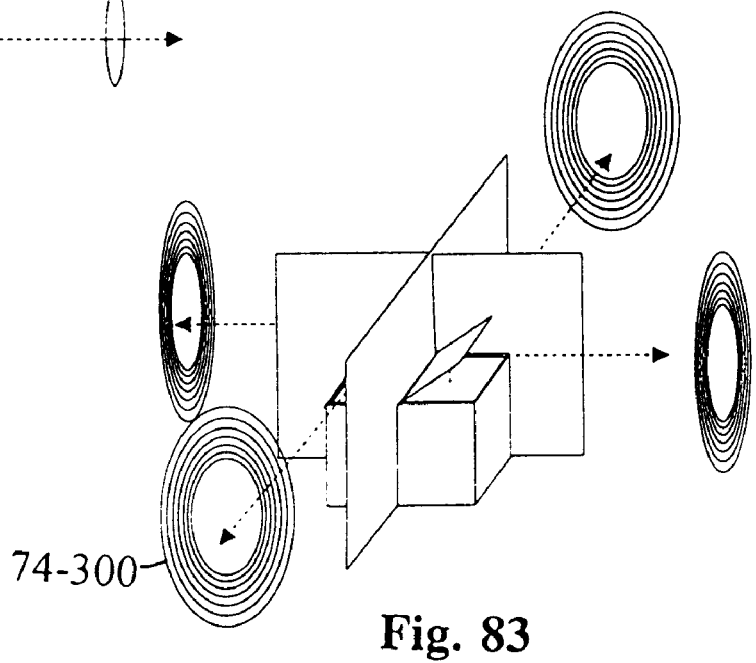
FIG. 83 is a perspective view the multiplayer imaging system of this invention.
Figure 84:
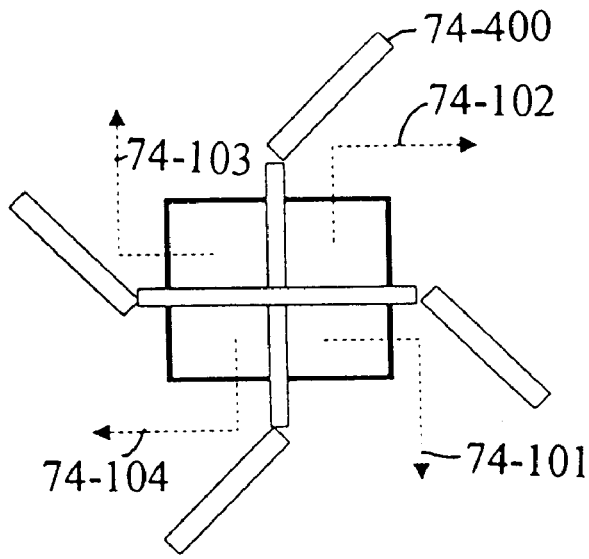
FIG. 84 is a plan view of another multiplayer imaging system of this invention.

FIGS. 82 and 83 show the addition of Fresnel lens 74-300 (or other element that will re-image each light ray into a real image). FIG. 84 shows that addition of secondary reflective optics 74-400 can be used to redirect, reimage, and/or magnify the image.

Figure 84A:
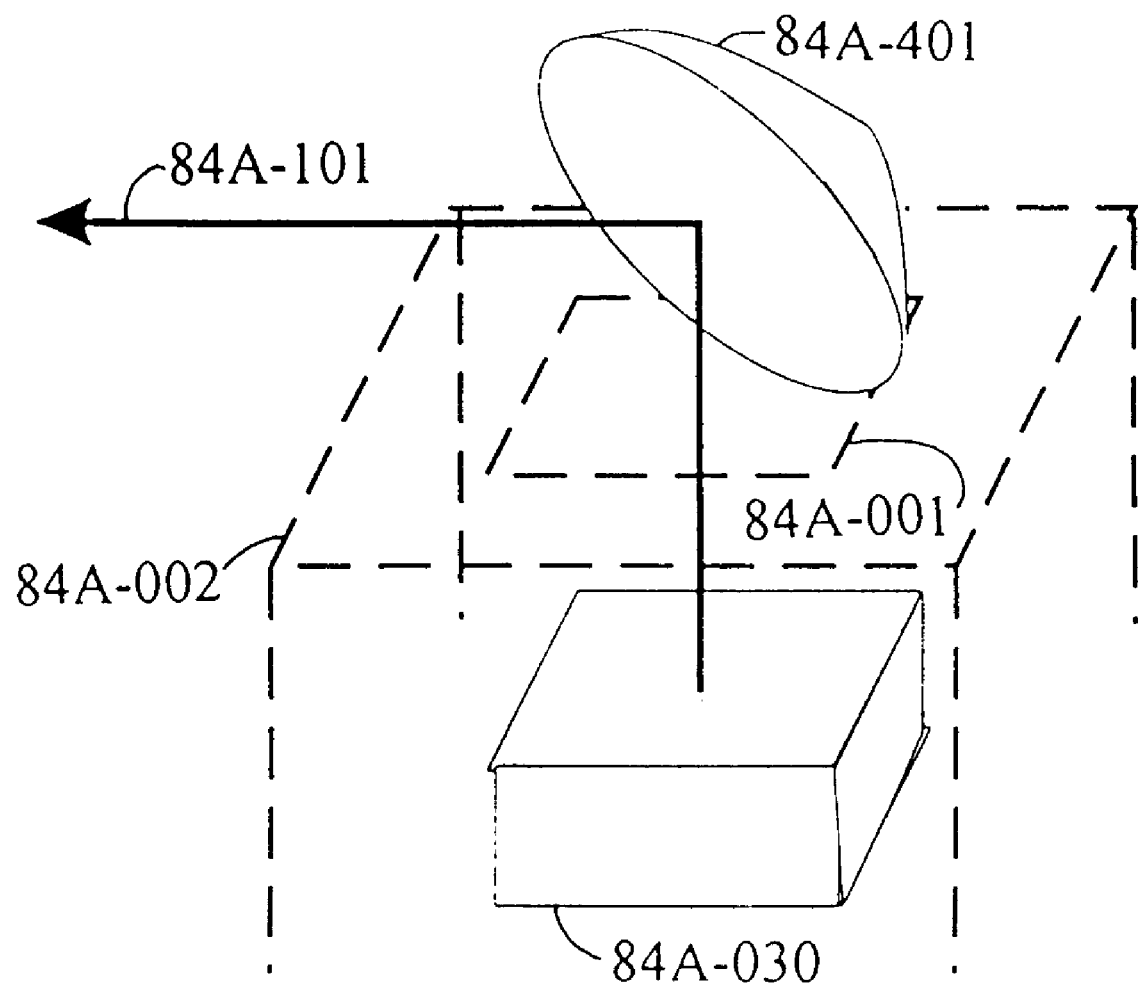
FIG. 84A is a diagrammatic view of a display system of this invention.

FIG. 84A shows a display system of the present invention. An image source 84A-030 is placed "face-up" and its output 84A-101 is directed through aperture 84A-001 to secondary reflective optics 84A-401, such as a spherical mirror. Spherical mirrors are relatively cheap to make, and can be used to uniformly expand images, but must be made larger than the image that they will expand to reduce spherical aberrations.

Figure 85:
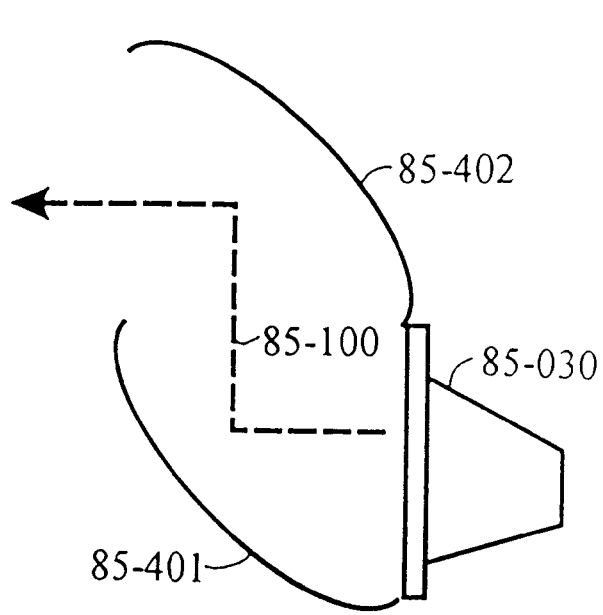
FIG. 85 is an elevation view of a monitor enlarger imaging system of this invention.
Figure 86:
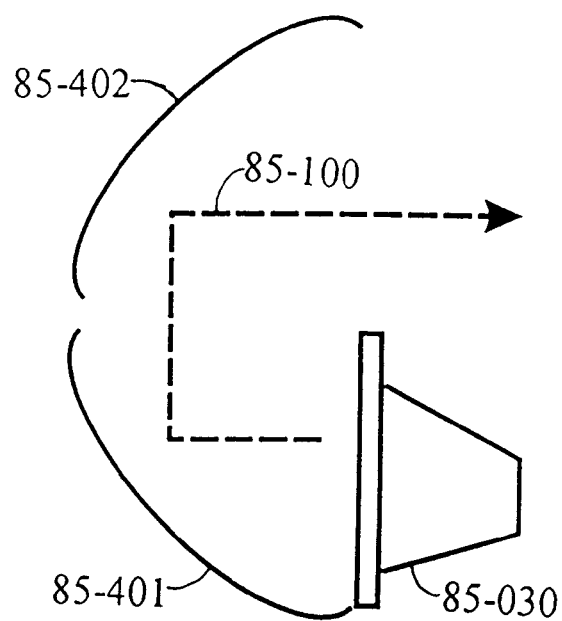
FIG. 86 is an elevation view of a monitor enlarger imaging system of this invention.

FIGS. 85 and 86 show a monitor enlarger of the present invention. Image source 85-030, light ray 85-100, first mirror 85-401, and second mirror 85-402 are depicted. Referring now to FIG. 85, light ray 85-100 leaves image source 85-030. Light ray 85-100 is reflected from first mirror 85-401 to second mirror 85-402 which expand the image as desired, preferably uniformly. Referring now to FIG. 86, the position of second mirror 85-402 may be changed to reflect light ray 85-100 to the rear of the monitor.

Figure 87:
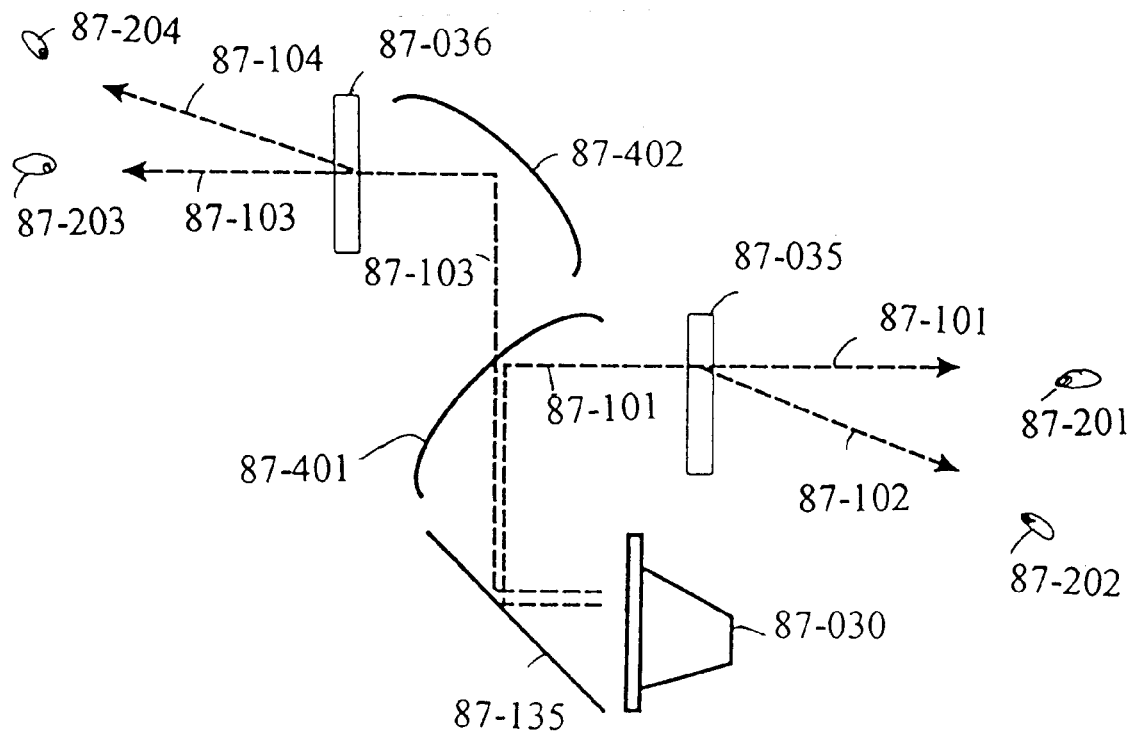
FIG. 87 is an elevation view of an image display system of this invention.
Figure 88:
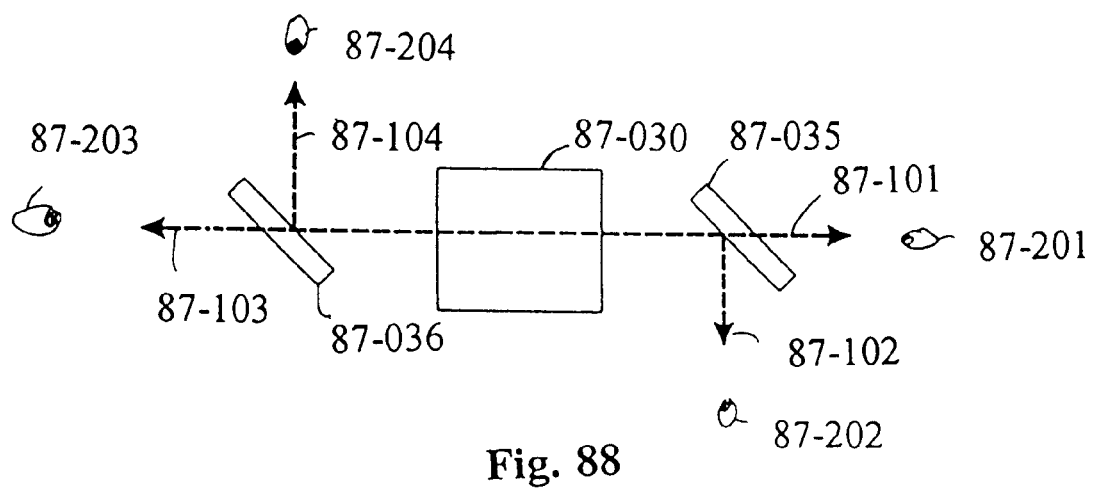
FIG. 88 is a plan view of the image display system of FIG. 87.

FIGS. 86 and 87 show another embodiment of the monitor enlarger of the present invention. Depicted are an image source 87-030, a first beamsplitter 87-035, a second beamsplitter 87-036, and a first mirror 87-135. Light ray 87-101, 87-102, 87-103, and 87-104, first viewer 87-201, second viewer 87-202, third viewer 87-203, fourth viewer 87-204, a beamsplitting mirror 87-401, and a second mirror 87-402, are also shown.

Light from the image source 87-030 is reflected from a first mirror 87-135. First mirror 87-135 is preferably a cylindrical expansion mirror designed to expand the image in one dimension. Light ray 87-101 is reflected from the first mirror 87-135 to the beamsplitting mirror 87-401 and further reflected. Preferably, beamsplitting mirror 87-401 is also a cylindrical expansion mirror disposed to expand the image in its other dimension. Light ray 87-101 passes to first beamsplitter 87-035, from whence light ray 87-101 continues to a first viewer 87-201, and light ray 87-102 continues to a second viewer 87-202.

Similarly light ray 87-203 passes through beamsplitting mirror 87-401 (and is not imaged in the transmission) until it hits a second mirror 87-402. Second mirror 87-402 is also preferably a cylindrical expansion mirror disposed to expand the image in the other direction from first mirror 87-135. Light ray 103 passes through second beamsplitter 87-036 to a third viewer. Light ray 87-104 is a reflected portion of the image which reaches a fourth viewer 87-200.

This adapter allows a single image source to direct output to the four directions. While appropriate for some tasks, reading text from the images could be difficult since each viewpoint sees images which undergo even and odd numbers of reflections. These problems are fixed using the image reversal techniques disclosed herein.

In some embodiments employing cylindrical or curved mirrors (or equivalent magnifying optics), the distance of the top and bottom images from the viewer are different, therefore the magnifications are not the same. The bottom image often becomes magnified more than the top image, for example. To compensate, the screen is divided so that the one image is bigger than the other image and the images are the same size after they pass through the optical system.

This technology can be used for a movie adapter. The use of a single cylindrical expansion mirror can help recapture the original dimensions of a movie and display a full sized image without the black cut-outs from letterbox.

An embodiment of the present invention is a "narrow-profile" single image source display system. This embodiment uses numerous smaller mirrors which decreases the distance the optical elements protrude from the image source. These "narrow-profile" embodiments potentially reduces the apparent distance between the planes, unless some of the methods discussed below are employed to increase the distance between foreground and background planes. Different embodiments split the screen into greater or smaller numbers of segments than depicted.

FIGS. 89 to 92 show embodiments of a narrow profile image display system in which the display is split into numerous foreground and background areas. Each top portion is the foreground portion, and each bottom is the background portion. Each set of portions is co-aligned as described hereinabove in the document. The resulting output is striped because no light passes directly from any background portion. An optional lenticular expansion array is used to expand each image set stripe so gaps or blank stripes are not presented to the user.

Figure 89:
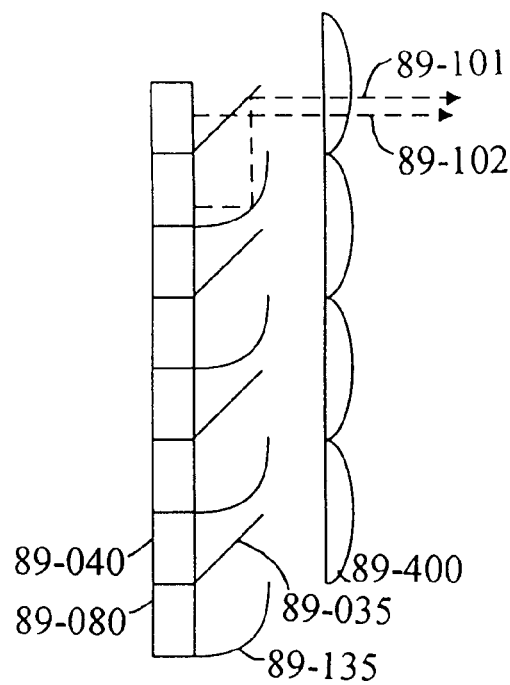
FIG. 89 is a side view of an image display system of the present invention.

Referring in particular to FIG. 89, light 89-101 from each foreground portion 80-040 passes through a reflective element 89-035, such as a beamcombiner, and then through an optional expansion element 89-400 such as a lenticular array. Light 89-102 from the background is reflected from a mirror 89-135 (optionally an expanding mirror) and further reflected from reflective element 89-035, and then through an optional expansion element 89-400.

But for the optional expansion element 89-400, the reflection of light 89-102 from the mirror 89-135 would leave dark gaps or stripes. An optional expansion element 89-400 is placed to magnify the light images passing through it by 2. This doubling eliminates any gaps in the image created by the use of interlaced conventional mirrors.

With a 20" television set or monitor, a 10-12" depth between the planes facilitates the preferred perception of depth. The cylindrical mirrors are set up so that they create a virtual image 10" behind a 20" screen, allowing a very large separation of the planes used for the foreground and background images.

Figure 90:
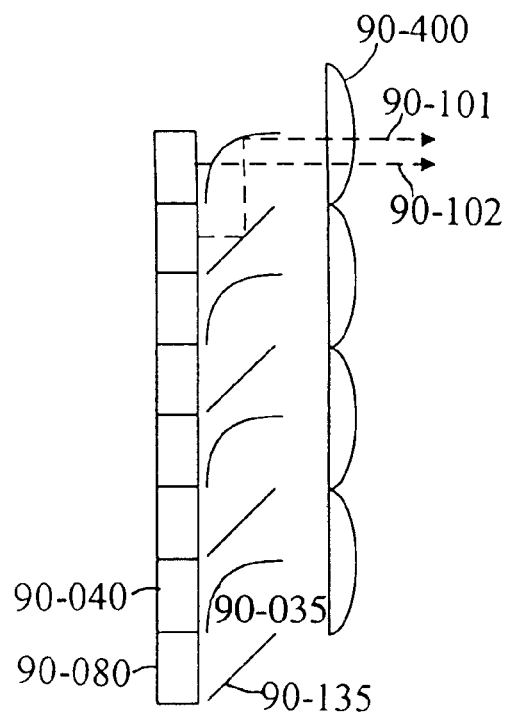
FIG. 90 is a side view of an image display system of the present invention.

Referring now to FIG. 90, a curved reflective element 90-035, such as a beamsplitter or partially reflective mirror, is used in front of each foreground image area 90-040. This displacement has the advantage of placing the virtual background image even farther behind the foreground image. With a 12" monitor, for example, each segment would be 0.167" and the mirror would therefore have a radius of curvature of 0.25"

Figure 91:
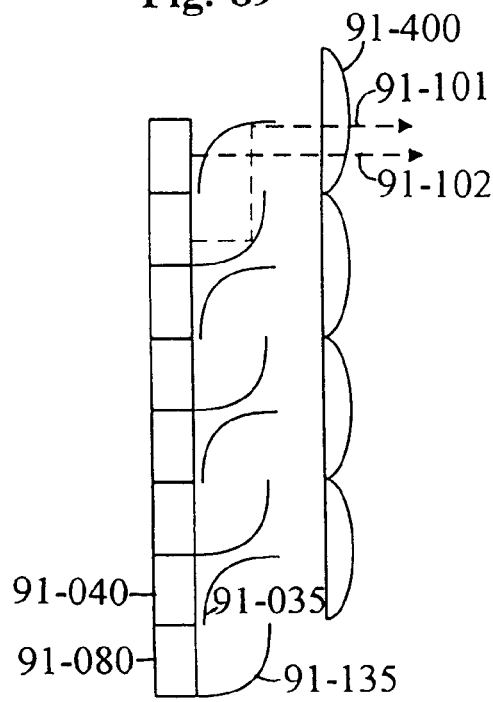
FIG. 91 is a side view of an image display system of the present invention.

FIG. 91, a conventional cylindrical mirror 91-135 is used to reflect the background image to a partially reflective cylindrical mirror 91-035 which co-aligns the its foreground/background portion set. In this embodiment, there is even less curvature needed than in FIG. 90, and it is easier to correct for aberrations. Plastic cylinders molded in a frame, then cut and slightly offset could serve as the lens array in this embodiment. This would be very inexpensive to make, for reasonable image quality.

Figure 92:
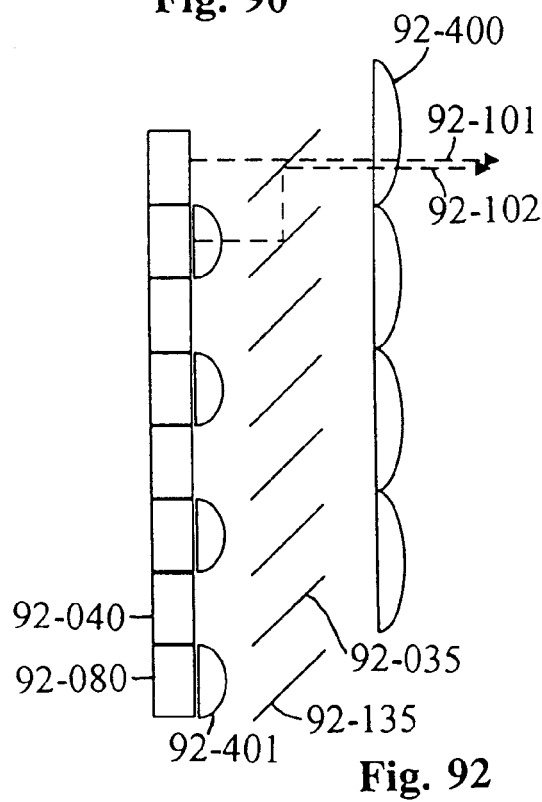
FIG. 92 is a side view of an image display system of the present invention.

In FIG. 92 a second optional expansion element 92-401 (such as a series of lenticular lens elements) is used to expand each of the background image area segments. The expanded image is reflected to the foreground mirror. Different embodiments split the screen into greater or smaller numbers of segments than depicted.

As with all of the embodiments disclosed in the application, this "narrow profile" 3-D image display system may be used as an image source in any of the other image display systems and methods of this invention. As one example, the display output may be reimaged through the use of a properly placed Fresnel lens (or its reimaging equivalent).

As another example, the display output may be used in combination with other 3-D techniques of this invention in a meta-display system to provide multiple image planes. Referring now to FIG. 34, the background image source 34-080 is optionally replaced with a "narrow profile" embodiment as one of many methods to generate multiple image planes.

Time Multiplexing

Time multiplexing has been used to present alternate left- and right-eye stereoscopic views to an observer. With such a system viewers must wear special glasses which alternately expose the left and right eyes in synchrony with a display so that each eye sees only the proper perspective view. Such a system has all the drawbacks of stereoscopic imaging discussed above, plus it requires twice the normal frame rate to avoid perception of an "alternating eye flicker" which generates eyestrain and headaches in many users.

The invention disclosed herein permits a single image source, such as a TV or computer monitor, to be used to produce foreground and background images. One way to do this with time multiplexing is by sending the foreground and the background images alternately to the image source. Although it is also preferable here to double the frame rate to eliminate flicker, the standard frame rate is nevertheless less objectionable than many other 3-D techniques since both eyes perceive each image simultaneously, one behind the other.

The two images can be displayed in their proper locations in space in any of various of ways.

Various means to synchronize the image with a rotating shaft are known in the art, for example, such means as were used in the CBS tri-color spinning disk TV system. In some embodiments, the shaft is marked optically or with an electrical contact so that one rotational position generates a signal to a synchronizing circuit, or the shaft may be driven by a motor responsive to a synchronizing pulse that is part of the decoded TV signal.

When a projector is used to create the image, it may be synchronized with the rotating shaft, to provide the nearer and then the farther image in alternating succession. These could be successive frames on a reel of cinematic film, for example.

When a display is used that provides a successive series of scanned image frames, such as a TV set or monitor, the system is synchronized to ensure that first substantially all the pixels of a particular frame are displayed during the time that the screens (or the lens) are positioned to display the near image, and then that the pixels of substantially the entire far image are displayed during the time that the screens (or the lens) are positioned to display the far image.

Where, for example, the rate of scan of a conventional TV picture is 60 fields per second, then the shaft is spun at 30 revolutions per second, to provide 30 near images and 30 far images per second. If a system having a different refresh rate is used, the rotational speed is synchronized correspondingly.

Time multiplexing is another way to get "double duty" from an image source. Instead of sacrificing resolution (as may be done in some of the single-image-source splitting embodiments), full frame foreground and background images are displayed on an image source in alternating sequence.

FIG. 100 shows an image source 100-030, a foreground image projection screen 100-040, a background image projection screen 100-080, a projector 100-300, a lens 100-310, and a rotating member 100-350.

A first image projection screen 100-040 and a second image projection screen 100-080 are attached to a rotating member 100-350. Rotating member 100-350 is disposed so it alternately presents first projection screen 100-040 and second image projection screen 100-080 to projector lens 310. FIGS. 100A through 100E are elevational views of this embodiment.

Figure 100A:
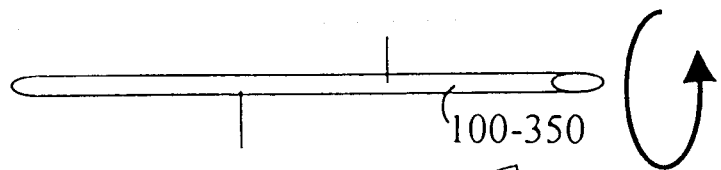
FIG. 100A is a side view of an image display system of the present invention.
Figure 100B:
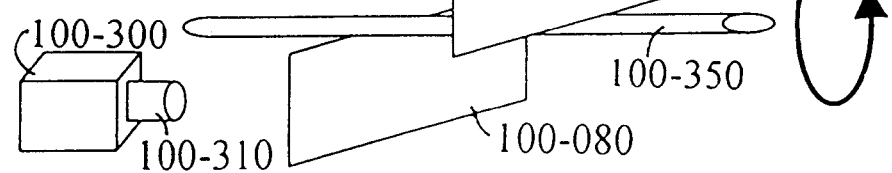
FIG. 100B is a perspective view of an image display system of the present invention.
Figure 100C:
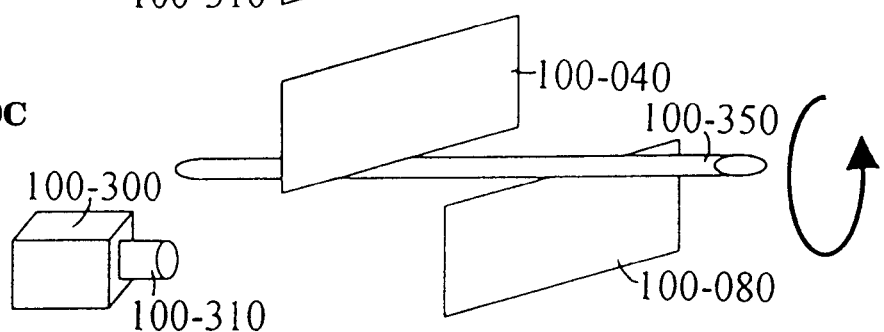
FIG. 100C is a perspective view of an image display system of the present invention.

In FIGS. 100A and 100B, the second image projection screen receives a second image from projector lens 100-310. In FIG. 100C, the first image screen 100-040 receives a first image from projector lens 100-310 once the rotating member 100-350 has rotated half a turn. The projection system shown in FIGS. 93A through 93C consists of two screens 100-040 and 100-080 mounted one hundred eighty degrees apart on a common rotating member 100-350, each screen at a different distance from the projector lens 100-310.

Figure 100D:
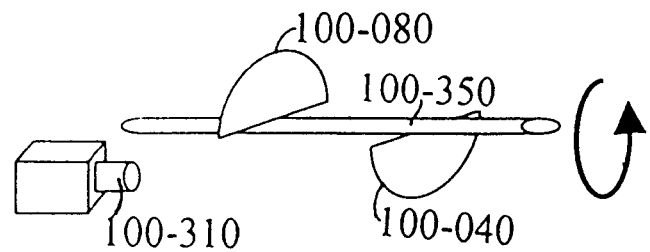
FIG. 100D is a perspective view of an image display system of the present invention.

As an example, as shown in FIGS. 100B through 100D, a single projector 100-300 is used, having a lens 100-310 which has a large enough depth of focus to be in focus on either of the two planes. (Alternatively, two projectors could be used, one in focus on each plane.)

In one embodiment, the projection screens 100-040, 100-080 are front-projection screens, wherein the viewer is located in the vicinity of the projector 300. In that instance, the foreground image appears on the first screen 100-040, and the background image appears on the second screen 100-080. In another embodiment the projection screens 100-040, 100-080 are translucent rear-projection screens, wherein the viewer is located opposite from the projector 300. In that case, the foreground image appears on the second screen 100-040 and the background image appears on the first screen 100-080.

Although the screens 100-040, 100-080 are illustrated diagrammatically by rectangles in FIGS. 100B and 100C, they may desirably be shaped otherwise, e.g. in the form of semicircles as shown in FIG. 100D.

Figure 100E:
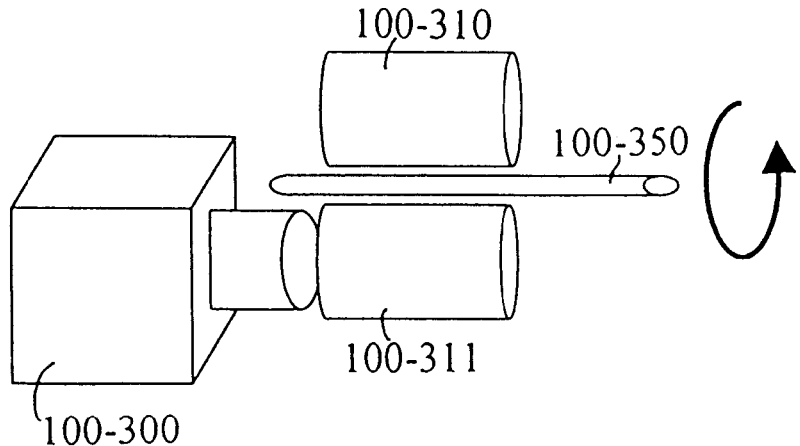
FIG. 100E is a perspective view of an image display system of the present invention.

Another embodiment, shown in FIG. 100E, uses a pair of complete projection lenses 100-310, 100-311 in front of the projector on a rotating member 100-350, synchronized to the changing position of a pair of projection screens (not shown). Alternatively a projection lens may be provided that changes focus by the insertion and extraction of a lens element having a position that is synchronized to the changing position of a pair of projection screens.

Figure 101A:
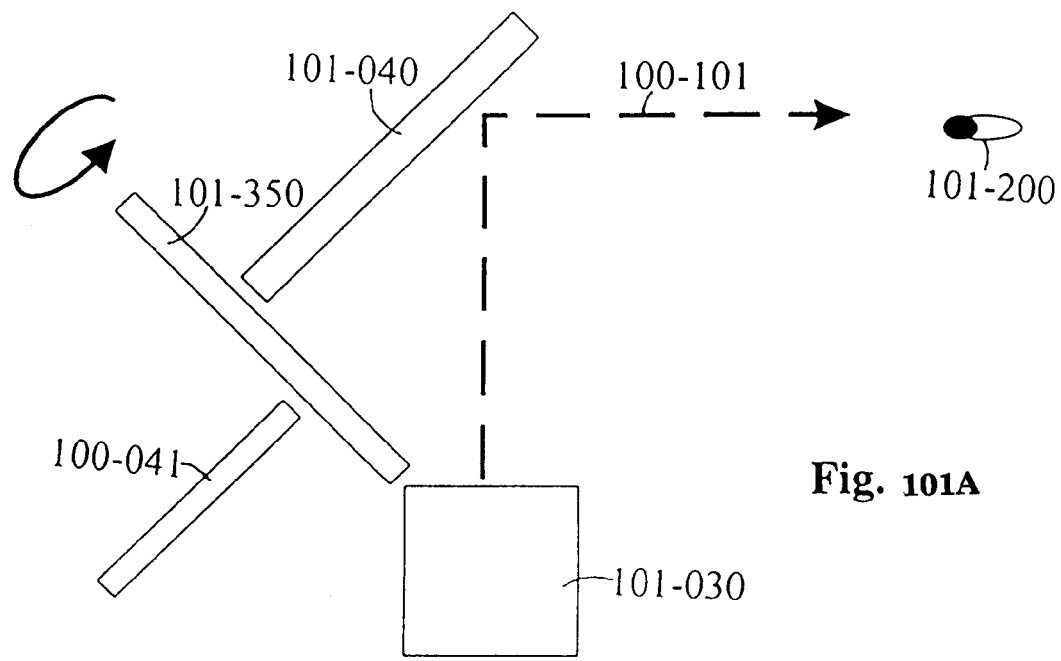
FIG. 101A is a plan view of an image display system of the present invention.
Figure 101B:
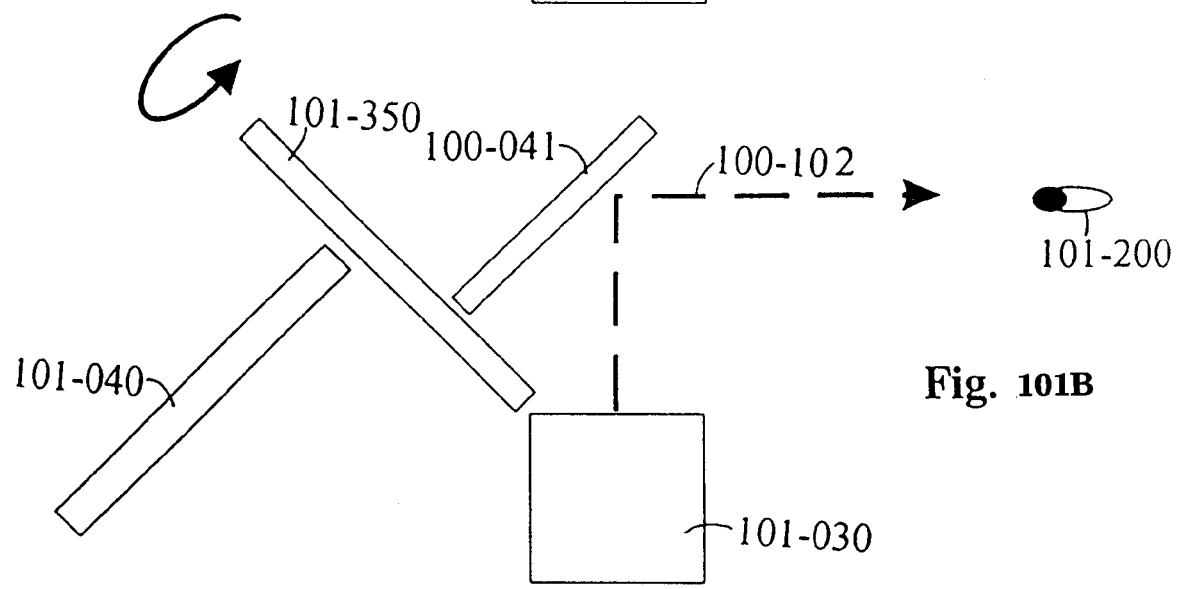
FIG. 101B is a plan view of an image display system of the present invention.

Another time multiplexing embodiment is shown in FIGS. 101A and 101B. Depicted are an image source 101-030, a pair of mirrors 101-040 and 101-041, light rays 101-101 and 101-102, a viewer 101-200, and a rotating shaft 101-350. The image source 101-030 is preferably a single TV monitor. The images are viewed in a spinning mirror arrangement. This embodiment comprises a pair of mirrors 101-040 and 101-041, mounted one hundred eighty degrees apart, on a single rotating shaft 101-350. As the mirrors 101-040 and 101-041 alternately rotate into position to present to the viewer 101-200 a virtual image of the monitor 101-030, the viewer 101-200 sees with both eyes, alternatingly a more distant image (when the system is in the position shown in FIG. 101A) and then a closer image (see FIG. 101B) followed by the next version of the more distant image (see again FIG. 101A). The two alternating light paths from the monitor to the viewer are shown by dashed lines 101-101 and 101-102.

Figure 102A:
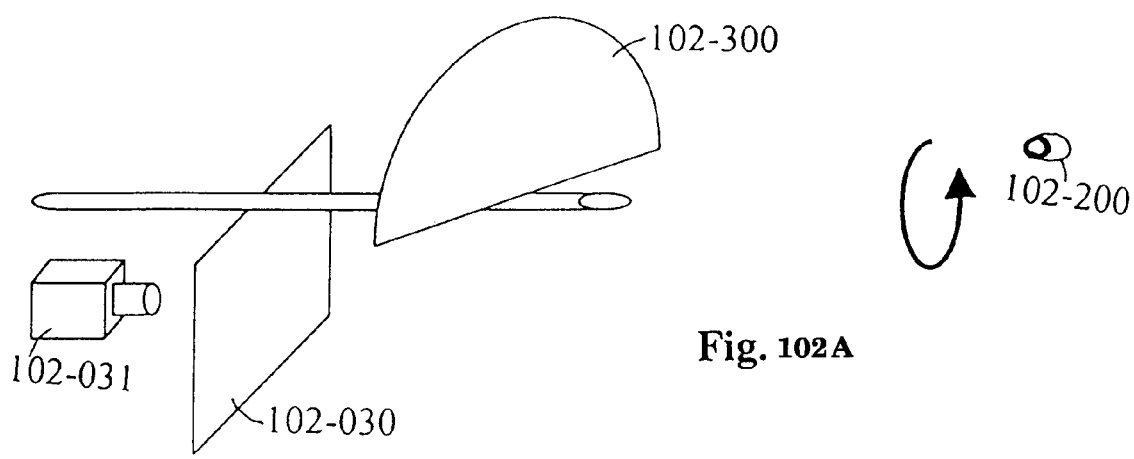
FIG. 102A is a perspective view of an image display system of the present invention.
Figure 102B:
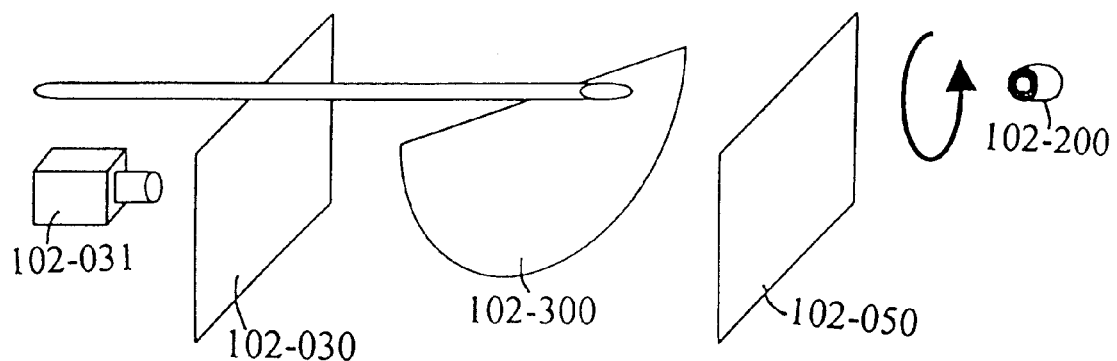
FIG. 102B is a perspective view of an image display system of the present invention.

FIGS. 102A and 102B show a perspective view of another embodiment. In FIGS. 102A and 102B, depicted are a large lens 102-300, stationary projection screen 102-030, a projector 102-031, real image 102-050, and a viewer 102-200.

Alternately, as shown in FIGS. 102A and 102B, a large lens 102-300, such as a Fresnel lens, cut to form a semi-circle, is made to rotate in front of a stationary projection screen 102-030. The viewer 102-200 sees the projection screen successively through the lens (as shown in FIG. 102B) and then directly (as in FIG. 102A). When the lens 102-300 is in front of the screen 102-030, the screen 102-030 is made to appear closer to the viewer (and larger), in the form of a real image 102-050. This is a foreground image. When the lens is rotated away from this position, the screen 102-030 appears at its actual distance (and smaller), see FIG. 102A, as the background image. The lens 102-300 position is synchronized to the images that are projected onto the screen by projector 102-031. The screen may be a front-projection screen positioned so that the projector beam does not go through the lens. However it is preferably a rear-projection screen, as shown.

Neither "letterbox" nor "portrait" is the shape of a traditional TV monitor. It would be more difficult to re-map a traditional TV image to an overly wide or tall screen. Or, if the re-mapping were done to preserve proportion and faithful reproduction, a much smaller area of the screen would be used, as superfluous height or width would be trimmed.

The "proportioned" orientation requires placing the TV monitor on its side. Proportion is preserved, but the user is required to turn the TV set on its side. That may be inconvenient in some instances, for example, where the TV is used for both game playing and traditional TV viewing.

The major advantage of the "proportioned" orientation is that the foreground and background sections have proportions that more closely approximate that of a full screen. Thus it is unnecessary to design for the screen shape generated by the adapter; instead, the video signal can be produced generically and viewed by some viewers using customary 2-D television screens and by others using apparatus of the present invention, with minimal information regarding depth being required to get full 3-D effect from the adapter, as previously discussed.

Of course, all problems with aspect ratio caused by the splitting of the screen can be cured through the use of elements that expand an image along a desired line.

In addition, in some of the embodiments foreground image and background image are created to be of different sizes.

Real Image Monitor

Embodiments of the present invention preferably provide 3-D real depth in accordance with the present invention. Alternatively, a simplified version provides a real image of an image source within the scope of the present invention. One embodiment of the present invention that forms real images uses a Fresnel lens (or other means of generating a real image as known in the art and/or discussed herein) and a mirror in a housing. The housing has holes or apertures: a rear aperture that sits more or less flush with the image source (for example, the face of a CRT) and a second aperture through which the real image is viewed.

The image is reflected from the mirror (which is angled appropriately, desirably at a 45-degree angle) and through the Fresnel lens, which focuses the light into a real image. This real image appears to float in space.

Like other indirect viewing systems, an advantage of the present invention is that the user is further from the computer monitor and its associated hazards. In addition, the indirect viewing system of the present invention has certain advantages over other prior art viewing systems in that a angle of view is controllable and there is a great reduction in glare. Both features would be useful, for example, in an office setting or at an automated teller machine, where privacy is important and where glare is potentially distracting.

Recording

According to the present invention a number of techniques may be employed in imaging processing methods for processing source images comprising live or pre-recorded images to be displayed using the display techniques of the present invention. These techniques and methods vary in accordance with whether the source image is a live image or is an already recorded and stored image to be displayed according to the display methods of the present invention.

The image processing methods of the present invention process a source image to view using the display techniques of the present invention. These display techniques utilize at least two separate images, usually including a foreground image and a background image, separately displayed on at least two separate optically aligned planes or volumes. The source image is either a live scene characterized by a continuous three-dimensional space defined between a forwardmost foreground object and a rearmost background object or a pre recorded two-dimensional image displayable on a single plane and containing the same human visual depth perception cues contained within a photograph.

Each source image is divided into at least two image signals. These separate image signals produce separate images on different portions of a single image display device which are then optically combined to form a composite image scene or other display, or are used to synchronously generate a plurality of images each on a separate display device which are then optically combined to form the composite image scene or other display.

There are several image capture techniques which may be employed in accordance with the present invention to capture live images. According to a first image capture technique useful for capturing images to be displayed using the present invention, a first camera is directed at one or more foreground objects in a scene to be captured. The function of the first camera is to capture the foreground of the scene. A second camera is positioned behind or above the foreground subject matter and is also directed at the scene to be captured. The function of the second camera is to capture the background of the scene.

Numerous configurations for the relative positioning of the two cameras may be employed. For example, both cameras can be located in the same plane, one being vertically positioned at chest height and the second being vertically positioned about ten feet or so higher than the first camera and aimed downward. Due to the position and lens characteristics of the second (higher) camera, foreground objects would be outside of its field of view. The first and second cameras would be equipped with different focal length lenses, the focal length of the lens on the first camera being selected to focus on objects in the foreground and the lens for the second camera being selected to focus on objects in the background of the scene. The depth of field of the first camera may be selected to focus on a range of objects in a Z depth corresponding to the depth of foreground composition and the depth of field of the second camera may be selected to focus on a range of objects in a Z depth corresponding to the depth of background composition. Other numbers of cameras may be employed.

According to the present invention, techniques are presented to minimize or eliminate the background information from the foreground image. Several techniques are available to accomplish this task. In the embodiment where the first camera is focussed on the foreground subject matter and the second camera is focussed on the background subject matter, one of several known focus detection algorithms may be employed to eliminate the out-of-focus subject matter from each image. As an example, known focus detection systems utilize spatial frequency detection, contrast level detection, or Modulation Transfer Function (MTF) threshold detection.

This technique is also useful for processing prerecorded images in, for example, two-dimensional movie subject matter. A focus threshold is selected and everything greater than the focus threshold is considered to belong in the foreground image and everything less than the focus threshold is considered to be in the background image.

Another multicamera technique which is contemplated for use in processing images for display according to the present invention is to employ two or three cameras horizontally displaced from one another, e.g., one to capture the scene from the left, one to capture the scene from the center, and one to capture the scene from the right. The different angles of view allow a composite full view of all background objects behind the one or more foreground objects in the image.

Yet another multicamera technique comprises two horizontally-displaced cameras arranged in parallel fields of view at the same Z location. The two images generated by the two cameras are compared and matching objects from each image can be recognized using known computer matching techniques. Matching objects are recognized and the distance from the image of each object to the edges of the frame in each of the two images are calculated to determine depth. At infinity, all objects overlap, but as objects get closer to the cameras, the corresponding images become separated by greater distances.

Those of ordinary skill in the art will recognize that variations of this technique are possible. In one variation, the cameras are aimed at a common point such as the center of the furthest background object. All objects at that point will be aligned and closer objects will become separated. This technique also works when the cameras are vertically displaced. Vertical camera displacement may be advantageous when dealing with scenes which are horizontally cluttered.

Computer processing of the image signals may then be performed to selectively eliminate background objects or areas using techniques such as have been employed in colorization of motion pictures (in which the computer tracks a selected object or area from frame to frame) to create the foreground image frame. Where real-time processing is not an issue, foreground objects can alternately be selected by hand. The same techniques can be used to produce a background image devoid of foreground objects.

A single-camera technique for identifying foreground and background objects according to the present invention employs two lenses which are focused on the same scene through a single aperture by way of a beamsplitter One lens is focused on the foreground and the other is focused on the background and each lens focuses an image on its own image detector. By using known techniques which discard out-of-focus components, foreground and background objects can be identified and eliminated from each of the foreground and background images as required. Known fill techniques may be used to reconstruct background areas occluded by foreground objects.

In situations requiring real-time processing, the computer may select foreground objects on the fly. One technique for facilitating this separation is to employ a camera whose sole purpose is to capture foreground objects. This camera is set for a narrow depth of field, and standard techniques may be employed to select in-focus objects from the scene foreground. Another technique which may be usefully employed to select foreground images "on-the fly" is to analyze the spatial frequency of the various portions of the image. Spatial frequency will be highest for in-focus objects. A spatial frequency threshold is selected and groups of pixels having a spatial frequency above threshold are determined to belong to foreground objects.

Another technique which can be employed to discriminate between foreground and background objects is contrast detection. Highest contrast areas are generally found in foreground objects. Techniques such as MTF filtering look for the highest difference between dark and light areas of an image.

Because objects in the foreground of an image generally move more quickly than objects in the background, frame-to-frame motion detection could also be employed to discriminate between foreground objects and background objects. Another useful technique which may be employed to distinguish between foreground and background objects is color saturation which decreases as objects recede into the background. Other useful techniques include brightness detection, based on the assumption that closer objects are usually brighter. Optical subtraction may be employed with these techniques to eliminate portions of the image that are the same in successive frames, resulting in an image of foreground objects.

Those of ordinary skill in the art will appreciate that combinations of the above techniques may be employed. The limitation of any single technique or combination of techniques is most critical when processing live images, due to the processing bandwidth limitation of the processing hardware. This limitation is not a consideration when processing already recorded two-dimensional images.

In some image compositions, there are instances when background objects are blocked by foreground objects at all camera angles. In such situations, commonly known computer graphics replication techniques may employed to fill in dead spots in background areas caused by obscuring foreground objects. One such technique is particularly useful when a moving foreground object is blocking a background area. Different areas of the background will be blocked in successive frames of the image. By storing the successive frames, the blocked background areas may be reconstructed by using selected background data from different frames using known techniques.

In addition, ranging techniques may be employed during capture of live images. For example, a coherent or incoherent projected grid may be superimposed on the scene in a way in which it will not show up in the recording of the image. Examples of such grid projection techniques include infrared or ultraviolet projection and scanning or strobing at a frequency or speed that will not be recorded with the image. A detector may be gated to the grid flash (with the camera gated oppositely to the flash). The grid may be detected and its focus analyzed. Threshold conditions may be used to determine if an object is in the foreground. If the imaged grid pattern is scanned in synchronization with a scene scanning camera, the Z coordinate can be approximated for each element in the scene and can be stored with the pixel to use to separate foreground and background. This technique may be performed on a per camera basis where multiple cameras are employed.

When the grid is projected onto an object, the size of each grid line and grid square is proportional to the projected distance from the source to the object. In addition, when the grid is projected onto a three dimensional surface of an object, the grid lines each become distorted as a function of the Z position of each point on the three dimensional surface. The computer can employ known techniques to analyze a two dimensional scan of the projected grid lines to determine the Z coordinate of each point on the surface.

Another scanning technique applicable to the present invention is to scan the scene with a laser beam and detect the reflection from objects in the scene. The reflected spot size is proportional to the distance traveled by the reflected beam due to the limited depth of focus of the lens.

Another laser technique employs a scanned laser beam that is pulsed for short periods of time. The laser is configured to have a coherence length within which all foreground objects reside. When the beam is reflected from an object in the scene, the reflected beam is received and recombined with a reference beam from the same laser, and an interference pattern will develop only for objects which reside within the coherence length. A detector is used to detect the presence of the interference pattern. This technique identifies objects in the foreground. If the camera used is scanning the scene in synchronization with the laser beam, each pixel in the scene can be identified as coming from a foreground object or a background object by storing an additional bit with the pixel. Known object-detection techniques, such as analyzing pixels to find boundaries (large changes) which define the edges of an object, can be utilized to store Z-coordinate information for entire objects rather than for each individual pixel, reducing the amount of Z-coordinate data that must be stored or transmitted for each frame.

The grid generation and laser scanning techniques disclosed herein may be augmented by employing two or more spaced apart grid generators or scanning laser beams to avoid the problem of foreground objects blocking the grid or laser beam from reaching objects or areas.

Software and Hardware Image Solutions

As will be appreciated by those of ordinary skill in the art, methods are provided for preparing source images to be displayed according to the present invention. Software may be used to process source images to generate displayed images according to the present invention. There are several steps performed by software according to the present invention to process source images into displayed images according to the present invention. The manner in which any single step of the methods performed by software herein is performed may be any known manner to perform such step.

According to a method of the preset invention, source images are divided into at least two images, at least one foreground image and at least one background image. Techniques for dividing source images are known and have been mentioned herein. When both foreground and background images are displayed on the same display device, the computer or other device writing to the display device must be configured to write the foreground image to a first designated area of the display device and to write the background image to a second designated area of the display device. For example, if a raster-scanned CRT display is employed, the foreground image may be written to the top half of the CRT and the background image may be written to the bottom half of the CRT by supplying the pixel data for the foreground image during the first half of each display frame and supplying the pixel data for the background image during the second half of each display frame. Implementation of such a display scheme is trivial for CRT and other display devices, involving only providing the correct data at the correct time.

If the plurality of divided images are formed on a single display device, such as a CRT display, it may be desirable to employ optical expansion during viewing of at least one of the images to recreate the aspect ratio of the original image. In the event that optical expansion techniques are employed, it is advantageous to display the image compressed in the direction which is to be expanded, e.g., vertically. Such compression according to the present invention allows optical expansion without resulting in a stretched image in that direction. Image compression techniques are well known in the art and have been embodied in software.

In this regard, resolution enhancement steps may be performed on image data if the image is to be optically expanded to restore aspect ratio. Numerous known pixel and line interpolating methods may be employed for this purpose.

According to one method of the present invention, perspective of a scene may be exaggerated to make the scene appear more three dimensional. Objects in the background image of the scene may be shrunk relative to foreground objects according to the present invention to exaggerate depth perception. Background image objects may be easily shrunk without loss of resolution according to known methods, which may also include the step of expanding foreground objects, shrinking background objects or performing both steps. Exaggerated reduction and elongation of parts of foreground images will make them appear to fill the space between the foreground and background planes.

Because the image display techniques of the present invention utilize at least two overlapping images, it is advantageous to control the brightness of the background and foreground images in order to prevent background images from "bleeding through" images of foreground objects. Brightness control techniques are employed in accordance with the present invention to prevent background images from bleeding through to the foreground. One method according to the present invention is to generate a shadow of a foreground object at a location in the background image corresponding to the location of the object in the foreground image. This method lowers the light level at that point in the background image to minimize background image bleed through. The shadow is preferably somewhat larger (e.g., about twice the size in each direction) than the foreground object, and is preferably tapered, i.e., made darkest in its enter and lighter towards its edges to prevent unnaturally abrupt brightness transitions in the background image. In this manner, parallax artifacts between the foreground and background images are minimized. Alternatively, the brightness of the entire background image may be reduced, and/or the brightness of the foreground image increased for the same end.

Another brightness control technique which may be employed according to the present invention to prevent background image bleed through is color balancing. Since darker colored foreground objects are more susceptible to bleed through from brighter background objects, color brightness comparisons may be made between corresponding regions of the foreground and background images, and hues of foreground objects can be brightened as necessary and background colors can be darkened as needed. It is also contemplated to increase the brightness values of selected foreground object pixels according to this method. Use of either or both techniques results in an increased difference between the brightness of foreground and background objects to reduce or eliminate background bleed-through.

The display technology of the present invention as disclosed herein includes the use of light valves disposed in a conjugate plane of the foreground image located in the background image path to block background light which would otherwise bleed through foreground objects. According to this aspect of the invention, a light valve device, such as a binary LCD array permits selective transmission or blocking of regions of the background image by producing silhouettes of foreground objects to block background light from passing through to the viewer with no parallax error. According to one method of the present invention, shadow images of foreground objects are generated on the light valve elements to create the shadow image of foreground objects. This method according to the present invention uses known techniques to create a black pixel on the light valve plane wherever there is a non-zero (or other threshold) pixel value of the foreground image.

The perception that a displayed object is undergoing Z-axis motion, i.e., receding into the background or proceeding into the foreground, may be enhanced according to the present invention by plane-switching techniques. Such techniques include the steps of gradually decreasing the size of the object as it recedes in the Z direction and, at a selected time, moving the image of the object from the foreground image to the background image. Likewise, objects in the background image which are moving in the Z direction towards the viewer may be gradually increased in size and at a selected point are transferred from the background image to the foreground image. This effect may be implemented on a frame by frame basis using known image processing techniques.

According to another aspect of the present invention, the foreground and background images are temporally synchronized. This method may be implemented using known techniques and is especially useful where two independent image sources, such as CRT displays or projectors, are employed.

According to certain embodiments of the display techniques of the present invention, one or more images are reversed as a consequence of having been reflected from an odd number of mirrors. When preparing images for display on such display embodiments of the present invention, this image reversal may be corrected by generating a reversed image so that subsequent reversal of that image by reflection from an odd number of mirrors will result in an unreversed image. Known techniques, such as CRT scanning from right to left, or display pipelining lines of pixel data from right to left, may be employed for this purpose.

The present invention may be embodied in other specific forms without departing from its spirit or essential characteristics. The described embodiments are to be considered in all respects as illustrative and not restrictive. All changes which come within the meaning and range of equivalency of the claims are to be embraced within their scope. The inventor intends that all patentable subject matter disclosed herein eventually be the subject of patent claims, regardless of whether presented upon the initial filing of the application represented by this document or in a subsequent filing.

The invention claimed is:

1. An image display system comprising:
    a composite image source, a first portion of the composite image source depicting foreground image elements, and a second portion of the composite image source depicting background image information;
    a beam combiner; and
    a background-image-occluding element;
    wherein said first portion of said composite image source, said second portion of said composite image source, and said beam combiner are so disposed as to present to a viewer said foreground image elements from said one of said composite image portions at a shorter distance from the viewer than said background image information presented to the viewer from said other of the said composite image portions, and
    wherein said background-image-occluding element is located at a distance from the viewer that is optically equivalent to the distance between the viewer and said foreground image elements.

2. The image display system of claim 1 wherein said background-image-occluding element is a light valve such as an LCD.

3. An image display system comprising:
    at least two image sources, a first image source depicting foreground image elements, and a second image source depicting background image information;
    a beam combiner; and
    a background-image-occluding element;
    wherein said first image source, said second image source, and said beam combiner are so disposed as to present to a viewer said foreground image elements from said one of said image sources at a shorter distance from the viewer than said background image information presented to the viewer from the other of the said image sources, and
    wherein said background-image-occluding element is located at a distance from the viewer that is optically equivalent to the distance between the viewer and said foreground image elements.

4. The image display system of claim 3 wherein said background-image-occluding element is a light valve such as an LCD.

* * * * *